(12) United States Patent
Crystal et al.

(10) Patent No.: US 12,013,681 B2
(45) Date of Patent: Jun. 18, 2024

(54) CRAFTING APPARATUS ASSEMBLIES, SYSTEMS, DEVICES, KITS, MECHANISMS AND METHODOLOGIES FOR UTILIZING THE SAME

(71) Applicant: Cricut, Inc., South Jordan, UT (US)

(72) Inventors: Jeremy Burton Crystal, Springville, UT (US); Sterling Kingdon, Cedar Hills, UT (US); Korey Curtis, Herriman, UT (US); Henry F. Haskell, Jr., Salt Lake City, UT (US); Biju Kumar Vasudevan, Riverton, UT (US)

(73) Assignee: Cricut, Inc., South Jordan, UT (US)

( * ) Notice: Subject to any disclaimer, the term of this patent is extended or adjusted under 35 U.S.C. 154(b) by 0 days.

(21) Appl. No.: 18/300,150

(22) Filed: Apr. 13, 2023

(65) Prior Publication Data

US 2023/0251623 A1 Aug. 10, 2023

Related U.S. Application Data

(60) Continuation of application No. 17/644,667, filed on Dec. 16, 2021, now Pat. No. 11,650,569, which is a division of application No. 16/401,068, filed on May 1, 2019, now Pat. No. 11,237,541, which is a continuation-in-part of application No. PCT/US2018/044371, filed on Jul. 30, 2018.

(60) Provisional application No. 62/538,614, filed on Jul. 28, 2017.

(51) Int. Cl.
*G05B 19/4093* (2006.01)

(52) U.S. Cl.
CPC .............. *G05B 19/40938* (2013.01); *G05B 2219/45134* (2013.01); *G05B 2219/45186* (2013.01)

(58) Field of Classification Search
CPC .... G05B 19/40938; G05B 2219/45134; G05B 2219/45186
USPC ........................................................ 700/116
See application file for complete search history.

(56) References Cited

U.S. PATENT DOCUMENTS

| | | |
|---|---|---|
| 3,163,291 A | 12/1964 | Gleisner, Jr. |
| 4,019,822 A | 4/1977 | Matsumoto et al. |
| D278,245 S | 4/1985 | Smith |
| D278,344 S | 4/1985 | Smith |
| D344,005 S | 2/1994 | Arai |
| D383,962 S | 9/1997 | Daley et al. |
| D392,537 S | 3/1998 | Schulz et al. |

(Continued)

FOREIGN PATENT DOCUMENTS

| | | |
|---|---|---|
| EP | 0267891 A2 | 5/1988 |
| KR | 200188323 Y1 | 7/2000 |

(Continued)

OTHER PUBLICATIONS

International Search Report and Written Opinion of the International Searching Authority for International Application No. PCT/US2018/044371 dated Jan. 9, 2019.

(Continued)

*Primary Examiner* — Omar Flores Sanchez
(74) *Attorney, Agent, or Firm* — Honigman LLP

(57) ABSTRACT

A tool including a tool surface and further including coding indicia linked, at least indirectly, with the surface of the tool, the coding indicia capable of being detected by a sensor, the coding indicia functioning as a pointer to information relating to said tool or its use.

9 Claims, 43 Drawing Sheets

(56) References Cited

U.S. PATENT DOCUMENTS

| | | | |
|---|---|---|---|
| 6,216,348 | B1 | 4/2001 | Martirossian |
| D484,977 | S | 1/2004 | Ryan et al. |
| 6,880,249 | B2 | 4/2005 | Long et al. |
| D511,003 | S | 10/2005 | Sliwa, Jr. |
| D514,420 | S | 2/2006 | Xu |
| 7,240,845 | B2 | 7/2007 | Komine et al. |
| D565,917 | S | 4/2008 | Peterson et al. |
| D592,482 | S | 5/2009 | Gregory |
| D618,715 | S | 6/2010 | Corcoran |
| D635,429 | S | 4/2011 | Hakki |
| 8,021,085 | B1 | 9/2011 | Nelson |
| D669,988 | S | 10/2012 | Packard et al. |
| D697,769 | S | 1/2014 | Lion et al. |
| 9,079,286 | B1 | 7/2015 | DeCamillis |
| D741,134 | S | 10/2015 | Massey et al. |
| 9,292,811 | B2 | 3/2016 | O'Brien et al. |
| 10,494,131 | B2 * | 12/2019 | Mistyurik ............ B31D 1/026 |
| D877,214 | S | 3/2020 | Crisp et al. |
| D887,246 | S | 6/2020 | Chang |
| D902,998 | S | 11/2020 | Wolter |
| D902,999 | S | 11/2020 | Wolter |
| 11,237,541 | B2 * | 2/2022 | Crystal ............ G05B 19/40938 |
| 2002/0069736 | A1 | 6/2002 | Yasoda et al. |
| 2003/0059263 | A1 | 3/2003 | Chen |
| 2004/0242794 | A1 | 12/2004 | Kanazawa |
| 2005/0238447 | A1 | 10/2005 | Murota et al. |
| 2006/0029479 | A1 | 2/2006 | Stoll et al. |
| 2006/0090345 | A1 | 5/2006 | Stravitz |
| 2007/0012152 | A1 | 1/2007 | Workman et al. |
| 2007/0107211 | A1 | 5/2007 | Bainbridge |
| 2008/0007170 | A1 | 1/2008 | Kim et al. |
| 2008/0282551 | A1 | 11/2008 | Stravitz |
| 2009/0295104 | A1 | 12/2009 | Cover |
| 2011/0280999 | A1 | 11/2011 | Crystal et al. |
| 2013/0103794 | A1 | 4/2013 | Starkey |
| 2014/0150619 | A1 | 6/2014 | Fujihara |
| 2015/0258699 | A1 | 9/2015 | Vander Woude |
| 2016/0167188 | A1 | 6/2016 | Davis et al. |
| 2016/0303892 | A1 | 10/2016 | Killian et al. |
| 2017/0259450 | A1 | 9/2017 | Oka et al. |
| 2019/0061025 | A1 | 2/2019 | Trecapelli et al. |

FOREIGN PATENT DOCUMENTS

| | | |
|---|---|---|
| WO | 2004080670 A1 | 9/2004 |
| WO | 2015112759 A1 | 7/2015 |

OTHER PUBLICATIONS

International Search Report and Written Opinion of the International Searching Authority for International Application No. PCT/US2020/030584 dated Aug. 11, 2020.

USPTO, Office Action relating to U.S. Appl. No. 29/771,267, dated Dec. 10, 2021.

USPTO. Office Action relating to U.S. Appl. No. 17/644,667, dated Sep. 9, 2023.

IP Australia. Examination Report relating to application No. 2022224857, dated Dec. 15, 2023.

* cited by examiner

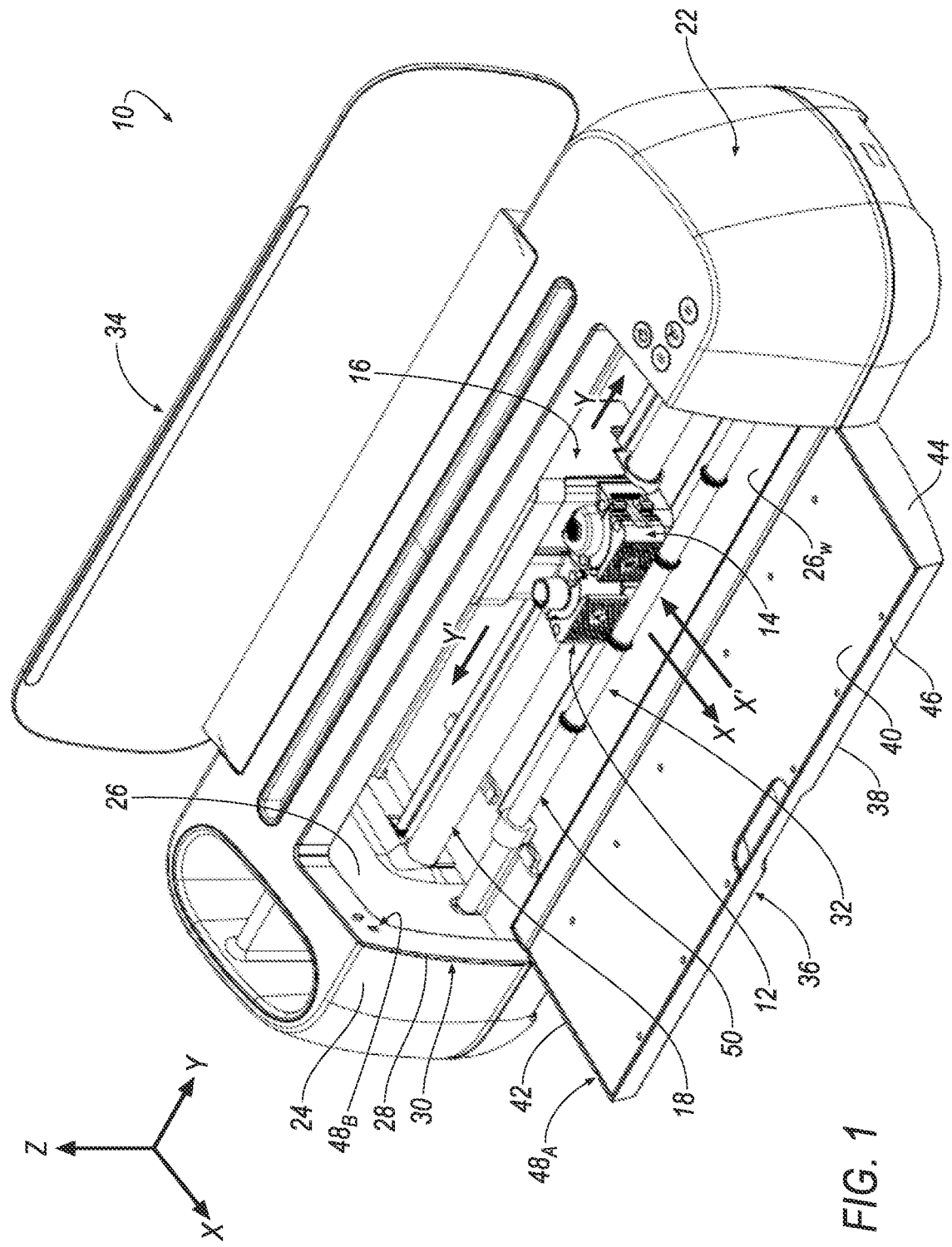

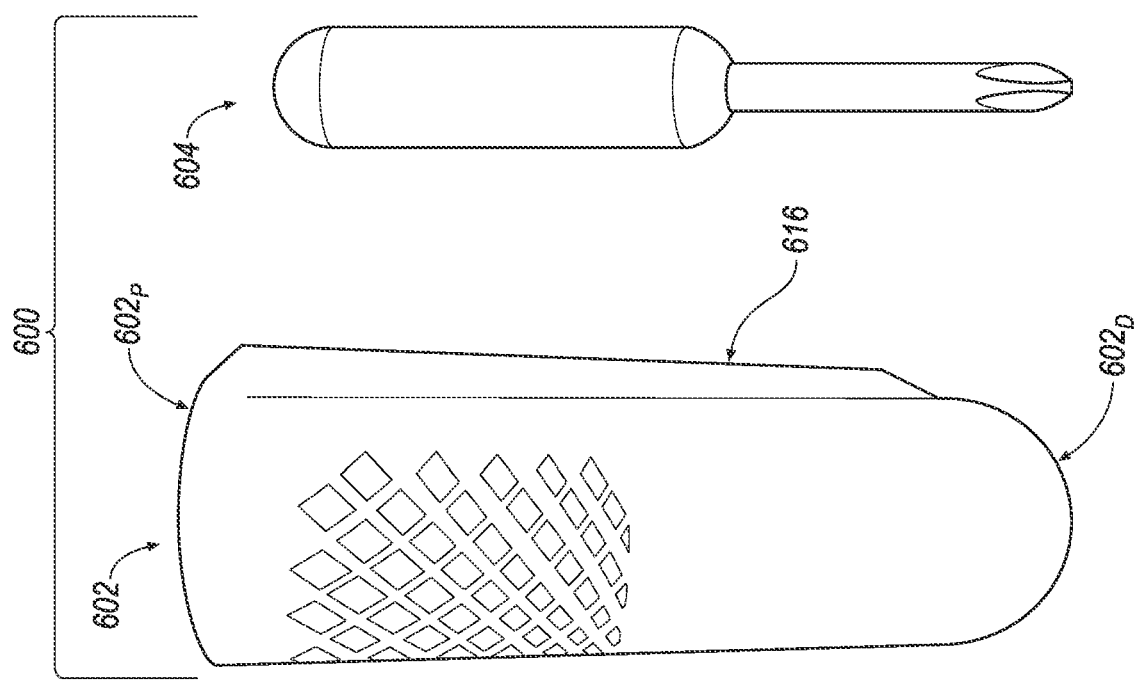
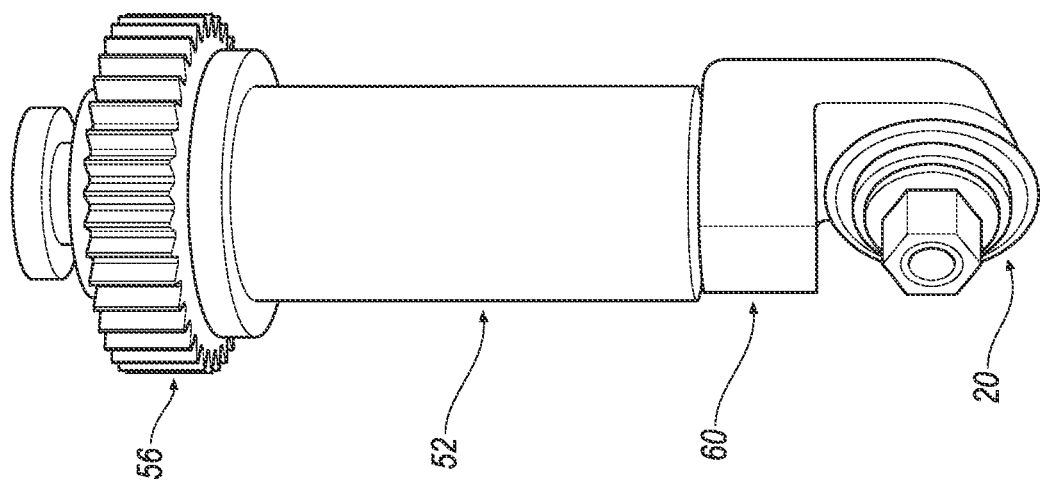
FIG. 10A

CRAFTING APPARATUS ASSEMBLIES, SYSTEMS, DEVICES, KITS, MECHANISMS AND METHODOLOGIES FOR UTILIZING THE SAME

CROSS-REFERENCE TO RELATED APPLICATIONS

This U.S. patent application is a continuation application of, and claims priority under 35 U.S.C. § 120 patent application Ser. No. 17/644,667 filed Dec. 16, 2021, which is a divisional of, and claims priority under 35 U.S.C. § 121 from U.S. patent application Ser. No. 16/401,068, filed on May 1, 2019, which is a continuation-in-part of PCT Application No. PCT/US2018/044371, designating the United State of America, filed on Jul. 30, 2018, which claims priority under 35 U.S.C. § 119(e) from, U.S. Provisional Application No. 62/538,614, filed on Jul. 28, 2017. The disclosures of the prior applications are considered part of the disclosure of this application and are hereby incorporated by reference in their entireties.

TECHNICAL FIELD

This disclosure relates to crafting apparatus assemblies, systems, devices, kits, mechanisms and methodologies for utilizing the same.

BACKGROUND OF THE INVENTION

Crafting apparatuses are known. While existing crafting apparatuses perform adequately for their intended purpose, improvements to crafting apparatuses are continuously being sought in order to advance the arts.

SUMMARY OF THE INVENTION

One aspect of the disclosure provides a portion of a cutting device of a crafting apparatus including a support rod, a blade housing including a blade, a support member, a support member moving device and at least one spring. The blade is arranged opposite a workpiece support surface. The support member supports the blade housing. The support member is movably-connected to the support rod. The support member moving device is connected to the support member. The support member moving device drives movement of the support member relative the support rod in two directions including a lifting direction for lifting the blade away from the workpiece support surface and a cutting direction for driving the blade toward the workpiece support surface. The at least one spring connects the support member moving device to the support member.

Implementations of the disclosure may include one or more of the following optional features. In some implementations the at least one spring includes at least one non-linear spring circumscribing the support rod.

In some examples, the at least one non-linear spring circumscribing the support rod includes a first non-linear spring and a second non-linear spring.

In other examples, the first non-linear spring includes a light spring and the second non-linear spring includes a heavy spring. The light spring provides a lower spring constant at lower cutting forces for the blade when the support member moving device drives movement of the support member in the cutting direction. The heavy spring provides a higher spring constant at higher cutting forces for the blade when the support member moving device drives movement of the support member in the cutting direction.

In some instances, the portion of the cutting device of the crafting apparatus includes a washer having a central passage that is sized for permitting the support rod to extend there-through. The washer includes a first non-linear spring support surface and a second non-linear spring support surface that is opposite the first non-linear spring support surface. A first end of the first non-linear spring is disposed adjacent the first non-linear spring surface of the washer. A first end of the second non-linear spring is disposed adjacent the second non-linear spring surface of the washer.

In some configurations, a second end of the first non-linear spring is disposed adjacent a surface of the support member moving device. A second end of the second non-linear spring is disposed adjacent a surface of the support member.

In some examples, the support member moving device includes a rack-and-pinion drive mechanism including a rack and a pinion. The rack defines a central passage that is sized for permitting the support rod to extend there-through. A first end of the first non-linear spring is disposed adjacent a first non-linear spring support surface of the rack.

In other examples, the first non-linear spring support surface of the rack further defines a first non-linear spring-receiving cavity that is co-axially-aligned with the central passage extending through the rack.

In some instances, the portion of the cutting device of the crafting apparatus further includes a washer having a central passage that is sized for permitting the support rod to extend there-through. The washer includes a first non-linear spring support surface and a second non-linear spring support surface that is opposite the first non-linear spring support surface. A second end of the first non-linear spring is disposed adjacent the first non-linear spring surface of the washer. A first end of the second non-linear spring is disposed adjacent the second non-linear spring surface of the washer. A second end of the second non-linear spring is disposed adjacent a surface of the support member.

In some configurations, the portion of the cutting device of the crafting apparatus further includes a balance spring having a first end and a second end. The first end of the balance spring is disposed adjacent a balance spring support surface of the rack. The balance spring support surface of the rack is opposite the first non-linear spring support surface of the rack. The second end of the balance spring is disposed adjacent a balance spring support surface of the support member.

In some examples, the portion of the cutting device of the crafting apparatus includes a drive shaft, an encoder and a motor. The drive shaft includes a first end and a second end. The first end of the drive shaft is connected to the pinion. The second end of the drive shaft is connected to the encoder. The motor drives rotation of the drive shaft. The encoder and the motor are communicatively-connected to a central processing unit. The central processing unit includes data processing hardware and memory hardware in communication with the data processing hardware, the memory hardware storing instructions that when executed on the data processing hardware cause the data processing hardware to perform operations comprising actuating the motor for controlling rotation of the drive shaft for causing corresponding rotation to the pinion and determining an amount of rotation of the drive shaft in view of a feedback signal received from the encoder.

Another aspect of the disclosure provides a portion of a cutting device of a crafting apparatus including a blade housing and a housing supporting the blade housing. The blade housing includes a blade arranged opposite a workpiece support surface. The blade housing includes a driven gear. The blade housing includes an exterior surface having one or more surface portions. The housing includes a blade housing rotating mechanism and a rotation sensor. The blade housing rotating mechanism rotates the blade housing about a rotation axis. The rotation sensor senses rotation of the blade housing about the rotation axis.

Implementations of the disclosure may include one or more of the following optional features. In some implementations, the rotation sensor is arranged opposite the one or more surface portions of the exterior surface of the blade housing.

In other examples, the one or more surface portions is defined by a plurality of rotation sensor signal feedback surface portions that are separated by a plurality of rotation sensor signal feedback interruption surface portions.

In some instances, the plurality of rotation sensor signal feedback surface portions are configured to reflect a signal generated by the rotation sensor as the blade housing is rotated by the blade housing rotating mechanism. The plurality of rotation sensor signal feedback interruption surface portions are configured to interrupt the signal generated by the rotation sensor as the blade housing is rotated by the blade housing rotating mechanism. The reflection and interruption of the signal generated by the rotation sensor defines a periodically-interrupted reflected feedback signal received by the rotation sensor.

In some configurations, the rotation sensor is communicatively-connected to a central processing unit. The central processing unit includes data processing hardware and memory hardware in communication with the data processing hardware, the memory hardware storing instructions that when executed on the data processing hardware cause the data processing hardware to perform operations comprising identifying a style of the blade connected to the blade housing in response to receiving the periodically-interrupted reflected feedback signal from the rotation sensor.

In some examples, the rotation sensor is communicatively-connected to a central processing unit. The central processing unit includes data processing hardware and memory hardware in communication with the data processing hardware, the memory hardware storing instructions that when executed on the data processing hardware cause the data processing hardware to perform operations comprising determining an amount of rotation of the blade housing in response to receiving the periodically-interrupted reflected feedback signal from the rotation sensor.

In other examples, the rotation sensor is communicatively-connected to a central processing unit. The central processing unit includes data processing hardware and memory hardware in communication with the data processing hardware, the memory hardware storing instructions that when executed on the data processing hardware cause the data processing hardware to perform operations comprising identifying a style of the blade connected to the blade housing and determining an amount of rotation of the blade housing in response to receiving the periodically-interrupted reflected feedback signal from the rotation sensor.

In some instances, the blade housing rotating mechanism includes a motor and a drive gear. The drive gear is connected to the motor that rotates the drive gear. The drive gear is connected to the driven gear of the blade housing such that rotation of the drive gear by the motor imparts rotation of the driven gear of the blade housing.

In some configurations, the drive gear is connected to a gear train.

In some examples, the housing further includes a blade housing lifting-lowering mechanism. The blade housing lifting-lowering mechanism moves the blade housing in two directions along the rotation axis being: a lifting direction for lifting the blade away from the workpiece support surface and a cutting direction for driving the blade toward the workpiece support surface.

Yet another aspect of the disclosure provides a method for operating a portion of a cutting device of a crafting apparatus. The method includes: connecting a blade housing to a housing; arranging a rotation sensor opposite one or more surface portions of the exterior surface of the blade housing; rotating the blade a housing about a rotation axis; utilizing the rotation sensor for sensing rotation of the blade housing about the rotation axis.

Implementations of the disclosure may include one or more of the following optional features. In some implementations, the method further includes directing a signal from the rotation sensor toward the one or more surface portions of the exterior surface of the blade housing. The one or more surface portions is defined by a plurality of rotation sensor signal feedback surface portions that are separated by a plurality of rotation sensor signal feedback interruption surface portions. The plurality of rotation sensor signal feedback surface portions are configured for reflecting the signal back to the rotation sensor as the blade housing is rotated by the blade housing rotating mechanism. The plurality of rotation sensor signal feedback interruption surface portions are configured for interrupting the signal generated by the rotation sensor as the blade housing is rotated by the blade housing rotating mechanism for defining a periodically-interrupted reflected feedback signal received by the rotation sensor.

In some examples, the rotation sensor is communicatively-connected to a central processing unit. The central processing unit includes data processing hardware and memory hardware in communication with the data processing hardware, the memory hardware storing instructions that when executed on the data processing hardware cause the data processing hardware to perform operations comprising identifying a style of the blade connected to the blade housing in response to receiving the periodically-interrupted reflected feedback signal from the rotation sensor.

In other examples, the rotation sensor is communicatively-connected to a central processing unit. The central processing unit includes data processing hardware and memory hardware in communication with the data processing hardware, the memory hardware storing instructions that when executed on the data processing hardware cause the data processing hardware to perform operations comprising determining an amount of rotation of the blade housing in response to receiving the periodically-interrupted reflected feedback signal from the rotation sensor.

In some instances, the rotation sensor is communicatively-connected to a central processing unit. The central processing unit includes data processing hardware and memory hardware in communication with the data processing hardware, the memory hardware storing instructions that when executed on the data processing hardware cause the data processing hardware to perform operations comprising identifying a style of the blade connected to the blade housing and determining an amount of rotation of the blade housing in response to receiving the periodically-interrupted reflected feedback signal from the rotation sensor.

One aspect of the disclosure provides a portion of a crafting apparatus that conducts work on a workpiece defined by a workpiece front surface and a workpiece rear surface. The workpiece front surface is defined by a first color. The workpiece front surface includes one or more fiducial markings defined by a second color. The portion of a crafting apparatus includes a workpiece support surface, a color sensor device and a central processing unit. The workpiece support surface supports the workpiece rear surface of the workpiece. The color sensor device is arranged opposite the workpiece support surface and the workpiece front surface. The color sensor device includes a red-green-blue illumination source that emits red-green-blue light. The color sensor device includes a red-green-blue sensor that detects reflected red-green-blue light that is reflected from the workpiece front surface including one or more fiducial markings. The central processing unit is communicatively-coupled to the color sensor device. The central processing unit includes data processing hardware and memory hardware in communication with the data processing hardware, the memory hardware storing instructions that when executed on the data processing hardware cause the data processing hardware to perform operations comprising receiving a signal from the red-green-blue sensor including information related to the reflected red-green-blue light and identifying a location of the one or more fiducial markings arranged on the workpiece front surface.

Implementations of the disclosure may include one or more of the following optional features. In some implementations, the first color defining the workpiece front surface is a first non-white color. The second color defining the one or more fiducial markings is a second non-white color.

In some examples, the operations further include varying the red-green-blue light emitted by the red-green-blue illumination source toward the workpiece front surface.

In other examples, identifying a location of the one or more fiducial markings arranged on the workpiece front surface includes detecting a ratio of a maximum amount of a color associated with the received signal versus a minimum amount of the color associated with the received signal.

Another aspect of the disclosure provides a portion of a cutting device of a crafting apparatus including a blade-keying assembly. The blade-keying assembly includes a blade having a base portion and a key body disposed over the base portion. The blade-keying assembly includes a blade housing defining a blade-receiving opening that permits access to a blade-receiving bore that is correspondingly-sized for receiving the key body and the base portion of the blade.

Implementations of the disclosure may include one or more of the following optional features. In some implementations, the key body includes a barrel portion and a key portion extending from the barrel portion.

In some examples, the blade-receiving opening and the blade-receiving bore are defined by a first surface portion, a second surface portion and at least one intermediate surface portion. The first surface portion is sized for receiving the key portion of the key body. The second surface portion is sized for receiving some of the base portion of the blade. The at least one intermediate surface portion extends between and connects the first surface portion and the second surface portion that is sized for receiving the barrel portion of the key body.

Yet another aspect of the disclosure provides a portion of a cutting device of a crafting apparatus includes a blade assembly. The blade assembly includes a circular rotary blade and an over-molded circular hub. The over-molded hub extends over opposite sides of the circular rotary blade. An outer circumference of circular rotary the blade extends radially beyond an outer circumferential end surface of the over-molded circular hub for exposing a sharp cutting edge of the rotary blade.

Implementations of the disclosure may include one or more of the following optional features. In some implementations, the over-molded circular hub includes a central body portion having a surface that defines a central fastener-receive passage.

In some examples, the over-molded hub is formed from a material selected from the group consisting of plastic, copper and steel.

Another aspect of the disclosure provides a blade-changing kit that interfaces with a portion of a cutting device of a crafting apparatus. The blade-changing kit includes a sleeve portion defining a cavity that is sized for engagement with at least one surface portion of one or more of a blade housing and a fastener-securing portion. The sleeve portion defines a passage that is configured for alignment with a fastener passage of one or more of the blade housing and the fastener-securing portion.

Implementations of the disclosure may include one or more of the following optional features. In some implementations, the fastener-securing portion is a nut. The at least one surface portion of the nut includes more than one surface portion of the nut.

In some examples, the passage is sized for receiving a distal tip of a fastener-engaging portion.

In other examples, the cavity includes a blade-receiving recess that is sized for receiving a blade. The blade-receiving recess is sized for receiving the blade in a spaced-apart relationship with respect to an interior surface of the sleeve portion that defines the cavity and the blade-receiving recess.

Yet another aspect of the disclosure provides a method for utilizing a blade-changing kit that interfaces with a portion of a cutting device of a crafting apparatus. The method includes: arranging a sleeve portion defining a cavity over at least one surface portion of one or more of a blade housing and a fastener-securing portion. The sleeve portion defines a passage that is configured for alignment with a fastener that secures a blade to the blade housing; inserting a distal tip of a fastener-engaging portion through the passage and engaging a corresponding recess formed by the fastener; utilizing the fastener-engaging portion for disconnecting the fastener from a fastener passage formed by each of the blade housing, the blade and the fastener-securing portion for disconnecting the blade and the fastener-securing portion from the blade housing.

Implementations of the disclosure may include one or more of the following optional features. In some implementations, the method further includes removing the sleeve portion from the blade housing and containing the blade and the fastener-securing portion in the cavity of the sleeve portion.

Another aspect of the disclosure provides a method for utilizing a blade-changing kit that interfaces with a portion of a cutting device of a crafting apparatus. The method includes: providing a blade housing, a blade and a fastener-securing portion each defining a fastener passage; disposing the blade and the fastener-securing portion within a cavity of a sleeve portion; arranging the blade housing within the cavity of the sleeve portion and aligning the fastener passage of all of the blade housing, the blade and the fastener-securing portion; and connecting the blade housing to the blade and the fastener-securing portion with a fastener that is inserted through the fastener passage of each of the blade housing to the blade and the fastener-securing portion.

Implementations of the disclosure may include one or more of the following optional features. In some implementations, the connecting step includes inserting a distal tip of a fastener-engaging portion through a passage formed by the sleeve portion and engaging a corresponding recess formed by the fastener; and utilizing the fastener-engaging portion for connecting the fastener to the blade housing, the blade and the fastener-securing portion.

In some examples, the method further includes removing the sleeve portion from the blade housing, the blade and the fastener-securing portion.

Yet another aspect of the disclosure provides a portion of a crafting apparatus including a body, a first door, a second door and a door latching mechanism. The first door and the second door are independently rotatably-coupled to the body. The door latching mechanism connects the first door to the second door. The door latching mechanism is selectively-connected to the second door relative the body in: a latched-and-closed orientation when the first door is arranged in a closed orientation; the latched-and-closed orientation when the first door transitions from the closed orientation to an open orientation; an unlatched-and-partially open orientation when the first door is arranged in a partially open orientation or the open orientation; and an unlatched-and-open orientation when the first door is arranged in the open orientation.

Implementations of the disclosure may include one or more of the following optional features. In some implementations, the door latching mechanism includes a latch finger and a latch-tip-receiving groove defined by the second door. The latch-tip-receiving groove is sized for receiving the latch finger for selectively-connecting the door latching mechanism to the second door.

In some examples, the door latching mechanism further includes a support panel, a latch plate, a latch wire and a latch portion. The latch plate is rotatably-connected to the support panel. The latch plate defines a first channel and a second channel. The latch wire is movably-disposed within the first channel for connecting the latch wire to the latch plate. The latch portion is movably-disposed within the second channel for connecting the latch portion to the latch plate. The latch portion includes the latch finger.

In other examples, the latch portion is movably-disposed within the second channel relative the latch plate for arranging the latch finger in: a latched orientation relative the latched-and-closed orientation of the second door as the latch plate rotates in a first direction; an unlatched orientation relative the unlatched-and-partially open orientation of the second door as the latch plate transitions from rotating in the first direction to a second direction that is opposite the first direction; and a latch reset orientation relative the unlatched-and-open orientation of the second door as the latch plate rotates in the second direction.

In some instances, the latch plate further defines a pulling pocket extending from the first channel. The latch wire includes a distal portion. The distal portion of the latch wire is movably-disposed for arrangement in: a pulling orientation within the pulling pocket for imparting a pulling force to the latch plate for driving rotational movement of the latch plate in the first direction; a transition orientation from a first arrangement in the pulling pocket to a second arrangement in the first channel; and a non-pulling orientation within the first channel for relieving the pulling force imparted to the latch plate for permitting rotational movement of the latch plate in the second direction.

In other configurations, the door latching mechanism further includes a return spring connected to the latch plate for driving rotational movement of the latch plate in the second direction when the distal portion of the latch wire is movably-disposed for arrangement in the non-pulling orientation within the first channel.

In some examples, the latch wire includes a proximal portion. The proximal portion is connected to a first door movement damping mechanism that damps movement of the first door from the closed orientation to the open orientation.

In other examples, the first door includes a magnet for magnetically securing the top door relative the body in the closed orientation.

In some instances, a spring is disposed adjacent the second door for urging the second door from the latched-and-closed orientation to the unlatched-and-open orientation.

Another aspect of the disclosure includes a method for operating a portion of a crafting apparatus. The method includes: independently rotatably-coupling a first door and a second door to a body; connecting the first door to the second door with a door latching mechanism; arranging the first door in a closed orientation such that the door latching mechanism is maintained in a latched orientation for maintaining the second door in a latched-and-closed orientation relative the body; and transitioning the first door from the closed orientation to an open orientation for imparting movement to the door latching mechanism for arranging the door latching mechanism in an unlatched orientation for permitting the second door to transition from the latched-and-closed orientation relative the body to an unlatched-and-open orientation relative the body.

Implementations of the disclosure may include one or more of the following optional features. In some implementations, after arranging the second door in the latched-and-closed orientation relative the body and prior to arranging the second door in the unlatched-and-open orientation relative the body, the method further includes arranging the second door in an unlatched-and-partially open orientation relative the body when the first door is arranged in a partially open orientation or the open orientation.

In some examples, the method further includes rotatably-connecting a latch plate to a support panel for rotation of the latch plate in a first direction or a second direction. The second direction is opposite the first direction. The latch plate defines a first channel and a second channel. The method further includes movably-disposing a latch wire within the first channel for connecting the latch wire to the latch plate; and movably-disposing a latch portion within the second channel for connecting the latch portion to the latch plate. The latch portion includes a latch finger releasably-engaged with the second door for selectively-arranging the second door in the latched-and-closed orientation relative the body.

In other examples, the latch plate further defines a pulling pocket extending from the first channel. The latch wire includes a distal portion. The second door transitions from the latched-and-closed orientation relative the body to the unlatched-and-open orientation relative the body by utilizing the distal portion of the latch wire for imparting a pulling force to the pulling pocket for driving rotational movement of the latch plate in the first direction.

In some instances, as the second door transitions from the latched-and-closed orientation relative the body to the unlatched-and-open orientation relative the body, the method further includes transitioning the distal portion of the latch wire from a first arrangement in the pulling pocket to a second arrangement in the first channel.

In other instances, after the distal portion of the latch wire transitions to the second arrangement in the first channel, the method further includes withdrawing the latch finger from engagement with the second door and subsequently disengaging the latch finger from the second door for subsequently arranging the second door in the unlatched-and-open orientation relative the body.

In some examples, after the distal portion of the latch wire transitions to the second arrangement in the first channel, the method further includes relieving the pulling force imparted by the distal portion of the latch wire to the latch plate for permitting rotational movement of the latch plate in the second direction for subsequently utilizing a return spring connected to the latch plate for driving rotational movement of the latch plate in the second direction for arranging the latch finger in a latch reset orientation relative the second door that is arranged in the unlatched-and-open orientation relative the body.

The details of one or more implementations of the disclosure are set forth in the accompanying drawings and the description below. Other aspects, features, and advantages will be apparent from the description and drawings, and from the claims.

BRIEF DESCRIPTION OF DRAWINGS

FIG. 1 is a perspective view of an exemplary crafting apparatus.

FIG. 10A is a side view of an exemplary blade-changing kit and a blade connected to a blade housing.

Like reference symbols in the various drawings indicate like elements.

DETAILED DESCRIPTION OF THE INVENTION

Figure 2A:
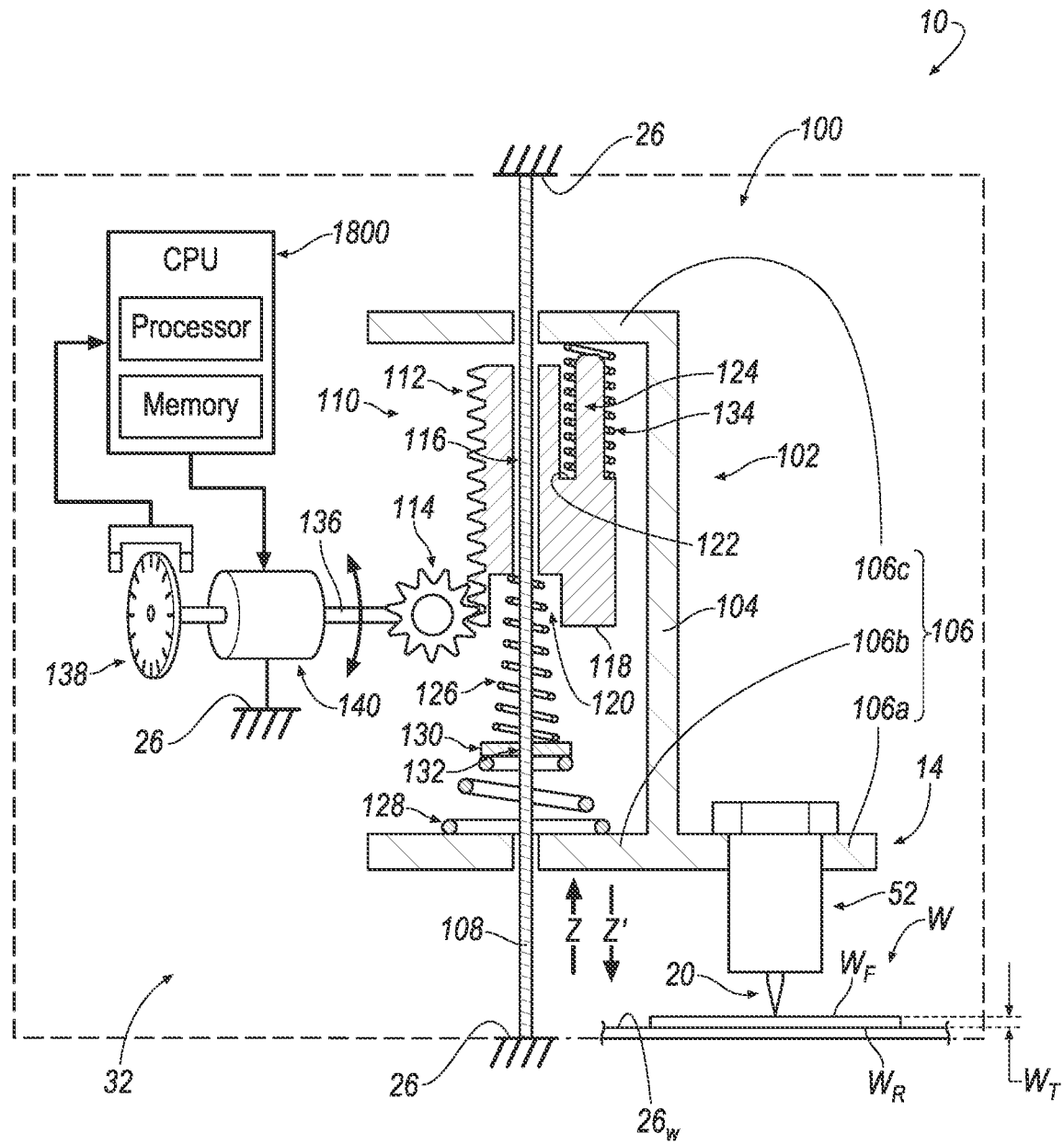
FIG. 2A is a representative view of an exemplary stacked spring assembly of an exemplary cutting device of a crafting apparatus arranged in an expanded orientation.

Referring to FIG. 1, a crafting apparatus is shown generally at 10 that conducts "work" upon a workpiece W (see e.g., FIGS. 2A-2C, 4, 7). The workpiece W may be at least partially disposed within the crafting apparatus 10 in order to permit the crafting apparatus 10 to conduct work on the workpiece W.

The term "work" that is conducted upon the workpiece W may include, but is not limited to, any number of tasks/functions performed by one or a combination of a printing device 12 and a cutting device 14 secured to a carriage 16 that is movably-disposed according to the direction of arrows Y, Y' (in, e.g., a three dimensional X-Y-Z Cartesian coordinate system) upon a member such as a rod 18, bar or shaft. The movement Y, Y' of the carriage 12 along the rod 18 may be controlled by a motor (not shown) that receives actuation signals from a central processing unit (CPU) (see, e.g., 1800 in FIG. 18). The CPU 1800 may be a component of the crafting apparatus and/or is associated with a laptop computer (see, e.g., 1800a in FIG. 18) that is communicatively-coupled to the crafting apparatus 10.

In an example, the "work" may include a "cutting operation" that functionally includes contact of a blade 20 (see, e.g., FIGS. 2A-2C, 4-5, 8, 8A, 8C, 8F-8G, 9A-9B, 10A-10B, 11A-11B) of the cutting device 14 with the workpiece W. The work conducted by the cutting device 14 arises from movement of the cutting device 14 according to the direction of arrows Z, Z' (see, e.g., FIGS. 2A-2C, 4) in, e.g., the three dimensional X-Y-Z Cartesian coordinate system relative to, for example, one or more of the carriage 12 and the rod 18. The movement Z, Z' of the cutting device 14 may be controlled by one or more motors (see, e.g., 140, 206, 218 in FIGS. 2A-2C, 4) that receive actuation signals from the central processing unit CPU 1800.

Figure 2B:
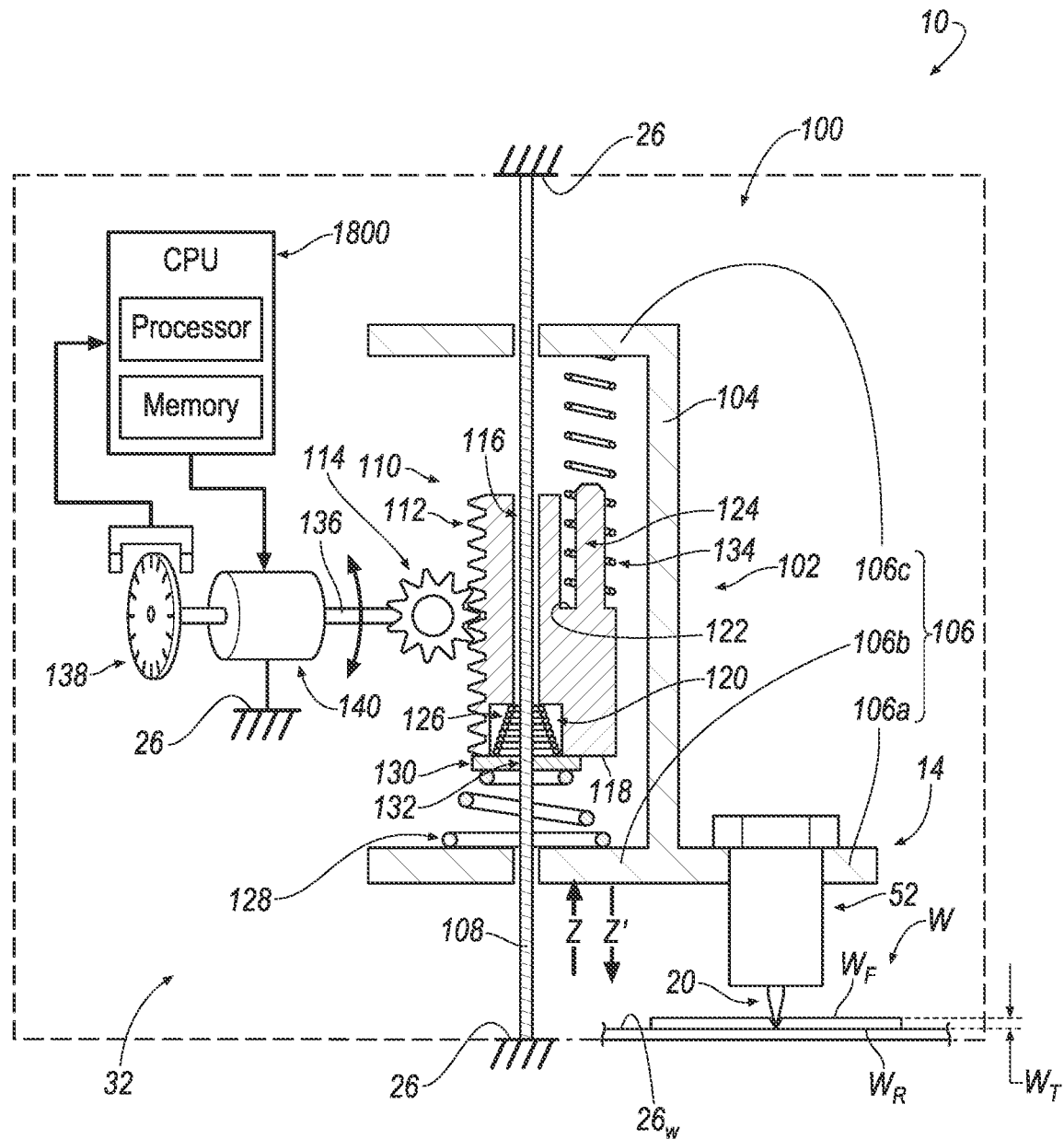
FIG. 2B is another representative view of the exemplary stacked spring assembly of FIG. 2A arranged in a partially compressed orientation.
Figure 2C:
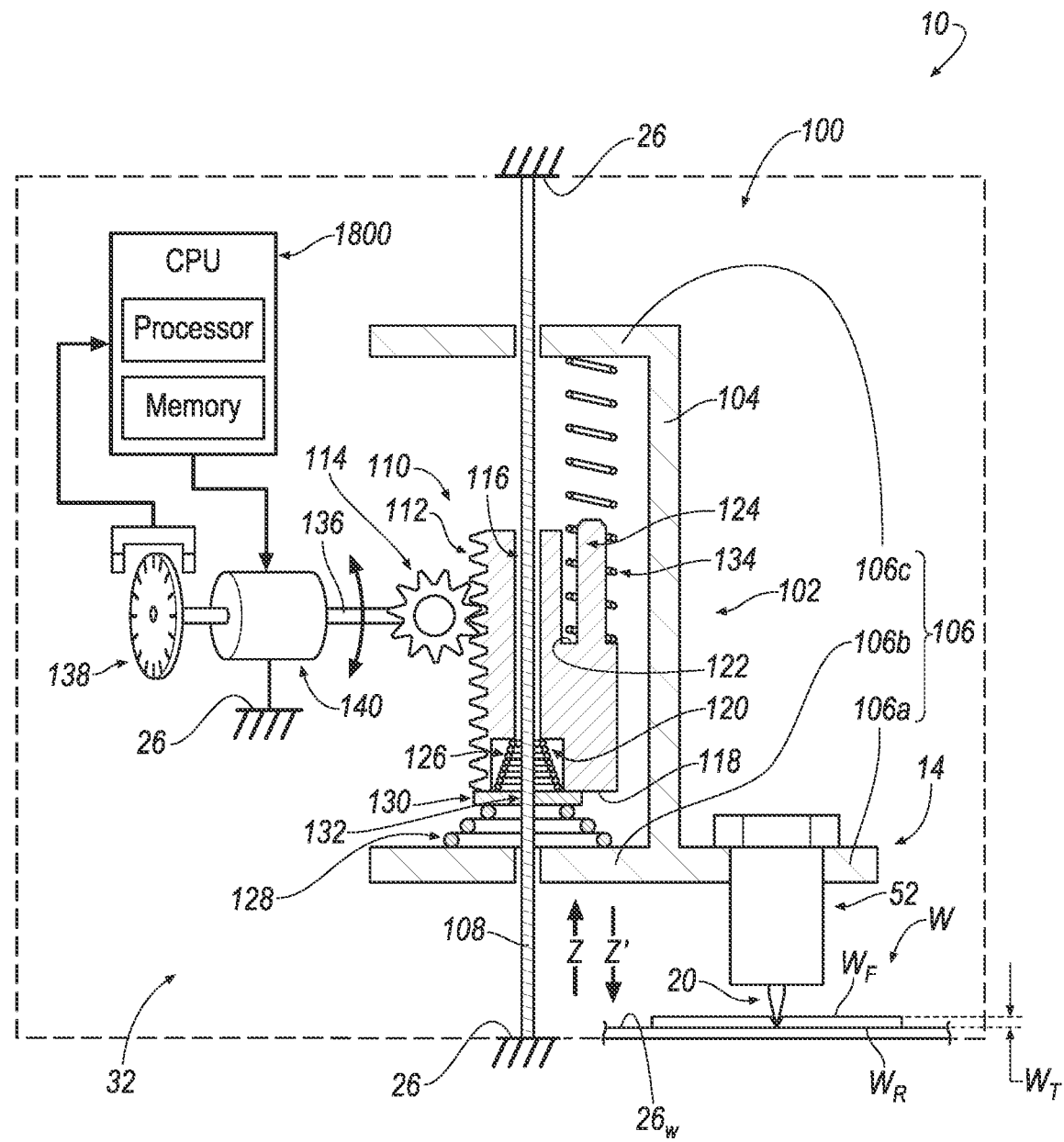
FIG. 2C is another representative view of the exemplary stacked spring assembly of FIG. 2B arranged in a compressed orientation.

In some implementations, as seen in, for example, FIGS. 2B-2C, the blade 20 partially or fully penetrates a thickness WT (see, e.g., FIGS. 2A-2C) of the workpiece W according to the direction of the arrow Z'. The thickness WT of the workpiece W may be said to be bound by a first, front surface WF and a second, rear surface WR. Although the foregoing description is directed to the use of a blade 20 (such as, e.g., a straight blade, a castoring blade, a rotary blade, a serrated edge blade, an embossing tool, a marking tool or the like), other cutting devices may be utilized instead of a blade 20. Other cutting devices may include a laser, an electrically-powered rotary cutter, or the like. In some implementations, the "work" includes a printing operation. The printing operation may including depositing ink from a nozzle of the printing device 12 onto one or more of the first, front surface WF of the workpiece W and the second, rear surface WR of the workpiece W.

The crafting apparatus 10 may conduct work in a manner that provides a combo operation such as a print and cut operation. The "print and cut operation" may in some instances be executed as a "print then cut" operation such that the printing operation is conducted prior to the cutting operation.

In some implementations, the workpiece W includes any desirable shape, size, geometry or material composition. The shape/geometry may include, for example, a square or rectangular shape. Alternatively, the shape may include non-square or non-rectangular shapes, such as circular shapes, triangular shapes or the like. The material composition of the workpiece W may include paper-based (e.g., paperboard or cardboard) and/or non-paper-based products (e.g., vinyl, foam, rigid foam, cushioning foam, plywood, veneer, balsawood or the like). Nevertheless, although various implementations of workpiece material composition may be directed to paper, vinyl or foam-based products, the material composition of the workpiece W is not limited to a particular material and may include any cuttable material.

In some implementations, the crafting apparatus 10 may be utilized in a variety of environments when conducting work on the workpiece W. For example, the crafting apparatus 10 may be located within one's home and may be connected to an external computer system (e.g., a desktop computer, a laptop computer 1800a, a dedicated/non-integral/dockable [standalone] controller device which is not a general purpose computer or the like) such that a user may utilize software that may be run by the external computer system 1800a in order for the crafting apparatus 10 to conduct work on the workpiece W. In another example, the crafting apparatus 10 may be referred to as a "stand alone system," in some implementations, that integrally includes one or more of an on-board monitor, an on-board keyboard, an on-board CPU 1800 including a processor, memory and the like. In such an implementation, the crafting apparatus 10 may operate independently of any external computer systems (e.g., the laptop 1800a) in order to permit the crafting apparatus 10 to conduct work on the workpiece W.

The crafting apparatus 10 may be implemented to have any desirable size, shape or configuration. For example, the crafting apparatus 10 may be sized to work on a relatively large workpiece W (e.g., plotting paper). Alternatively, the crafting apparatus 10 may be configured to work on a relatively small workpiece W. In implementations where the crafting apparatus 10 operates independently of an external computer system and is sized to work on relatively small workpieces, the crafting apparatus 10 may be said to be a "portable" crafting apparatus 10. Accordingly, the crafting apparatus 10 may be sized to form a relatively compact shape/size/geometry that permits a user to easily carry/move the crafting apparatus 10 from one's home, for example, to a friend's home where the friend may be hosting, for example, a "scrap-booking party."

In the example shown in FIG. 1, the crafting apparatus 10 includes a body 22 defined by an exterior surface 24 and an interior surface 26. The interior surface 26 may partially define a workpiece support surface 26W that supports the workpiece W.

The exterior surface 24 and the interior surface 26 meet at an edge 28 that defines an access opening 30 to an interior compartment 32 defined by the interior surface 26 of the body 22.

As seen in FIG. 1, some of the interior compartment 32 may be accessible to a user, and, as such, some components (e.g., the printing device 12, the cutting device 14, the carriage 16, the rod 18 and the like) may be viewable and accessible to a user; in such an instance, access to the interior compartment 32 permits a user to interface the workpiece W with the printing device 12, the cutting device 14, the carriage 16, the rod 18 and the like. In other instances, some components (e.g., the CPU 1800) may be supported by or connected to another portion of the interior surface 26 of the interior compartment 32 that is not viewable or accessible to the user.

Access to the viewable or accessible portion of the interior compartment 32 that houses one or more working components (e.g., the printing device 12 and the cutting device 14) that perform work (e.g., printing and/or cutting) on the workpiece W may result from an opened or closed orientation of one or more doors 34, 36 that are movably-coupled to the body 22. In an example, the doors 34, 36 are independently pivotally coupled to the body 22 for independent arrangement in one of a closed orientation and an open orientation (e.g., the door 36 may be selectively-arranged in a closed orientation while the door 34 is selectively-arranged in an open orientation).

The one or more doors 34, 36 may include a first door 34, which may be alternatively referred to as an upper door or top door. The one or more doors 34, 36 may include a second door 36, which may be alternatively referred to as a front door.

The front door 36 includes an exterior surface 38, an interior surface 40, a first side surface 42, a second side surface 44 and a top surface 46. When the front door 36 is arranged in an open orientation as seen in FIG. 1, the interior surface 40 of the front door 36 may be aligned with and cooperate with the workpiece support surface 26W in order to partially function as an extension of the workpiece support surface 26W. The first side surface 42 and the second side surface 44 extend between the exterior surface 38 and the interior surface 40.

Figure 16A:
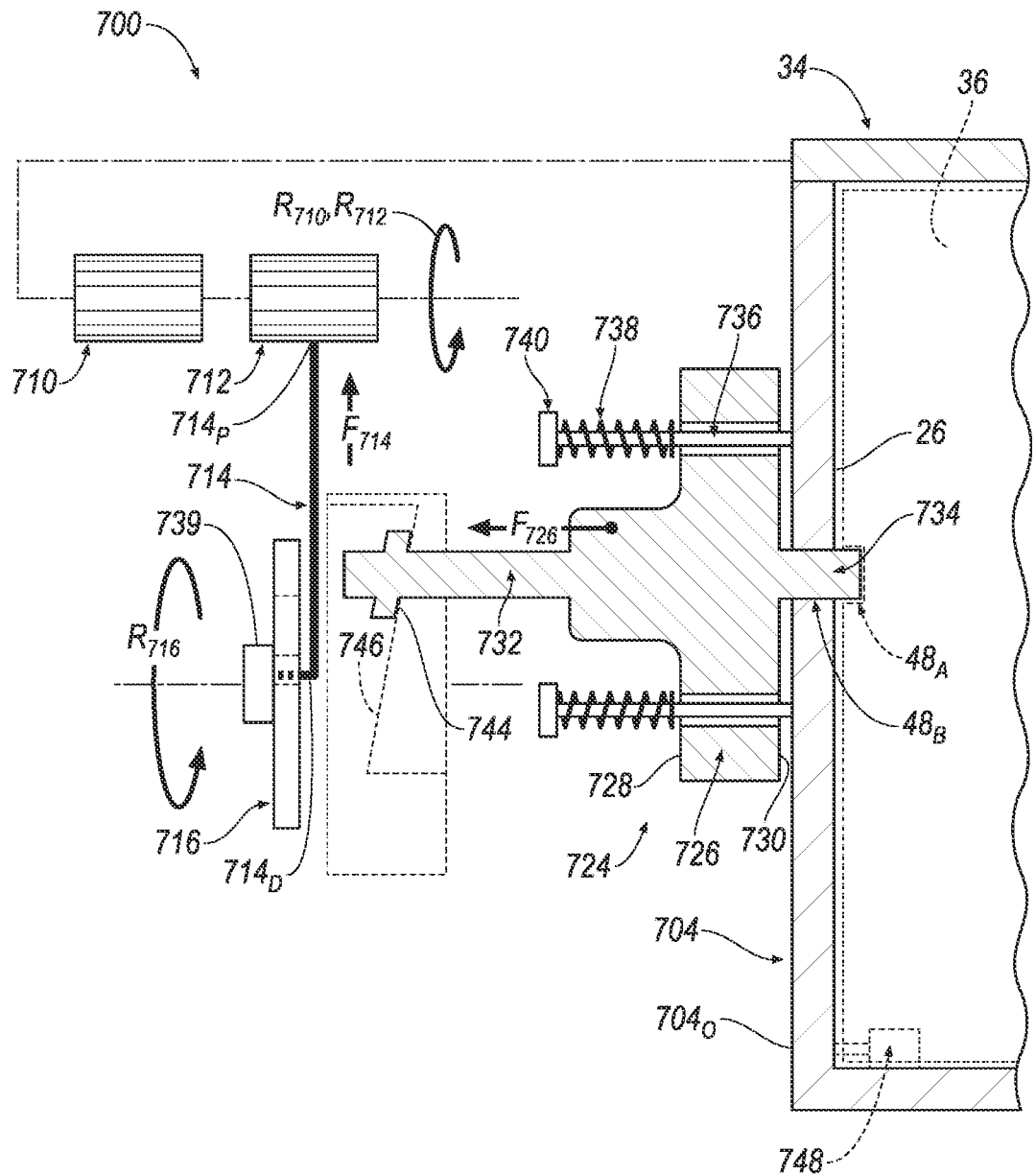
FIG. 16A is a representative front view of the crafting apparatus including the door latching mechanism connected to the top door and the front door of FIGS. 12A-12F whereby the door latching mechanism is arranged in a first state and the top door is arranged in a closed orientation while the front door is arranged in a latched-and-closed orientation.

A latch-tip-receiving groove 48A (see also, e.g., FIGS. 16A-16D) is formed by the first side surface 42 of the front door 36 near the top surface 46 of the front door 36. The latch-tip-receiving groove 48A is aligned with a latch-tip-receiving passage 48B, which, in an example, may be formed by the interior surface 26 of the body 22 of the interior compartment 32. Furthermore, the latch-tip-receiving passage 48B may also or alternatively be defined by a support panel (see, e.g. 704 in FIGS. 16A-16D), which may also be defined by the body 22; in some instances, the support panel 704 may include an outer surface 7040 and the interior surface 26. As seen in FIG. 16A, when the front door 36 is arranged in a closed orientation, the latch-tip-receiving groove 48A and the latch-tip-receiving passage 48B are aligned such that a latch finger 734 of a latch portion 724 of a front door latching mechanism 700 may be selectively-extended through the latch-tip-receiving groove 48A and the latch-tip-receiving passage 48B for latching the front door 36 in a closed orientation relative the body 22. Operation of the front door latching mechanism 700 will be described in greater detail in the following disclosure.

As described above, a user may insert the workpiece W into the crafting apparatus 10 by way of the opening 30. After the crafting apparatus 10 has conducted work on the workpiece W, the user may remove the workpiece W from the crafting apparatus 10 by way of the opening 30.

In an example, after the user interfaces the workpiece W with, for example, a feed roller 50 rotatably-coupled to the interior surface 26 of the interior compartment 32, the CPU 1800 sends actuation signals to a feed roller motor (not shown) for advancing the workpiece W into or out of the interior compartment 32 according to feed directions X, X' in, for example, the three dimensional X-Y-Z Cartesian coordinate system relative to, for example, one or more of the carriage 12 and the rod 18. Advancement of the workpiece W according to the feed directions X, X' may be conducted alone or in combination with the movement Y, Y' of the carriage 12 along the rod 18 and/or the movement of the cutting device 14 according to the direction of arrows Z, Z' in order to conduct work on the workpiece W.

In an example, engagement of the cutting device 14 with the workpiece W may be controlled by a stacked spring assembly, which is seen generally at 100 in FIGS. 2A-2C. The stacked spring assembly 100 includes a base member 102 that supports the blade 20 that is disposed within a blade housing 52. The base member 102 is adjustable in a lifting direction Z and an opposite cutting direction Z' in order to lift the blade 20 away from the front surface WF of the workpiece W or drive the blade 20 into the front surface WF of the workpiece W.

The base member 102 may include a base flange 104 and a plurality of flanges 106 extending from the base flange 104. The plurality of flanges 106 may include a first flange 106a, a second flange 106b and a third flange 106c. The first flange 106a supports the blade housing 52. A support rod 108 extends through an axial passage formed by each of the second flange 106b and the third flange 106c and slidably-supports each of the second flange 106b and the third flange 106c for permitting the base member 102 to move relative the support rod 108 in each of the lifting direction Z and the cutting direction Z'. Opposite ends of the support rod 108 are directly or indirectly secured to the interior surface 26 of the body 22.

The stacked spring assembly 100 also includes a rack-and-pinion drive mechanism 110 including a rack 112 and a pinion 114. The rack 112 is located between the second flange 106b and the third flange 106c. Furthermore, the support rod 108 extends through an axial passage 116 formed by the rack 112 such that the rack 112 may be driven by the pinion 114 in order to move the rack 112 relative the support rod 108 in each of the lifting direction Z and the cutting direction Z' depending on the clockwise or counter-clockwise rotation of the pinion 114.

A lower surface 118 of the rack 112 may define a spring-receiving cavity 120. A balance spring support member 124 may extend from an upper surface 122 of the rack 112.

The stacked spring assembly 100 also includes a first spring 126, a second spring 128 and a washer 130 separating the first spring 126 from the second spring 128. The support rod 108 extends through an axial passage of each of the first spring 126 and the second spring 128. Furthermore, the support rod 108 extends through an axial passage 132 of the washer 130.

An upper end of the first spring 126 is disposed adjacent the lower surface 118 of the rack 112 and is arranged within the spring-receiving cavity 120 of the rack 112. A lower end of the first spring 126 is disposed adjacent an upper surface of the washer 130.

An upper end of the second spring 128 is disposed adjacent a lower surface of the washer 130. A lower end of the second spring 128 is disposed adjacent an upper surface of the second flange 106b.

The stacked spring assembly 100 also includes a balance spring 134. An upper end of the balance spring 134 is disposed adjacent a lower surface of the third flange 106c. A lower end of the balance spring 134 is disposed adjacent an upper surface 122 of the rack 112. The balance spring support member 124 may partially extend through an axial passage of the balance spring 134.

The balance spring 134 may assist in biasing low-end forces for broader transition between high and low end forces that counteracts the weight of the stacked spring assembly 100 itself. Accordingly, inclusion of the balance spring 134 maintains the low end of the forces of or both of the first spring 126 and the second spring 128. In an example, if, for example, the stacked spring assembly 100 weighs about 100 grams and, if, for example, about 90 grams of cutting force according to the direction of arrow Z' is needed, the balance spring 134 helps achieve a margin between about 50 grams and 100 grams.

The stacked spring assembly 100 also includes a drive shaft 136 having a first end connected to the pinion 114 and a second end connected to an encoder 138. The drive shaft 136 is driven by a motor 140. The encoder 138 and the motor 140 are communicatively-connected to the CPU 1800. The CPU 1800 may serve as a motor controller for rotating the drive shaft 136 in a first rotational direction or a second rotational direction for causing corresponding rotation to the pinion 114. The encoder 138 may provide a feedback signal to the CPU 1800 in order to specify an amount of rotation of the drive shaft 136. One or more of the drive shaft 136, the encoder 138, the motor 140 and the CPU 1800 may be directly or indirectly connected to the interior surface 26 of the body 22 of the crafting apparatus 10.

In an embodiment, first spring 126 may be referred to as a "light spring" and the second spring 128 may be referred to as a "heavy spring." In an embodiment, one or both light spring 126 and the heavy spring 128 are non-linear springs or variable rate springs so that the cutting device 14 is able to provide different spring constants for different cutting forces imparted to the blade 20 according to the direction of arrow Z'. In an example, the light spring 126 may provide a lower spring constant at lower cutting forces according to the direction of arrow Z' whereas the heavy spring 128 provides a higher spring constant at the higher forces according to the direction of arrow Z'.

In an example, if the workpiece W is formed from vinyl or an iron-on material, the light spring 126 will be compressed to provide a lower cutting force according to the direction of arrow Z' in order to compensate for sensitive changes in the cutting force Z' that might be introduced by, for example, an uneven workpiece support surface 26W or minor misalignment between the workpiece support surface 26W and the rod 18. In the force-distance graph of FIG. 3, both light spring 126 and heavy spring 128 are variable rate springs; in such an implementation, this can be detected from the graph because a first piecewise portion of the graph (see, e.g., the bracketed portion of the graph associated with reference numeral 126) attributable to the light spring 126 is slightly arcuate as is a second piecewise portion of the graph (see, e.g., the bracketed portion of the graph associated with reference numeral 128) relating to heavy spring 128.

Accordingly, the use of linear springs in such an implementation would not provide these arcuate segments but, rather, would generate linear segments.

When low to moderate forces are exerted on light spring 126 resulting from rotation of the pinion 114 and corresponding movement Z, Z' rack 112, the light spring 126 controls the downward force (according to the cutting direction Z') exerted onto the blade 20. However, as seen in FIG. 2B, when the rack-and-pinion drive mechanism 110 exerts moderate to heavy downward forces onto light spring 126 (according to the cutting direction Z'), the light spring 126 collapses or "bottoms-out" into the cavity 120 of the rack 112 (see, e.g., FIG. 2B). Once the light spring 126 has completely collapsed into the cavity 120, the washer 130 engages the lower surface 118 of the rack 112 thereby causing the washer 130 to bottom out against the rack 112. With reference to FIG. 2C, once the washer 130 has bottomed out against the rack 112, the light spring 126 cannot be compressed any further, and, as such, any further downward force exerted by the rack-and-pinion drive mechanism 110 (according to the cutting direction Z') causes the heavy spring 128 to compress and exert a downward force (according to the cutting direction Z') on the blade 20. The heavy spring 128 thereafter will provide a spring constant having a higher range in force according to the direction of arrow Z' that is less sensitive to changes in forces resulting from, for example, an uneven workpiece support surface 26W or minor misalignment between the workpiece support surface 26W and the rod 18. The heavy spring 128 therefore provides a stiffer spring for the cutting device 14 once the light spring 126 collapses or "bottoms-out" into the cavity 120.

Figure 3:
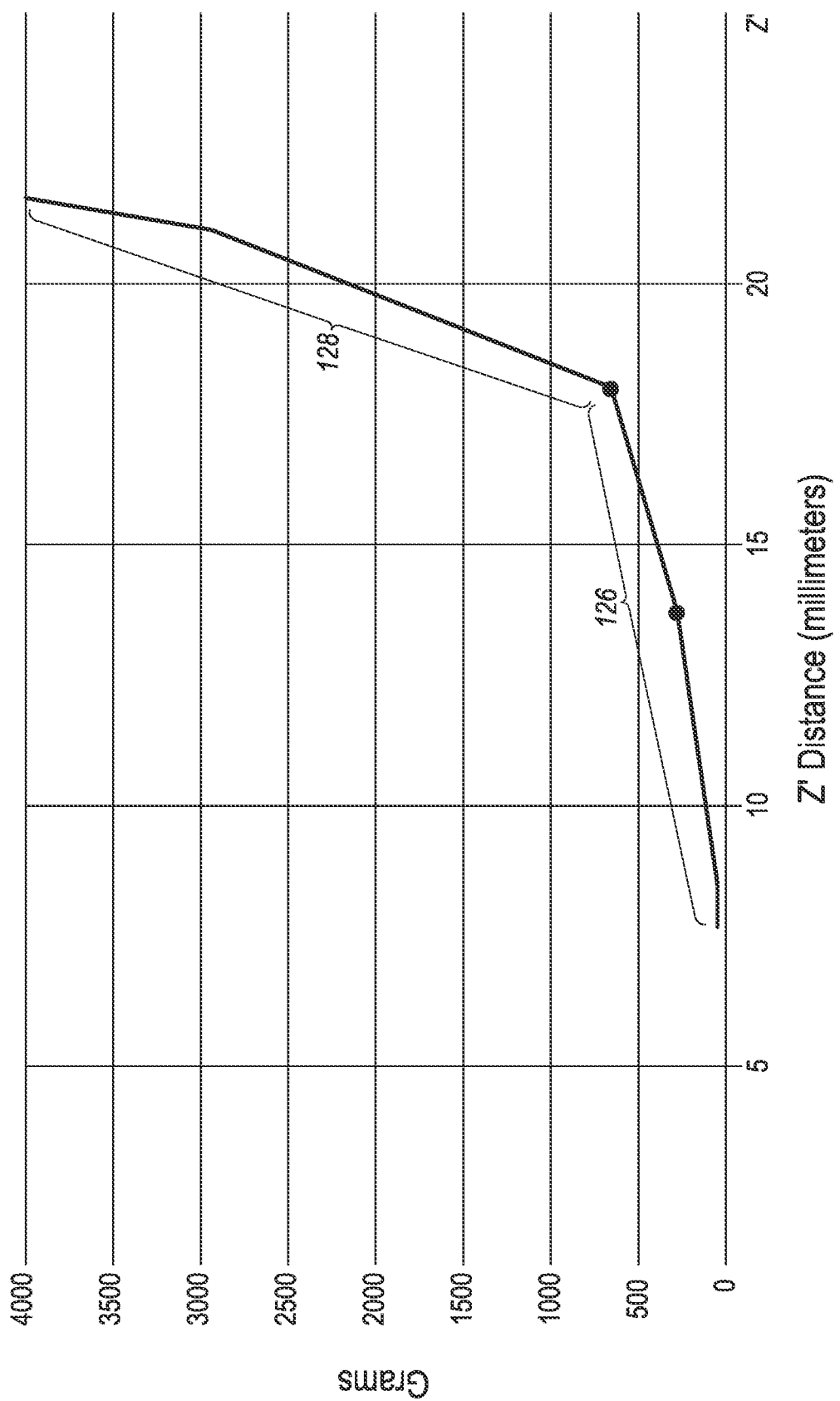
FIG. 3 is an exemplary force-distance graph associated with the stacked spring assembly of FIGS. 2A-2C.

As the rack-and-pinion drive mechanism 110 exerts the downward force according to the cutting direction Z', the rotational feedback of the drive shaft 136 provided by the encoder 138 may provide the CPU 1800 with a feedback signal that may be correlated with "Z position" information of the blade 20 in a lookup data table stored in memory of the CPU 1800. Referring to FIG. 3, the "Z position" information may be, for example, a travel distance in terms of mm of the blade 20. The "Z position" travel distance may correspond to grams of force imparted by the blade 20 into the front surface WF of the workpiece W.

According to the curve represented in FIG. 3, when the blade 20 travels between approximately 0 mm and approximately 18 mm, the washer 130 does not engage the lower surface 118 of the rack 112, and, as such, an amount of force imparted by the blade 20 to the workpiece W may be between approximately about 0 grams and approximately about 500 grams. When the blade 20, however, travels at a distance greater than approximately about 18 mm, the light spring 126 cannot be compressed any further; thereafter, a "knee" of the curve is clearly shown whereby there is a transition from the light spring 126 to the heavy spring 128 for controlling the downward force according to the cutting direction Z' experienced by blade 20. When the blade 20 travels at a distance greater than 18 mm, forces imparted to the workpiece W may be greater than approximately about 500 grams, and, in some instances, up to about 4 kilograms.

The use of two springs 126, 128 "in series" as described above dramatically increases the range at which the downward force (per unit travel) according to the cutting direction Z' can be controlled by the crafting apparatus 10. For example, when a relatively thin workpiece W is to be cut by the blade 20, the amount of downward force according to the cutting direction Z' needed for making the cut may be referred to as a "light cut." Accordingly, the light spring 126 is at least partially compressed for cutting such workpieces W without causing the workpiece W to tear or rip. Conversely, thicker materials such as, for example, wood veneers, card stock, leather, and the like may require the blade 20 to generate downward forces greater than approximately about 500 grams.

Figure 4:
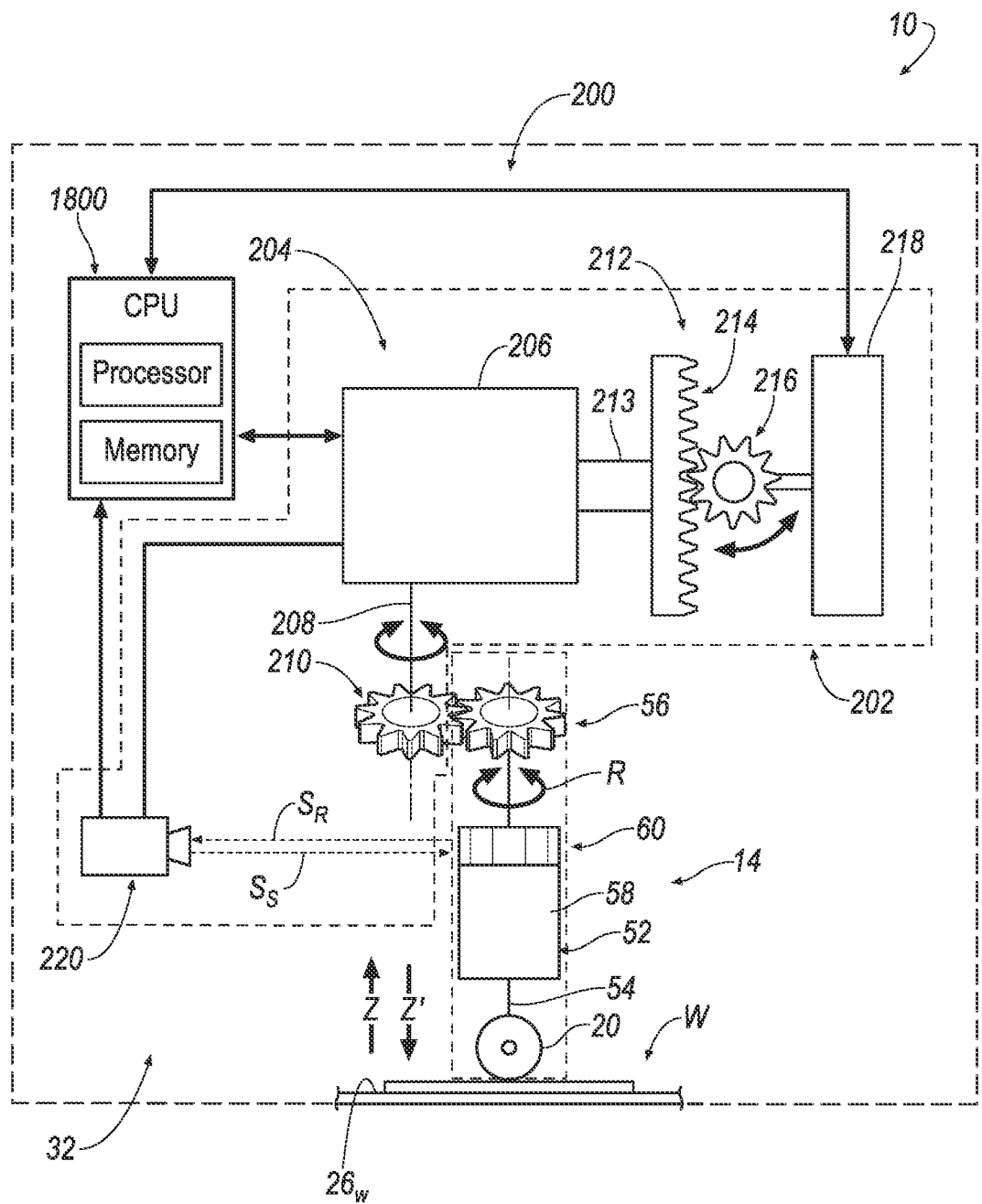
FIG. 4 is a representative view of an exemplary blade orientation and identification system of an exemplary cutting device of a crafting apparatus.

In an example, rotation (see, e.g., R in FIG. 4) of the cutting device 14 and an amount of cutting force (according to the direction of arrow Z') of the cutting device 14 with the workpiece W may be controlled by a blade orientation and identification system, which is seen generally at 200 in FIG. 4. The blade orientation and identification system 200 includes a housing 202 that supports the cutting device 14. The CPU 1800 is communicatively-coupled to the blade orientation and identification system 200. The cutting device 14 includes: the blade 20; a blade housing 52 connected to the blade 20; a shaft 54 connected to the blade 20 and extending through the housing 52; and a driven gear 56 connected to the shaft 54. In other examples, the blade 20 may be connected to the blade housing 52 with a fastener 54 or 606 (see e.g., 606 in FIGS. 11A-11B) and the driven gear 56 may include a shaft connected to the blade housing 52.

The blade 20 may be defined by a particular style or design (e.g., a straight blade, a castoring blade, a rotary blade, a serrated edge blade, an embossing tool, a marking tool or the like). As will be described in greater detail in the following disclosure, an exterior surface 58 of the blade housing 52 may define a unique appearance or structural configuration that is exclusively associated with the particular style or design of the blade 20 associated with the blade housing 52.

Furthermore, as will be described in the following disclosure, operation of the blade orientation and identification system 200 is dependent upon the CPU 1800 determining the appearance or structural configuration of the exterior surface 58 of the blade housing 52. Yet even further, the CPU 1800 may also exploit the determined appearance or structural configuration of the exterior surface 58 of the blade housing 52 to determine the rotational state of the blade housing 52 when the blade 20 is cutting the workpiece W.

In an example, the housing 202 includes a blade housing rotating mechanism 204. The blade housing rotating mechanism 204 may include a motor 206 that rotates a shaft 208 that is connected to a drive gear 210. The drive gear 210 is connected to the driven gear 56 of the cutting device 14 for rotating R the blade 20 about an axis.

The driven gear 56 of the blade housing 52 may be not be directly driven (i.e., the blade housing 52, which may include the driven gear 56, can be installed, taken out and reinstalled such that the blade housing 52 is detachably fixed to the blade orientation and identification system 200, which includes the drive gear 210, that rotates the blade housing 52). In an example, the drive gear 210 may generally represent a gear train that rotates the driven gear 56 of the blade housing 52. The gear train 210 may include one or more of a combination of spline gears, worm gears and the like.

The motor 206 may be a DC motor with an encoder. Alternatively, the motor 206 may be a stepper motor with an encoder; however, resolution may be limited by using a stepper motor if steps are skipped during operation of the stepper motor.

The housing 202 may also include a blade housing lifting-lowering mechanism 212. The blade housing lifting-lowering mechanism 212 may be connected to the blade housing rotating mechanism 204 by a joining member or coupling, which is seen generally at 213. In an example, the blade housing lifting-lowering mechanism 212 may include a rack-and-pinion drive mechanism including a rack 214 and a pinion 216. The pinion 216 may be driven by a stepper motor 218.

Depending on the clockwise or counter-clockwise rotation of the pinion 216, the rack 214, which may be connected to, for example, the motor 206 of the blade housing rotating mechanism 204 by the coupling 213, is raised or lowered according to the lifting direction Z or the cutting direction Z' for providing a corresponding lifting or lowering motion to the blade 20 relative a workpiece W.

A rotation sensor 220 is also attached to the housing 202. The housing 202 may be attached to carriage 16, and, as such, the rotation sensor 220 may be said to be attached to the carriage 16. The rotation sensor 220 includes, for example, an optical sensor including an optical signal generator that generates a signal SS and an optical signal receiver that receives a reflection of the generated signal SS (see, e.g., a reflected signal SR in FIG. 4). The rotation sensor 220 can comprise any known optical sensor technology. For example, the rotation sensor 220 is not limited to an optical-type sensor device and may alternatively include other sensor devices such as, for example, a magnetic pick up sensor, a capacitive sensor, an LVDT sensor, an inductive sensor, or any combination thereof.

The CPU 1800 is effective for issuing commands to blade housing rotating mechanism 204 and blade housing lifting-lowering mechanism 212. In an example, the CPU 1800 may send a signal to the motor 206 of the blade housing rotating mechanism 204 for causing the gear train 210 to rotate R the blade 20 about the axis (i.e., a Z axis) extending through the length of the shaft 54. Furthermore, in another example, the CPU 1800 may send a signal to the stepper motor 218 of the blade housing lifting-lowering mechanism 212 for causing the blade 20 to be lifted (according to the direction of arrow Z) or lowered (according to the direction of arrow Z') about the axis (i.e., a Z axis) extending through the length of the shaft 54.

Figure 5:
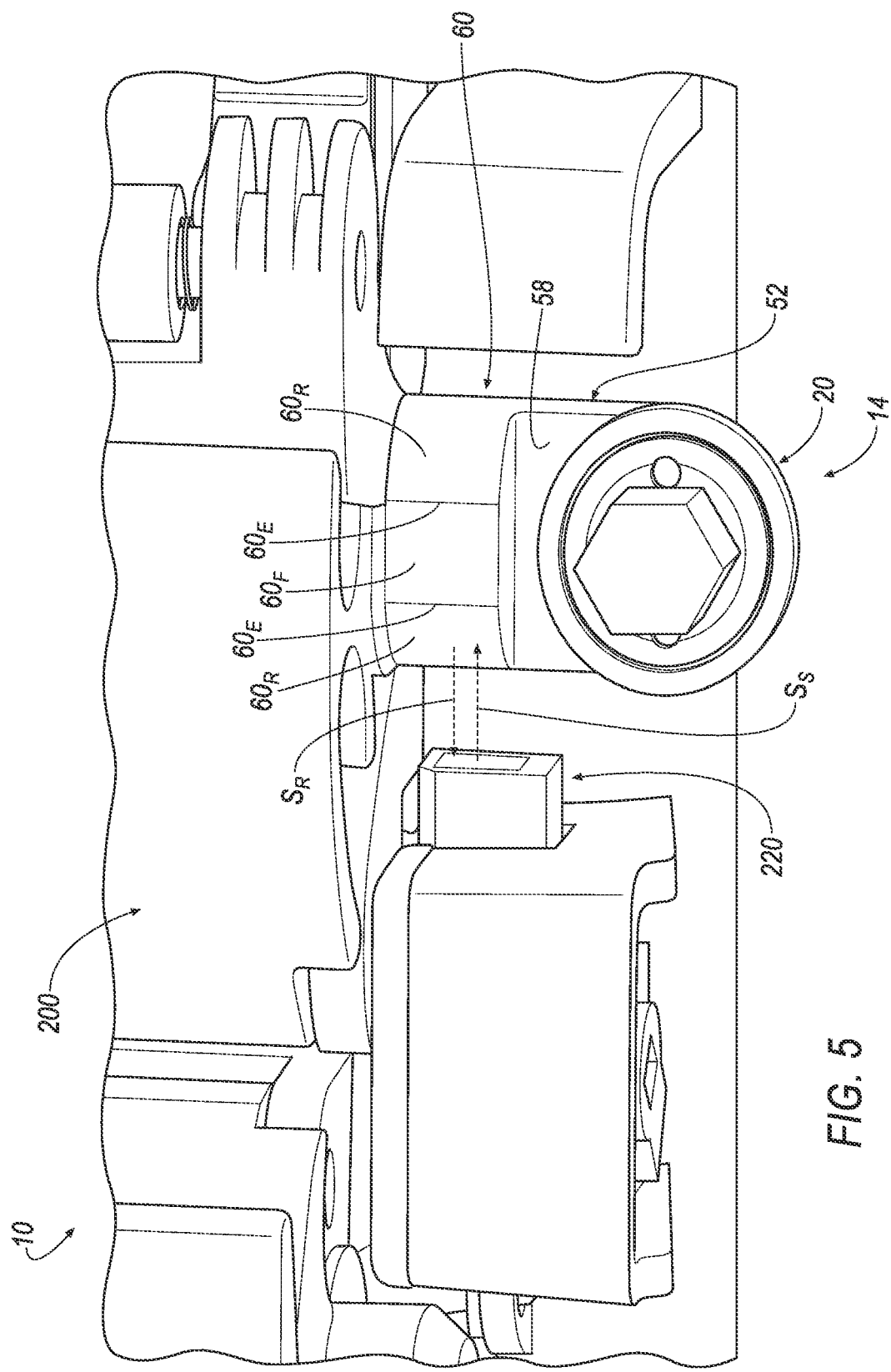
FIG. 5 is a side view of a portion of the blade orientation and identification system of FIG. 4

As seen in FIGS. 4-5, the rotation sensor 220 is aligned with a portion of the exterior surface 58 of the blade housing 52 that includes a circumferential band of one or more surface portions 60. As seen in, for example, FIG. 5, the circumferential band of one or more surface portions 60 includes one or more rounded surface portions 60R and one or more non-rounded, flat surface portions 60F each separated by an edge portion 60E).

Figure 6:
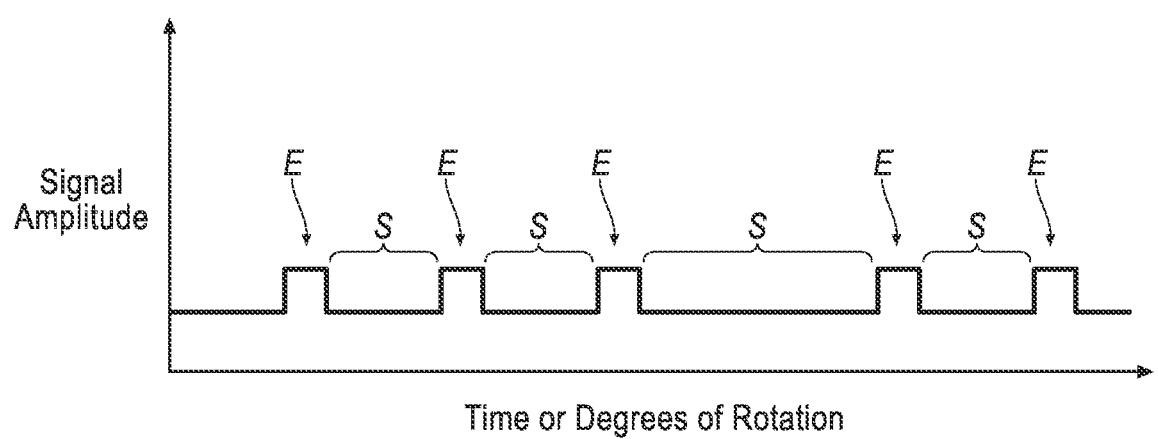
FIG. 6 is an exemplary signal-amplitude graph associated with the blade orientation and identification system of FIG. 4.

As the blade housing rotating mechanism 204 rotates the blade housing 52, the rotation sensor 220 may direct the generated optical signal SS toward the circumferential band of one or more surface portions 60 of the blade housing 52. The one or more rounded surface portions 60R and one or more non-rounded, flat surface portions 60F reflect SR the generated optical signal SS back toward the rotation sensor 220, which is communicatively-coupled to the CPU 1800, and, as a result, the CPU 1800 receives a signal from the optical sensor 220 indicating the reflection SR of the generated signal SS. However, the edge portion 60E between each rounded surface portions 60R and non-rounded, flat surface portions 60F does not reflect the generated optical signal SS back to the rotation sensor 220; in such instances, the rotation sensor 220 may similarly inform the CPU 1800 that the reflected signal SR has been interrupted when an edge portion 60E of the circumferential band of one or more surface portions 60 is arranged opposite the rotation sensor 220 as a result of the rotation R of the blade housing 52 by the blade housing rotating mechanism 204. Referring to FIG. 6, the reflection (see, e.g., segments of a signal-amplitude graph bracketed by the reference letter "S") and non-reflection or interruption (see, e.g., segments of the signal amplitude graph bracketed by reference letter "E") of the generated optical signal SS is communicated to the CPU 1800 and stores the information in terms of signal amplitude over time.

The CPU 1800 may store, in memory, unique reflection signatures for a plurality of blade housings 52 where each blade housing 52 of the plurality of blade housing include a unique blade style/design. Upon a partial or full rotation of the blade housing 52 by the blade housing rotating mechanism 204, the rotation sensor 220 may communicate the generated signal pattern of FIG. 6 to the CPU 1800 such that the CPU 1800 may compare the generated signal pattern against the plurality of unique reflection signatures stored in memory of the CPU 1800 for identifying the blade housing 52 (and corresponding style/design of the blade 20) that is interfaced with the housing 202 of the blade orientation and identification system 200.

In an example, one of the one or more non-rounded, flat surface portions 60F may be defined by a "home flat." In another example, one or more of the one or more non-rounded, flat surface portions 60F may be defined by one or more "tool ID flats." In an example, the home flat may be longer than each of the one or more tool ID flats. In use, when the optical signal is reflected off of the home flat, the signal received by the CPU 1800 is therefore longer in comparison to the tool ID flats. As a result, the home flat may assist the CPU 1800 in determining a reference position or an absolute position of the blade housing 52. The one or more tool ID flats of each blade housing 52 may defined by unique patterns or lengths in order to identify a particular style or design of blade associated with the blade housing 52.

In an example, if a user of the crafting apparatus 10 is going to cut a fabric workpiece W, and, a rotary style/design blade 20 is known to be utilized for cutting the fabric workpiece W, the user will select and interface a rotary style/design blade 20 (having a unique pattern of one or more rounded surface portions 60R and one or more non-rounded, flat surface portions 60F) with the crafting apparatus 10; as such, when the blade orientation and identification system 200 rotates the blade housing 52, the unique pattern of one or more rounded surface portions 60R and one or more non-rounded, flat surface portions 60F of the blade housing 52 that includes the rotary style/design blade 20 is received by the CPU 1800 and matched with a unique signal signature from the look-up table in the memory of the CPU 1800. Therefore, as a result of the blade housing rotating mechanism 204 rotating the blade housing 52, the CPU 1800 identifies which blade housing 52 (and corresponding style/design of the blade 20 associated therewith) is interfaced with the crafting apparatus 10 such that the crafting apparatus 10 may automatically determine an amount of cutting force (according to the direction of arrow Z') that is associated with the rotary style/design of the blade 20 associated with the blade housing 52. In other examples, if, for example, the user is cutting wood, the user may interface a blade housing 52 (having a unique pattern of one or more rounded surface portions 60R and one or more non-rounded, flat surface portions 60F) that carries a knife blade 20, and, as similarly described above, the crafting apparatus 10 may automatically determine an amount of cutting force (according to the direction of arrow Z') that is associated with the knife style/design blade 20 associated with blade housing 52.

Accordingly, when the blade housing rotating mechanism 204 rotates the blade housing 52, the rotation sensor 220 may receive an interrupted reflected signal pattern SR that is communicated to the CPU 1800 in the form of an electrical signal. Upon receiving the signal at the CPU 1800, the CPU 1800 may compare the received signal against known signal signatures in a look-up table stored in memory of the CPU 1800. Once CPU 1800 finds a match, the CPU can access any information in memory relating to the particular blade housing 204 and/or style/design of the blade 20 associated therewith.

Furthermore, the above-described methodology associated with the blade housing rotating mechanism 204 and rotation sensor 220 is also effective for identifying or tracking a rotational orientation R of the blade 20. For example, the CPU 1800 can track a rotated orientation of the blade housing 52 in a way that positively identifies the orientation of the blade 20 that is associated with the blade housing 52. In an example, the one or more rounded surface portions 60R and one or more non-rounded, flat surface portions 60F each separated by an edge portion 60E can each be defined to have various lengths whereby a longest flat of the one or more non-rounded, flat surface portions 60F could be used to index the plane in which the blade housing 52 rotates (e.g., the plane of the longest flat is parallel to the plane of a rotary cutting blade). Accordingly, once CPU 1800 receives the interrupted reflected signal pattern SR generated by rotation sensor 220 as described above, the CPU 1800 will have sufficient information to know an orientation of the blade 20 at a particular instance of rotation of the blade housing 52.

In an alternative embodiment, rather than forming or fastening geometric flat regions 60 on the blade housing 52 defined by one or more rounded surface portions 60R and one or more non-rounded, flat surface portions 60F each separated by an edge portion 60E, the same end result can be accomplished by, for example, placing painted markings on blade housing 52. In an embodiment, the blade housing rotating mechanism 204 is capable of rotating blade housing 52 through any number of complete circles (i.e., 360°, 720°, etc.). In an embodiment, blade housing rotating mechanism 204 is capable of indexing the angle or rotation of the blade housing 52 to any increment that is accomplishable by the motor 206 blade housing rotating mechanism 204. For example, if motor 206 is a stepper motor, there will be a fundamental lower limitations to the angular resolution that is achievable for rotating blade housing 52.

By having the ability to actively rotate blade housing 52 using the CPU 1800 and blade housing rotating mechanism 204, certain types of cuts in the workpiece W can be accomplished that may otherwise be difficult to achieve. For example, when the blade 20 is making a corner cut, the blade 20 is lifted (according to the direction of arrow Z) from the workpiece W being cut by actuating blade housing lifting-lowering mechanism 212, rotated at a 90° angle by the blade housing rotating mechanism 204 and then lowered back down (according to the direction of arrow Z') to the workpiece W by the blade housing lifting-lowering mechanism 212 and then the cut is continued. This allows a very clean "tangential" cut in the workpiece W to be accomplished. Such clean corner cuts in the workpiece W are difficult to complete (e.g., in order to carry out such a cut, the blade would have to overshoot the corners when making a cut using castoring style blades (e.g., non-rotary blades that are "dragged" by the blade housing).

Figure 7:
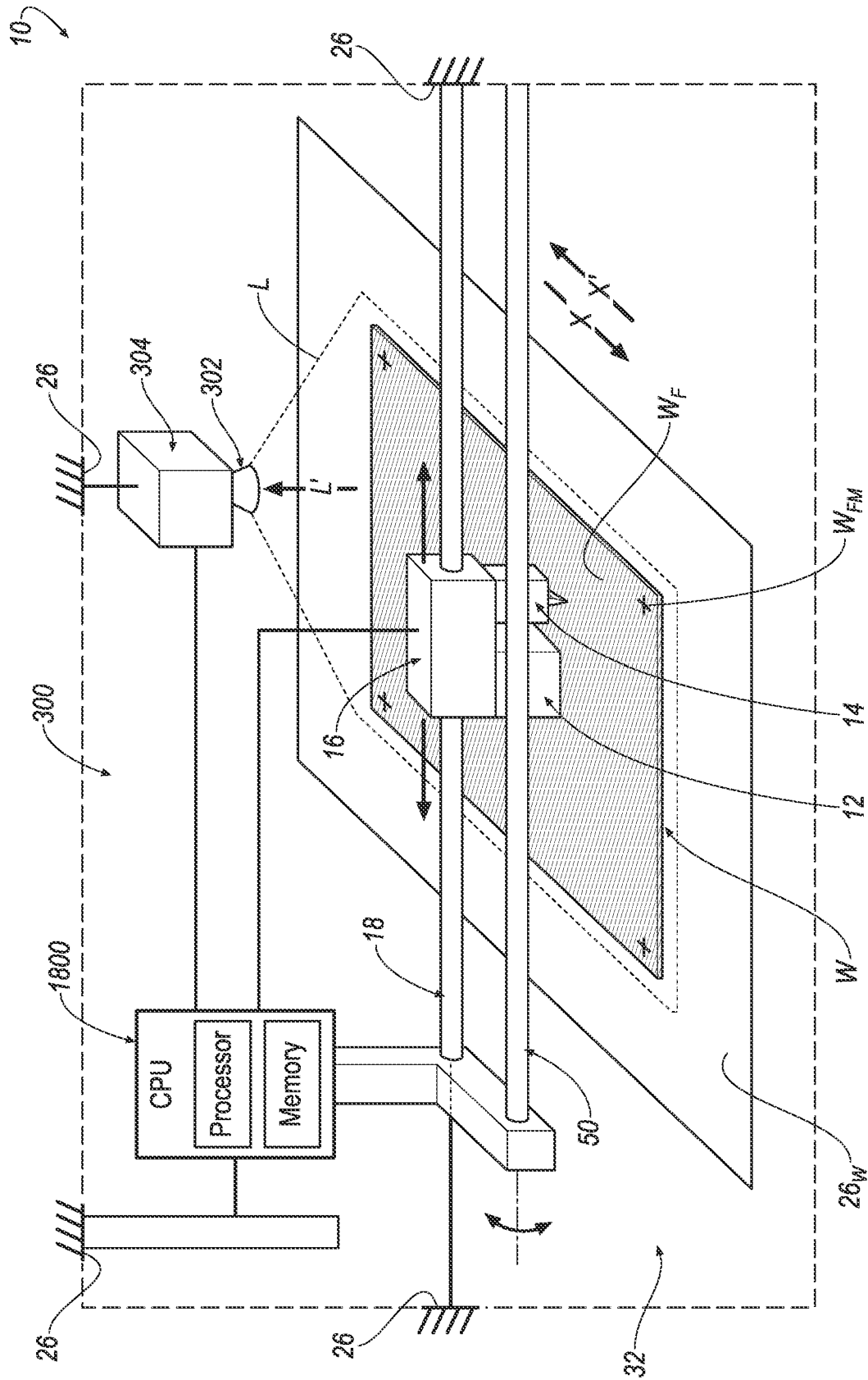
FIG. 7 is a representative view of an exemplary color sensor device of a crafting apparatus.

In an example, the crafting apparatus 10 also includes a color sensor device, which is seen generally at 300 in FIG. 7. The color sensor device 300 is communicatively-coupled to the CPU 1800. The color sensor device 300 may be directly or indirectly connected to the interior surface 26 of the body 22.

In an example, the color sensor device 300 includes a red-green-blue (RGB) illumination source 302 that emits RGB light (according to arrow L) and an RGB sensor 304 that detects reflected RGB light (according to arrow L'). In an example, the RGB sensor 304 receives or calculates a known calibrated value (e.g. white and black light). Based on this calibrated value, the CPU 1800 can vary the light L (e.g., the CPU 1800 can vary the color of the light L and/or the intensity of the light L) emitted by the RGB illumination source 302 toward the front surface WF of the workpiece W.

As seen in FIG. 7, the workpiece W is supported on the workpiece support surface 26W. Furthermore, the front surface WF of the workpiece W includes one or more fiducial markings WFM, which may be in the form of a printed marking (e.g., in black ink) in the form of an X-shape, L-shape, "cross hair" marking, a box shape, a line or the like. The fiducial markings WFM may be utilized for compensating for a misalignment of the workpiece W that is disposed upon the workpiece support surface 26W.

The feed roller 50 may advance the workpiece W into or out of the interior compartment 32 according to feed directions X, X' such that the workpiece W is moved past the color sensor device 300. In an example, the RGB illumination source 302 emits RGB light L toward the front surface WF of the workpiece W that is reflected L' back toward the RGB sensor 304. When the RGB sensor 304 detects, for example, reflected light L' that is reflected from the one or more fiducial markings WFM (as opposed to reflected light L' from another region of the front surface WF of the workpiece W), the CPU 1800 may drive the feed roller 50 at a slower rate and/or drive the feed roller 50 to contact a second pass of the workpiece W past the color sensor device 300 to "get a better look" at the potentially detected one or more fiducial markings WFM. The RGB illumination source 302 may then produce a pure as possible white light L down on the front surface WF of the workpiece W. Then, the RGB sensor 304 sends a signal to the CPU 1800 that indicates the detected reflected light L' from the front surface WF of the workpiece W. In an embodiment, the RGB sensor 304 may have multiple (e.g. three) color sensing diodes that are semiconductor devices that are sensitive to certain wavelengths of light that are associated with different colors.

The colors red, blue and yellow, which may be emitted by the RGB illumination source 302 may be sufficient for the RGB sensor 304 to accurately determine the position of one or more fiducial markings WFM arranged on the front surface WF of the workpiece W. However, it is possible to use different levels of sensors (e.g. a sensor that detects more than three colors). The one or more fiducial markings WFM may be in different places or different sizes on the front surface WF of the workpiece W to allow for example, the CPU 1800 to determine the skew and different amounts of ambient light being emitted upon different regions of the crafting apparatus 10.

The color sensor device 300 may detect three different colors, and, as a result, the CPU 1800 can better detect composite colors or even individual colors to increase the chances of detecting fiducial markings WFM in scenarios where there is ambient light saturation. Accordingly, the color sensor device 300 is less sensitive to differences in light by not just calculating the intensity of light (i.e., if the light is bright or dark) but also by calculating what a darkness condition or a light condition means (i.e., low or high values of certain colors). An algorithm stored in memory and executed by the processor of the CPU 1800 receives a signal from the RGB sensor 304 indicative of the reflected RGB light L' such that the CPU 1800 detects the ratio of the maximum amount of a certain color versus the minimum amount of the same color that is detected by the RGB sensor 304 rather than taking an absolute level of how much light the RGB sensor 304 is detecting of each color. This allows for the CPU 1800 to receive very consistent results regardless of the amount of ambient light. By using the RGB sensor 304, the CPU 1800 can detect the difference between, for example, the color navy blue and the color black, which is difficult to detect for a human, because navy blue will have a high blue content with low green-and-red content and black will detect a low level of all three colors. The amount of light may change, but the amount of certain colors will stay the same regardless of the amount of light.

In an example, the workpiece W may be defined by a white color or a non-white color. The non-white color may be any color (e.g., if the workpiece W is a paper material, the paper W may be red paper, green paper, blue paper or the like). If, for example, the workpiece W is red paper, the RGB illumination source 302 will emit RGB light L toward the front surface WF of the red paper W, and, of the red-green-blue colors emitted by the RGB light source 302, the RGB sensor 304 receiving the reflected RGB light L' will detect a greatest amount of change of the red illumination component of the reflected RGB light L'.

The color sensor device 300 also senses, for example, the color of one or more of the fiducial markings WFM and the workpiece W. Accordingly, if the one or more fiducial markings WFM are prepared in black ink on the front surface WF of red paper W, the RGB sensor 304 may be able to distinguish a greatest amount of change of the red illumination component of the reflected RGB light L' while also detecting the position of the black ink on the front surface WF of the red paper W defining the one or more of the fiducial markings WFM. As a result, the color sensor device 300 permits the crafting apparatus 10 to detect one or more fiducial markings WFM independent of the color of the workpiece W.

Referring to FIGS. 8 and 8A-8G, an implementation of the cutting device 14 of the crafting apparatus 10 may include a blade-keying assembly 400. The blade-keying assembly 400 may include a key body 62 that is over-molded, attached or otherwise secured to a base portion 68 of the blade 20. Furthermore, the blade-keying assembly 400 may also include the blade housing 52 having a distal end 52D and a proximal end 52P whereby the proximal end 52P of the blade housing 52 defines a blade-receiving opening 70 that permits access to a blade-receiving bore 72 that extends through the blade housing 52 from the proximal end 52P of the blade housing 52 toward the distal end 52D of the blade housing 52. In an example, the blade-receiving opening 70 is defined by a cross-sectional geometry that corresponds to at least a portion of a cross-sectional geometry of the key body 62 and the blade 20.

The key body 62 includes a barrel portion 64 and a key portion 66. The barrel portion 64 extends along and is formed over most of a length of the base portion 68 of the blade 20 whereas the key portion 66 is formed over a portion of the length of the base portion 68 that is proximate to the blade 20. The blade-receiving opening 70 formed by the distal end 52D of the blade housing 52 may include: (1) a first surface portion 70a that is sized for receiving the key portion 66 of the key body 62; (2) a second surface portion 70b that is sized for receiving some of the base portion 68 of the blade 20; and (3) intermediate surface portions 70c (extending between and connecting the first surface portion 70a and the second surface portion 70b) that are sized for receiving the barrel portion 64 of the key body 62.

Figure 8:
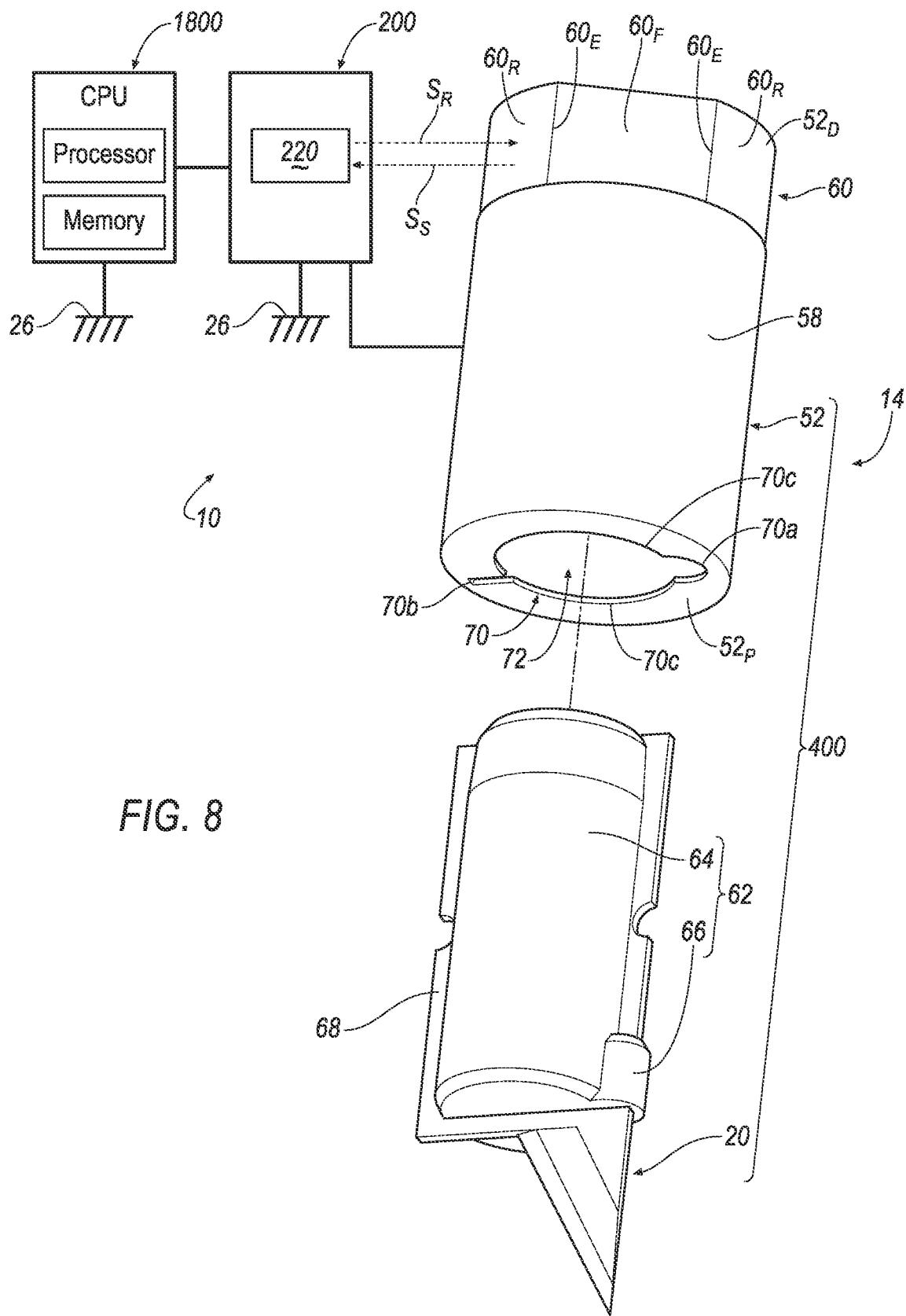
FIG. 8 is an exploded perspective view of an exemplary blade-keying assembly of an exemplary cutting device of a crafting apparatus.
Figure 8A:
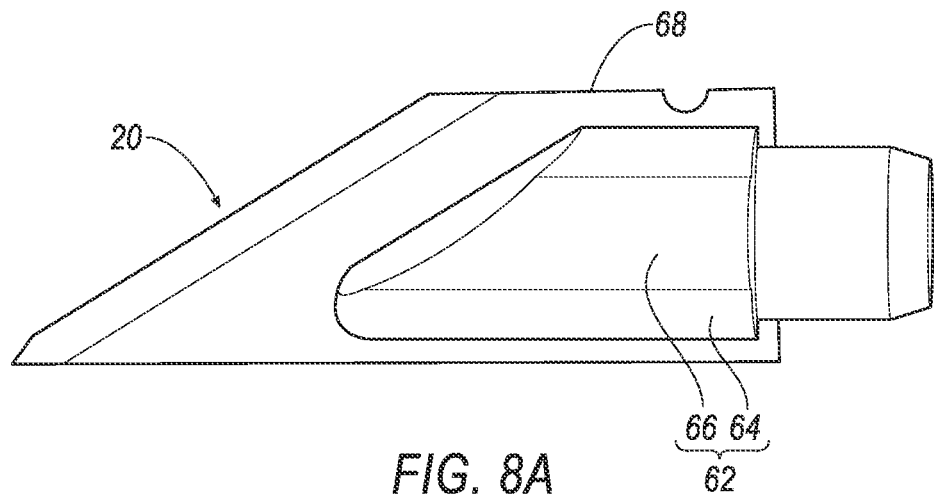
FIG. 8A is a side view of an exemplary blade of a blade-keying assembly of an exemplary cutting device of a crafting apparatus.
Figure 8B:
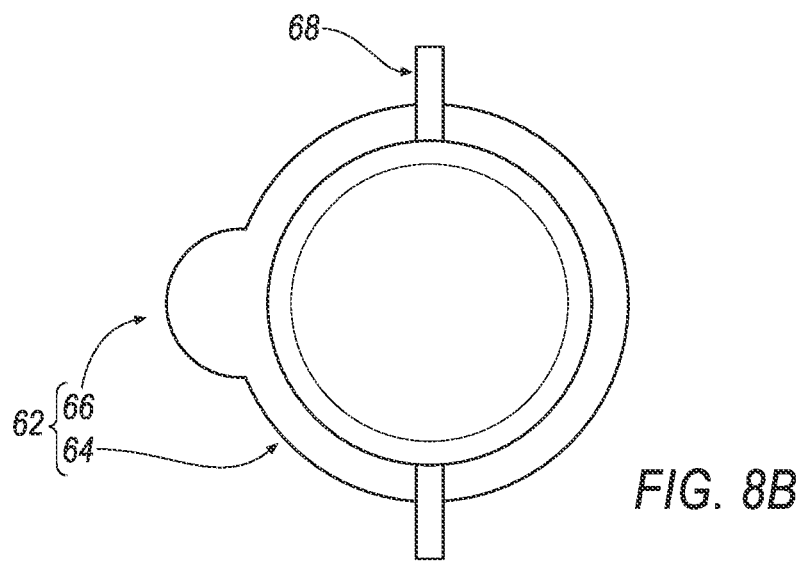
FIG. 8B is an end view of the blade of FIG. 8A.
Figure 8C:
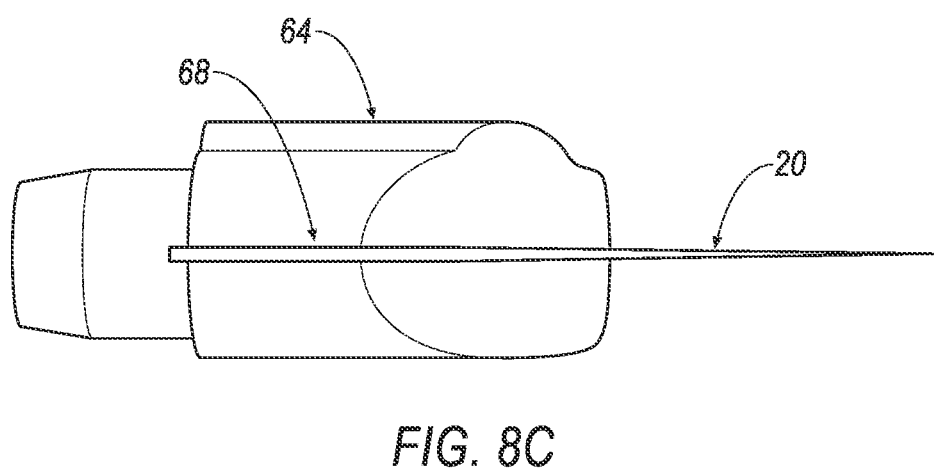
FIG. 8C is a bottom view of the blade of FIG. 8A.
Figure 8D:
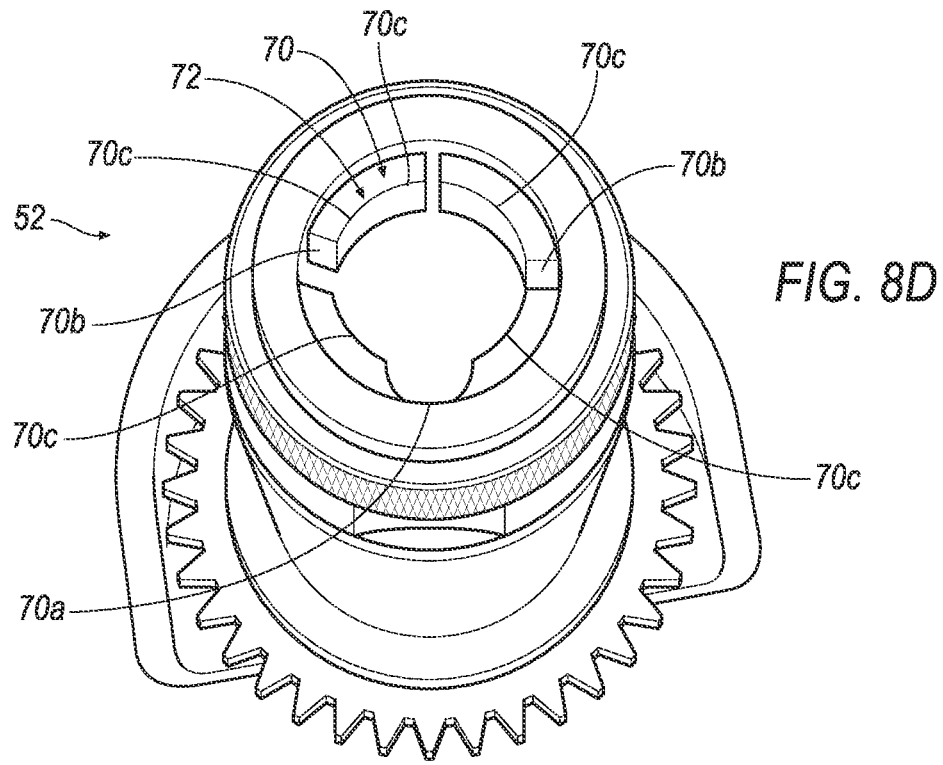
FIG. 8D is a bottom perspective view of an exemplary blade housing of the blade-keying assembly associated with the blade of FIGS. 8A-8C.
Figure 8E:
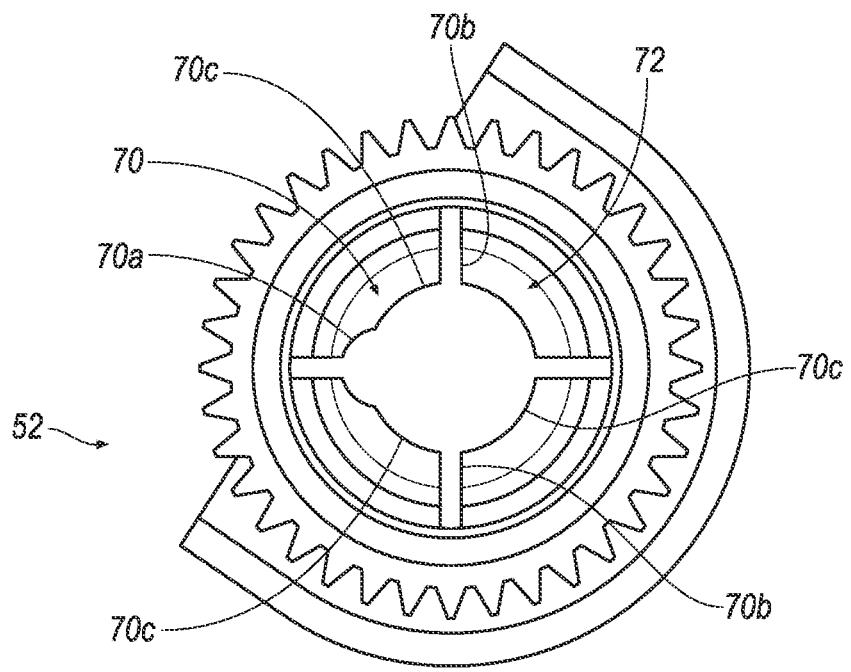
FIG. 8E is a bottom view of the blade housing of FIG. 8D.
Figure 8F:
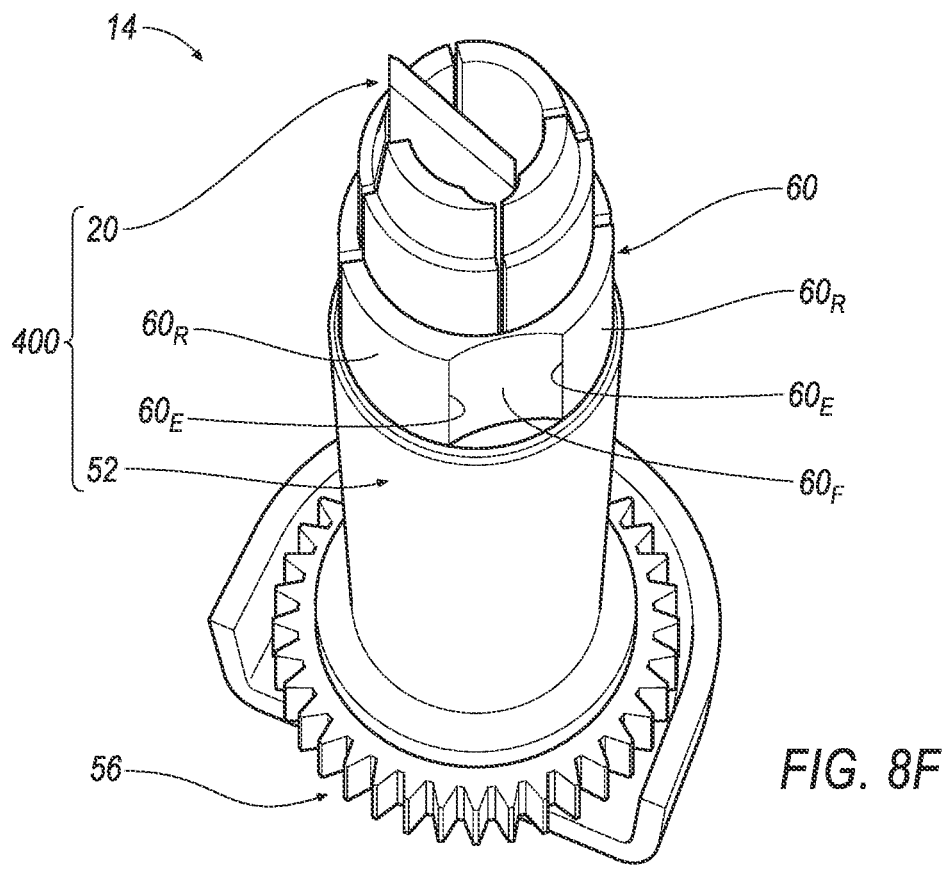
FIG. 8F is a perspective view of the blade of FIGS. 8A-8C disposed within the blade housing of FIGS. 8D-8E for forming the blade-keying assembly.
Figure 8G:
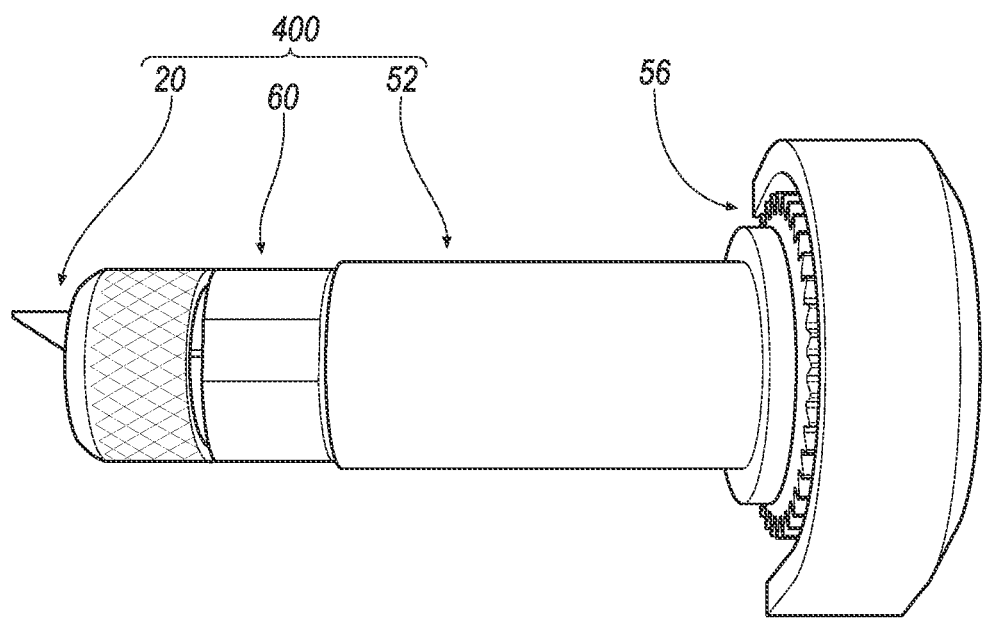
FIG. 8G is a side view of the blade-keying assembly of FIG. 8F.

As seen in FIG. 8, because the key portion 66 of the key body 62 is only provided on one side of the base portion 68 of the blade 20, a user is prohibited from installing the blade 20 from an improper (i.e., a 180° offset) orientation. As a result, the blade 20 is properly aligned with a drive direction of the cutting device 14 whereby, in an example, the cutting device 14 drags a sharpened edge of the blade 20 against the workpiece W rather than an opposite, non-sharpened edge of the blade 20 against the workpiece W in order to prevent damage to one or more of the blade 20, the workpiece W or perhaps one or more other components (e.g., one or more motors) of the crafting apparatus 10. Furthermore, in some examples as seen in FIG. 8, if the blade housing includes the circumferential band of one or more surface portions 60 (e.g., defined by the one or more rounded surface portions 60R and one or more non-rounded, flat surface portions 60F each separated by an edge portion 60E) as described above at FIGS. 4-6, the proper orientation of the blade 20 relative the blade housing 52 arising from the blade-keying assembly 400 may also contribute to aligning the blade 20 with the "home flat" in order to establish an absolute position of the blade housing 52 for the CPU 1800 when the blade housing 52 is rotated R by the blade housing rotating mechanism 204 in order to adjust the cutting direction of the sharp edge of the blade 20.

Figure 9A:
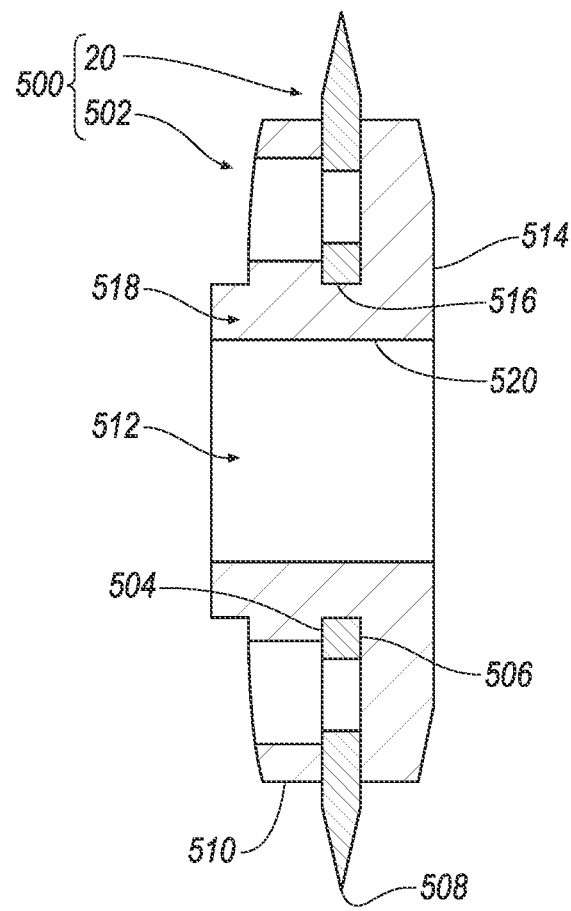
FIG. 9A is a cross-sectional view of an exemplary blade assembly including a circular rotary blade and an overmolded circular hub.
Figure 9B:
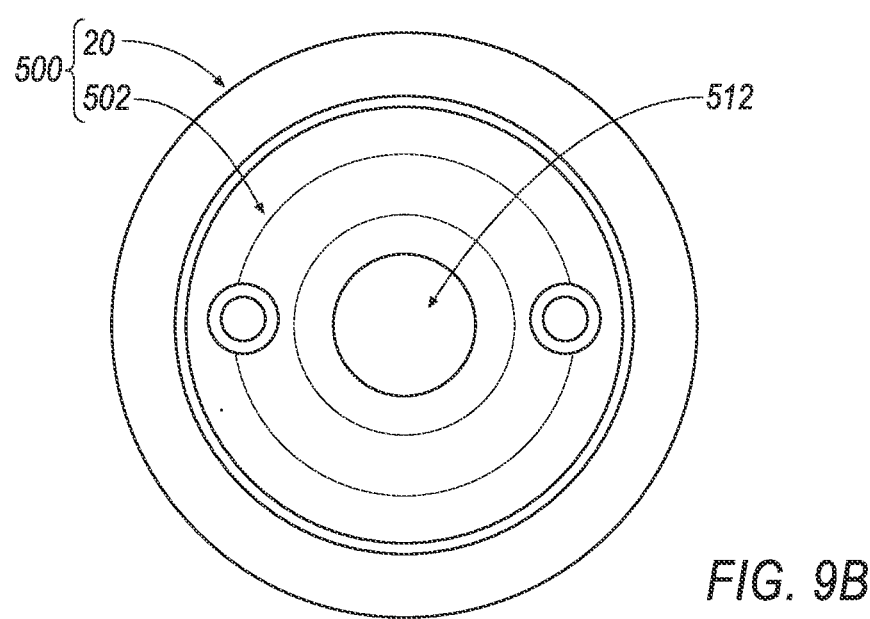
FIG. 9B is a front view of the blade assembly of FIG. 9A.

Referring to FIGS. 9A-9B, an implementation of a blade assembly of the cutting device 14 of the crafting apparatus 10 is shown generally at 500. The blade assembly 500 may include a circular rotary blade 20 and an over-molded circular hub 502. As seen in FIG. 9A, the over-molded hub 502 extends over opposite sides 504, 506 of the rotary blade 20 such that an outer circumferential perimeter defining a sharp cutting edge 508 of the rotary blade 20 extends beyond an outer circumferential end surface 510 of the over-molded hub 502. The over-molded hub 502 may also define a central fastener-receive passage 512. The over-molded hub 502 may be formed from any desirable material, such as plastic, copper, steel or the like.

The over-molded hub 502 provides structure and stability to the rotary blade 502 in order to permit more precise cutting of a workpiece W. Furthermore, when the blade assembly 500 is secured to a blade housing 52 (see, e.g., FIGS. 10A, 11A), the over-molded hub 502 aligns the rotary blade 20 to an inner race of a bearing (see, e.g., 78 in FIG. 11A) and provides the blade housing 52 with structural support when, for example, the rotary blade 20 is disposed adjacent the front surface WF of a workpiece W while the rotary blade 20 is rolling. Yet even further, the over-molded hub 502 allows the rotary blade 20 to be aligned to the inner race of the bearing (see, e.g., 78 in FIG. 11A) as opposed to disposing the rotary blade 20 right up against the inner race of the bearing itself and allows a controlled offset from the bearing as well.

Furthermore, an outer surface 514 of the over-molded hub 502 provides a surface area that may be clamped with a nut (see, e.g., 610 in FIG. 11A) and a fastener (see, e.g., 606 in FIG. 11A) without clamping into the material forming the rotary blade 20, which may otherwise result in damage or deformation of the blade 20. Yet even further, as seen in FIG. 9A, an inner surface 516 of the rotary blade 20 defines a central passage extending through the thickness of the rotary blade 20 is supported by a central body portion 518 of the over-molded hub 502. The central body portion 518 includes an inner surface 520 that defines the central fastener-receive passage 512 extending through the central body portion 518 for receiving the fastener described above. Accordingly, the central body portion 518 prevents the fastener from contacting the inner surface 516 of the rotary blade 20 in order to, for example, prevent damage or deformation of the rotary blade 20.

Referring to FIG. 10A, an exemplary blade-changing kit that may be interfaced with the cutting device 14 of the crafting apparatus 10 is shown generally at 600. The blade-changing kit 600 may include a sleeve portion 602 and a fastener-engaging portion 604 (e.g., a Phillips screwdriver). A portion (e.g., the handle) of the fastener-engaging portion may be sized to have a reduced thickness in order to limit an applied torque to a fastener (see, e.g., 606 in FIGS. 10D-10I) so the user does not over-tighten the fastener. As will be described in the following disclosure, the sleeve portion 602 is interfaced with the blade housing 52 that may or may not include a blade attached thereto (i.e., the sleeve portion 602 may be utilized for removing a blade 20 from the blade housing 52 or attaching a blade 20 to the blade housing 52). Thereafter, a user may insert the fastener-engaging portion 604 through a passage (see, e.g., 630 in FIGS. 10D-10I) formed by the sleeve portion 602 in order to access a fastener (see, e.g., 606 in FIGS. 10D-10I) that secures the blade 20 to the blade housing 52. Irrespective of the arrangement of the blade 20 with respect to the blade housing 52, the sleeve portion 602 functions as a barrier between a sharp cutting edge 508 of the blade 20 and a user's fingertips during the course of removing or attaching the blade 20 from/to the blade housing 52. Accordingly, the sleeve portion 602 permits a user to remove or attach the blade 20 with respect to the blade housing 52 while preventing the user to directly touch the cutting edge 508 of the blade 20.

Figure 11A:
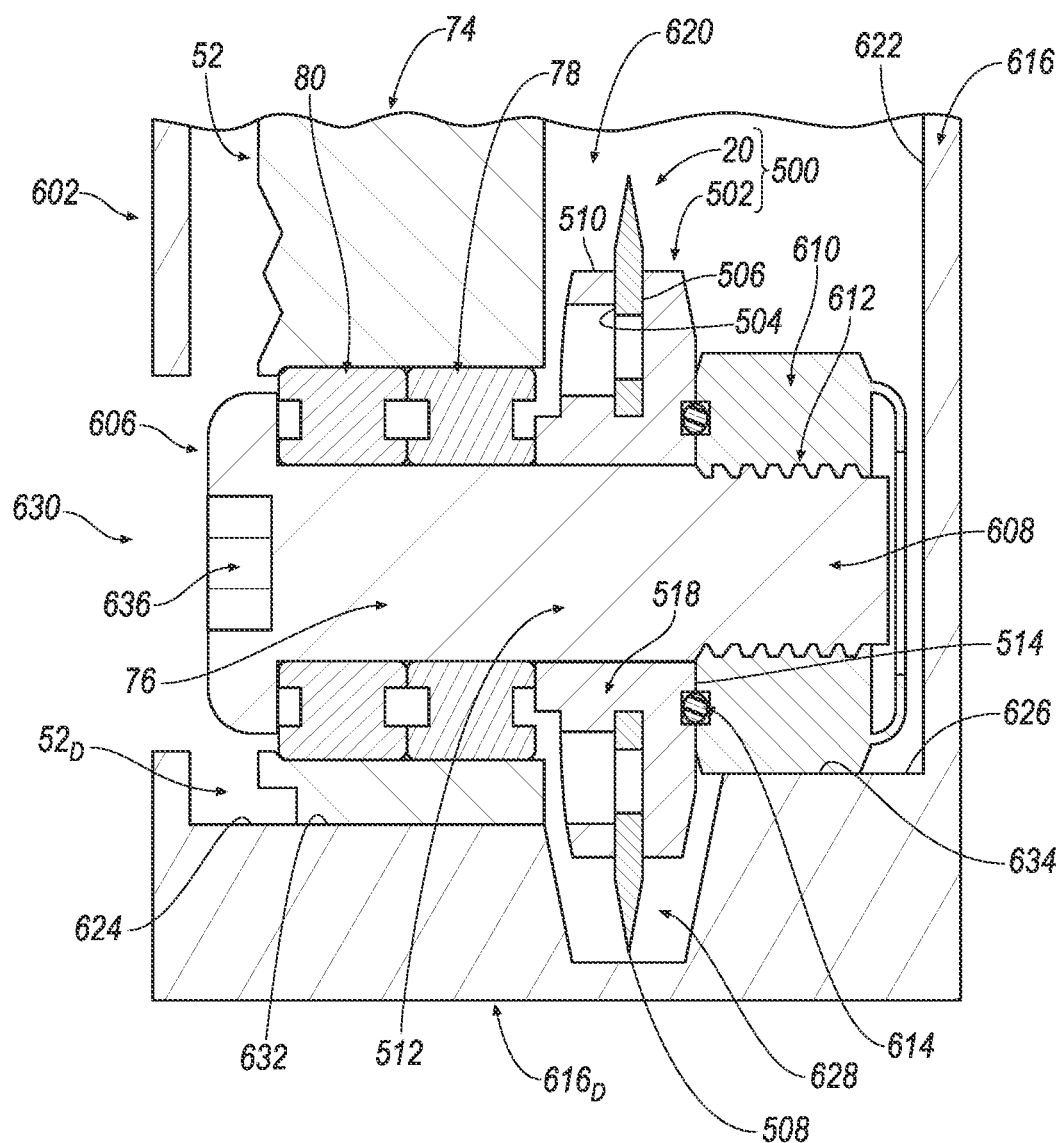
FIG. 11A is a cross-sectional view of the sleeve portion interfaced with the blade that is connected to the blade housing according to line 11A-11A of FIG. 10C or 10D.

Prior to describing a method for utilizing the blade-changing kit 600, reference is made to FIG. 11A, which illustrates an exemplary blade 20 (e.g., a rotary blade) secured to a distal end 52D of the blade housing 52. The distal end 52D of the blade housing 52 may be defined by a flange portion 74 defining a fastener-receiving passage 76 that includes a bearing defined by an inner race 78 and an outer race 80 disposed therein.

Furthermore, as seen in FIG. 11A, the rotary blade 20 may be a component of the blade assembly 500 described above at FIGS. 9A-9B whereby the over-molded hub 502 extends over opposite sides 504, 506 of the circular blade 20 such that the sharp cutting edge 508 of the rotary blade 20 extends beyond the outer circumferential end surface 510 of the over-molded hub 502. A fastener 606 extends through: (1) the fastener-receiving passage 76 of the distal end 52D of the blade housing 52; (2) the central fastener-receive passage 512 of the central body portion 518 of the over-molded hub 502; and (3) a threaded passage 608 formed by a nut 610 secured to a threaded outer surface portion 612 of the fastener 606.

In some instances, a silicon washer 614 is disposed between the outer surface 514 of the over-molded hub 502 that may be compressed while acting as a lock washer to assist in retaining the fastener 606 to the nut 610. Furthermore, the silicon washer 614 may compensate for unevenness or surface imperfections of the outer surface 514 of the over-molded hub 502 so that the rotary blade 20 is as close to orthogonal or squared with respect to the front surface WF of a workpiece W. Yet even further, the silicon washer 614 may assist in leveling the rotary blade 20 with respect to the blade housing 52 (i.e., otherwise, in the absence of silicon washer 614, a potential surface irregularity of the nut 610 would misalign the rotary blade 20 to the blade housing 52).

Figure 10B:
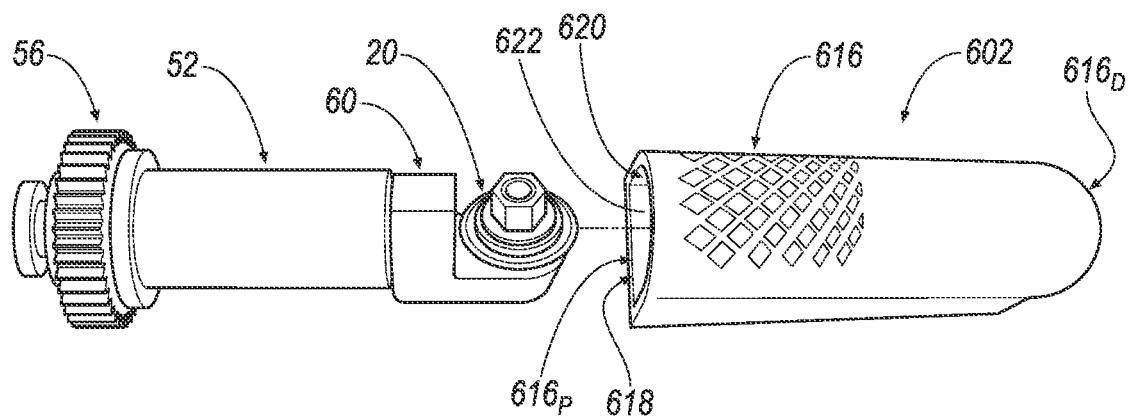
FIG. 10B is a rear side view of a sleeve portion of the blade-changing kit of FIG. 10A arranged proximate the blade that is connected to the blade housing.

Referring to FIG. 10A, the sleeve portion 602 may be defined by a tube-shaped body 616 having a proximal end 602P and a distal end 602D. The proximal end 602P of sleeve portion 602 may define an insertion opening 618 (see, e.g., FIG. 10B) that permits insertion of the blade 20 and blade housing 52 into a receiving cavity 620 formed by an inner surface 622 of the tube-shaped body 616. Referring to FIG. 11A, the inner surface 622 of the tube-shaped body 616 may terminate near the distal end 602D of the tube-shaped body 616, defining one or more support surfaces 624, 626 and a blade-receiving recess or cavity 628. Furthermore, as seen in FIG. 11A, tube-shaped body 616 may define a fastener access passage 630 that permits the fastener-engaging portion 604 to engage the fastener 606 while the sleeve portion 602 is disposed over the blade 20 and the blade housing 52.

Referring to FIGS. 10B-10J, an exemplary methodology for removing the rotary blade 20 from the flange portion 74 defined by the distal end 52D of the blade housing 52 is described. Although FIGS. 10B-10J discuss the removal of the rotary blade 20 from the flange portion 74 defined by the distal end 52D of the blade housing 52, the method steps may be performed in reverse order (starting with the view of FIG. 10J and ending at the view of FIG. 10B) for attaching the rotary blade 20 to the flange portion 74 defined by the distal end 52D of the blade housing 52.

Figure 10C:
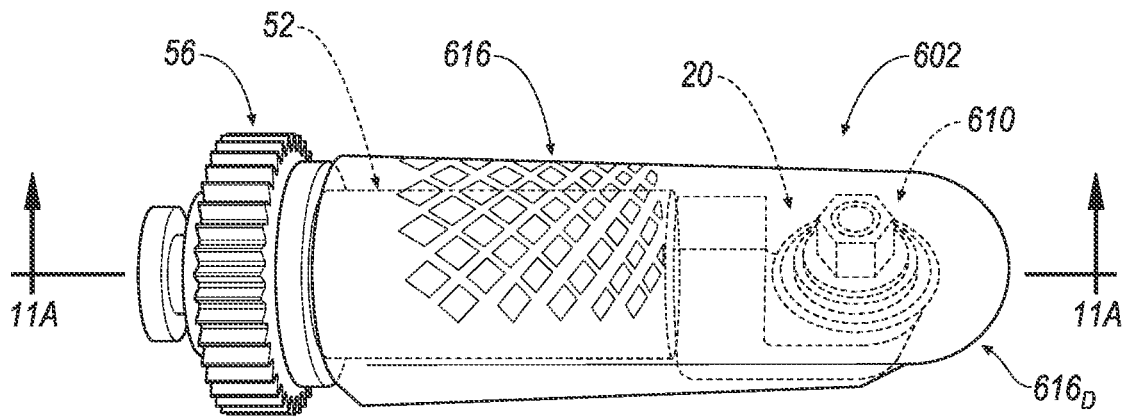
FIG. 10C is a rear side view of the sleeve portion interfaced with the blade that is connected to the blade housing.
Figure 10D:
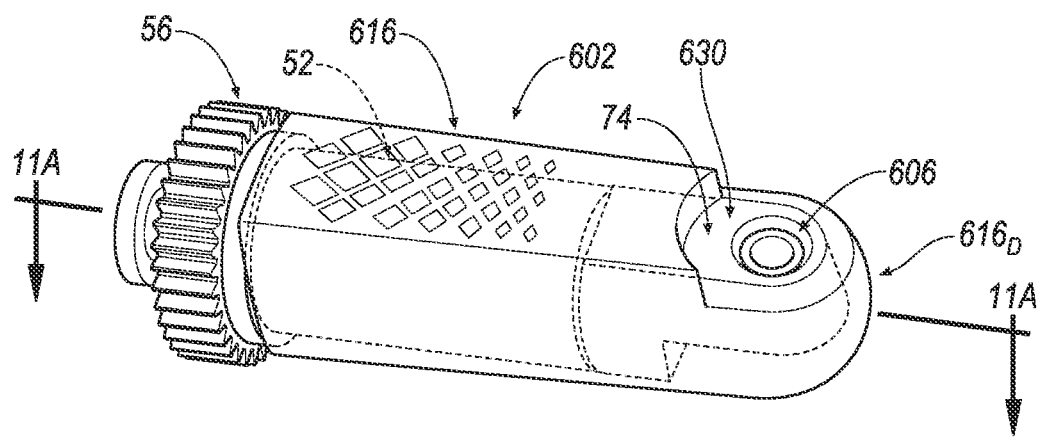
FIG. 10D is a front side view of the sleeve portion interfaced with the blade that is connected to the blade housing.

Referring to FIG. 10B, the receiving cavity 620 of the tube-shaped body 616 of the sleeve portion 602 is axially-aligned with the rotary blade 20 and the blade housing 52. Then, as seen in FIGS. 10C-10D, the rotary blade 20 and the blade housing 52 are disposed within the receiving cavity 620 of the tube-shaped body 616 of the sleeve portion 602. As seen in FIG. 11A, insertion of the rotary blade 20 and the blade housing 52 into the receiving cavity 620 of the tube-shaped body 616 of the sleeve portion 602 ceases when an end surface 632 of the flange portion 74 defined by the distal end 52D of the blade housing 52 is disposed adjacent the support surface 624 extending from the inner surface 622 of the tube-shaped body 616 of the sleeve portion 602 and/or when one or more outer surfaces 634 of the nut 610 is disposed adjacent the support surface 626 extending from the inner surface 622 of the tube-shaped body 616 of the sleeve portion 602. In an example, the support surface 626 may include more than one surface (i.e., only one surface is shown in the cross-sectional view of FIGS. 11A-11B) in order to surround several surfaces 634 of the nut 610 in order to prevent the nut 610 from rotating. Furthermore, as seen in FIG. 11A, upon arranging at least one of the end surface 632 of the flange portion 74 and the one or more outer surfaces 634 of the nut 610 adjacent, respectively, one of the supports surfaces 624, 626, the rotary blade 20 is received within the blade-receiving recess or cavity 628 such that the sharp cutting edge 508 of the rotary blade 20 may be arranged in a spaced-apart, non-contacting orientation with respect to the inner surface 622 of the tube-shaped body 616 of the sleeve portion 602.

Figure 10E:
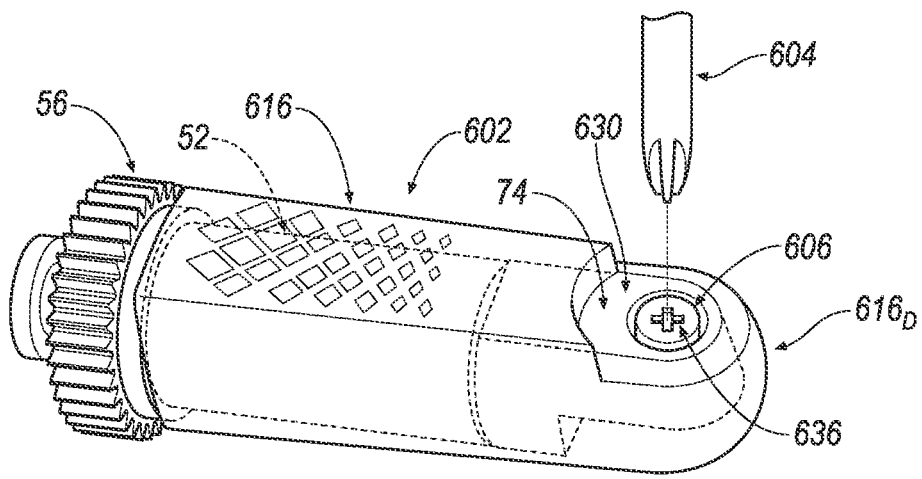
FIGS. 10E-10F are front side views of the sleeve portion interfaced with the blade that is connected to the blade housing according to FIG. 10D illustrating a fastener-engaging tool interfaced with a fastener that connects the blade to the blade housing.
Figure 10F:
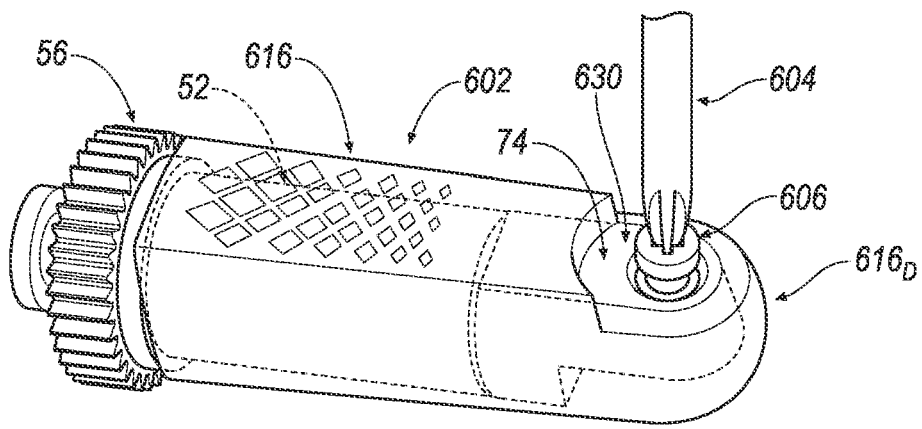
Figure 10G:
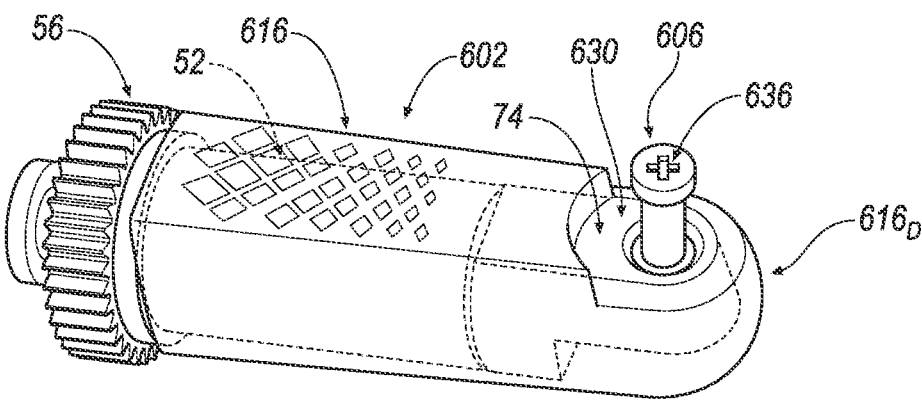
FIG. 10G is another front side view of the sleeve portion interfaced with the blade that is connected to the blade housing according to FIG. 10F illustrating the fastener partially disconnected from the blade and the blade housing.
Figure 10H:
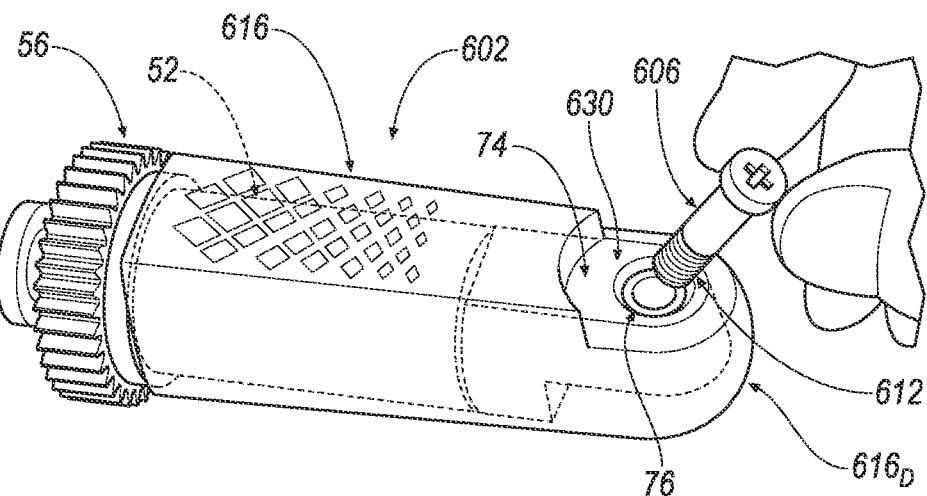
FIGS. 10H and 10I are front side views of the sleeve portion interfaced with the blade that is connected to the blade housing according to FIG. 10G illustrating the fastener disconnected from the blade and the blade housing rendering the blade functionally disconnected from the blade housing.
Figure 10I:
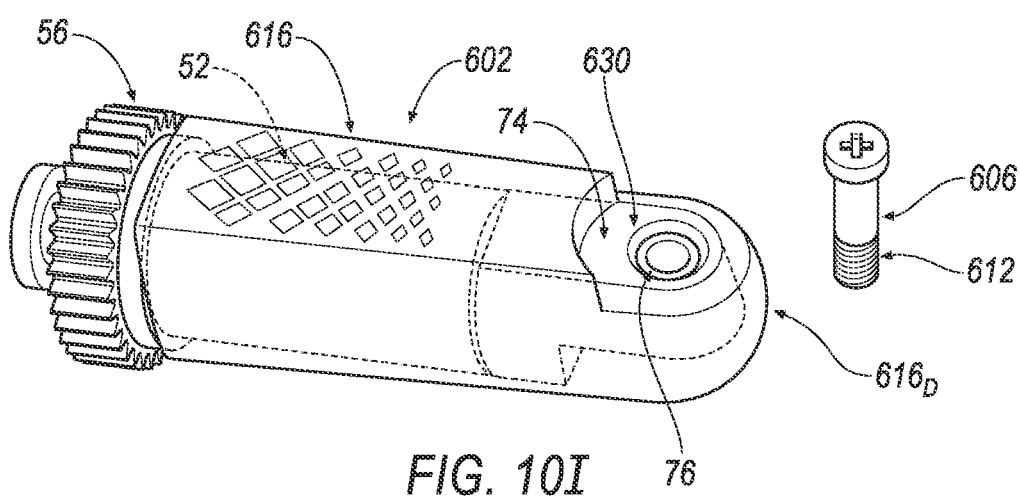
Figure 10J:
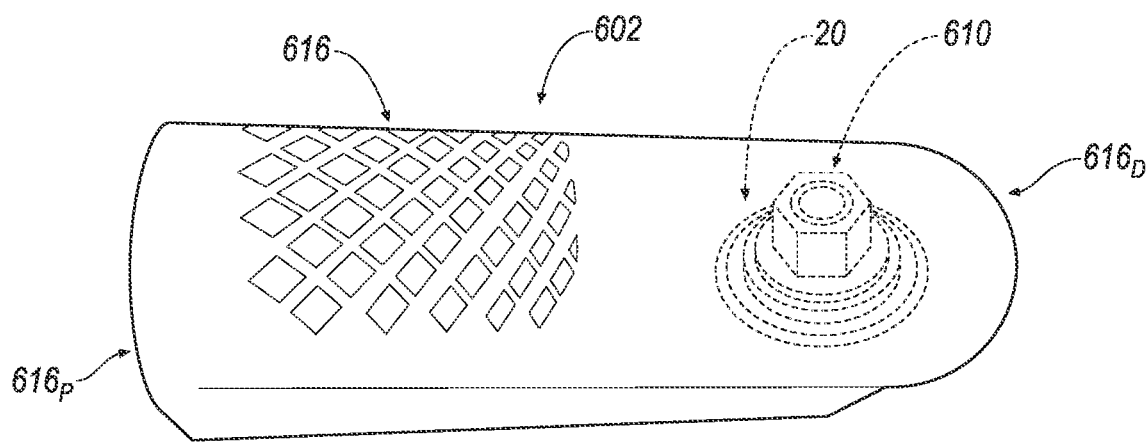
FIG. 10J is a rear view of the sleeve portion containing the blade disconnected from the blade housing according to FIG. 10H.
Figure 11B:
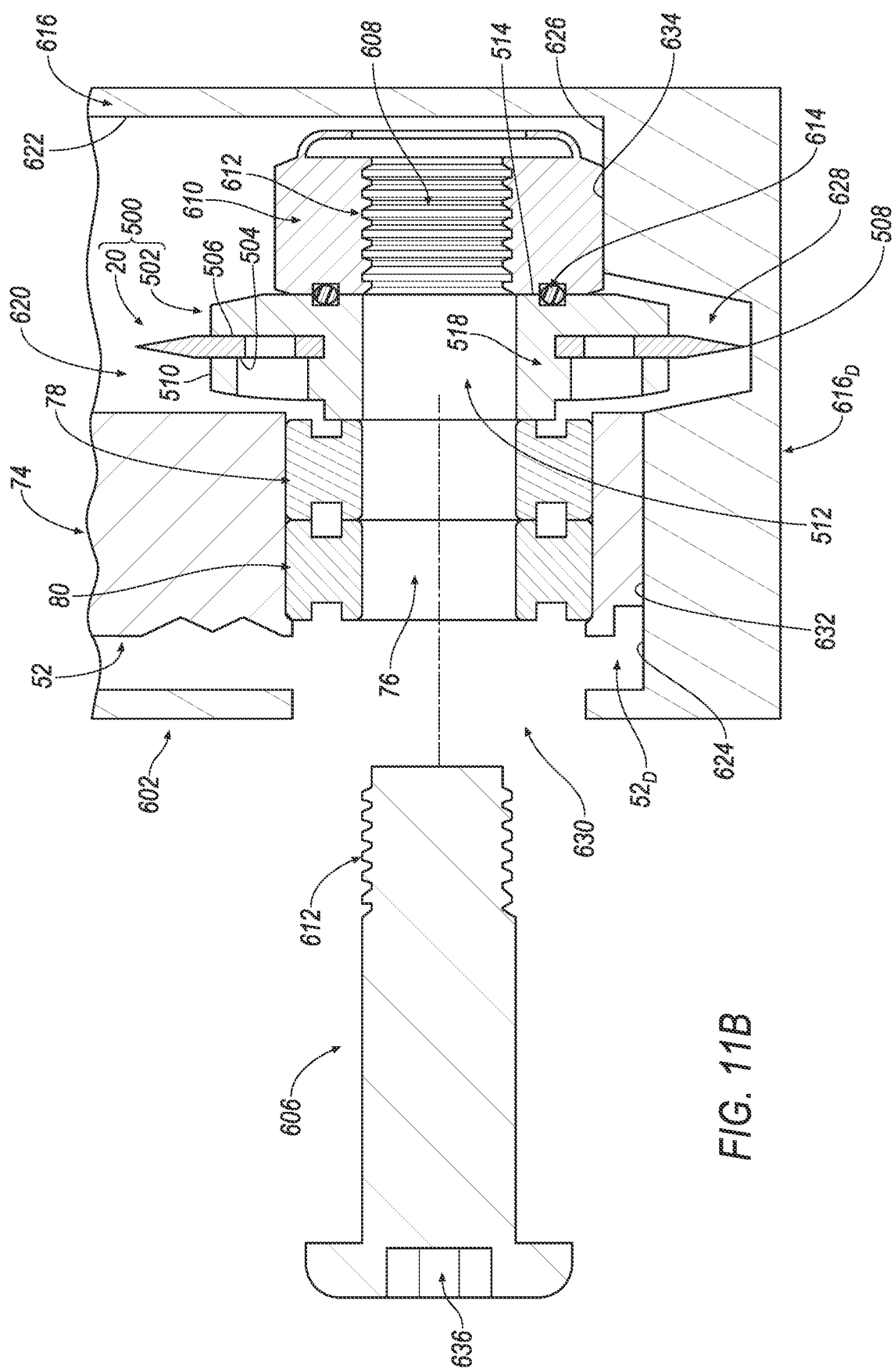
FIG. 11B is a cross-sectional view according to FIG. 11A illustrating the fastener disconnected from the blade and the blade housing such that the blade is not connected to the blade housing while the sleeve portion is interfaced with the blade and the blade housing.

Referring to FIGS. 10E-10G, while the sleeve portion 602 is disposed over the blade 20 and the blade housing 52 as described above, the user inserts the fastener-engaging portion 604 through the fastener access passage 630 formed by the tube-shaped body 616 in order to engage a distal tip of the fastener-engaging portion 604 with a corresponding recess 636 formed by the fastener 606. The user may rotate the fastener-engaging portion 604 in order to decouple the threaded connection of the threaded outer surface portion 612 of the fastener 606 with the threaded passage 608 formed by the nut 610. Thereafter, as seen in FIGS. 10H-10I and FIG. 11B, the user may remove the fastener 606 from: (1) the fastener-receiving passage 76 of the distal end 52D of the blade housing 52; (2) the central fastener-receive passage 512 of the central body portion 518 of the over-molded hub 502; and (3) the threaded passage 608 formed by the nut 610. Referring to FIG. 10J, with the fastener 606 no longer securing the rotary blade 20 and the nut 610 to the flange portion 74 defined by the distal end 52D of the blade housing 52, the user may remove the sleeve portion 602 from the blade housing 52 such that the rotary blade 20, the nut 610 and the silicon washer 614 remain in the receiving cavity 620 of the tube-shaped body 616 of the sleeve portion 602. As described above, the above-described steps may be performed in a reverse order for attaching the rotary blade 20, the nut 610 and the silicon washer 614 to the blade housing 52.

In an example, movement and orientation of the front door 36 may be controlled by a front door latching mechanism, which is seen generally at 700 in FIGS. 12A-12F. Although a top door movement damping mechanism, which is seen generally at 702, is primarily utilized for dampening movement of the top door 34, the top door movement dampening mechanism 702 is connected to one or more components of the front door latching mechanism 700, and, therefore, the top door movement dampening mechanism 702 is considered to be a component of the front door latching mechanism 700. Furthermore, throughout the views seen at FIGS. 12A-12F, a side panel of the body 22 has been removed in order to expose components of the front door latching mechanism 700. The components defining the front door latching mechanism 700 may be attached to a support panel 704 that may generally define one or more surface portions of interior surface 26 of the crafting apparatus 10 that would otherwise be hidden from view upon re-attaching the side panel of the body 22.

Figure 12A:
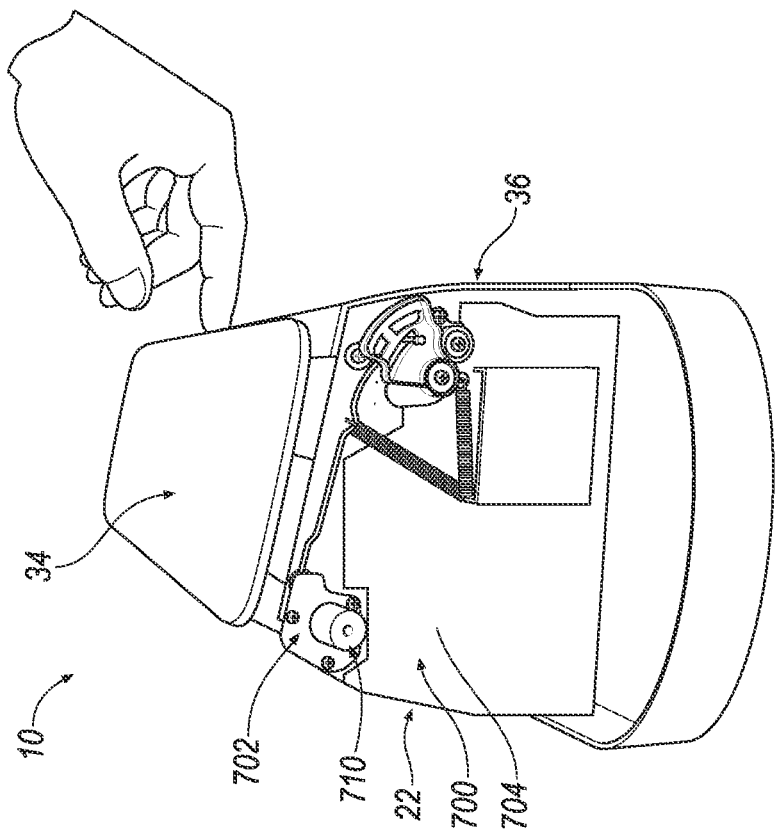
FIG. 12A is a side view of an exemplary crafting apparatus showing an exemplary door latching mechanism connecting a top door to a front door whereby the top door is arranged in a closed orientation and the front door is arranged in a latched-and-closed orientation.
Figure 12B:
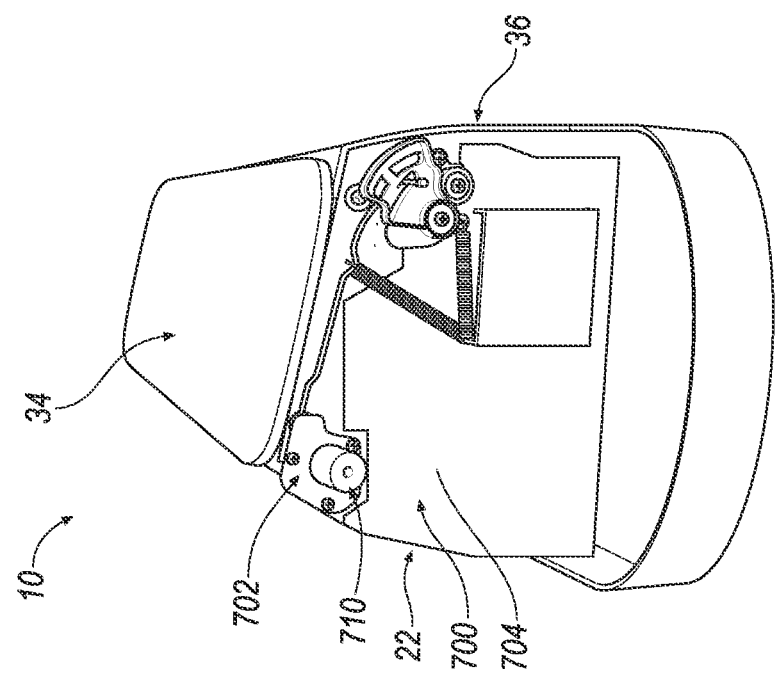
FIG. 12B is another side view of the crafting apparatus according to FIG. 12B showing a user transitioning the top door from the closed orientation to a partially open orientation while the front door is arranged in the latched-and-closed orientation.
Figure 12C:
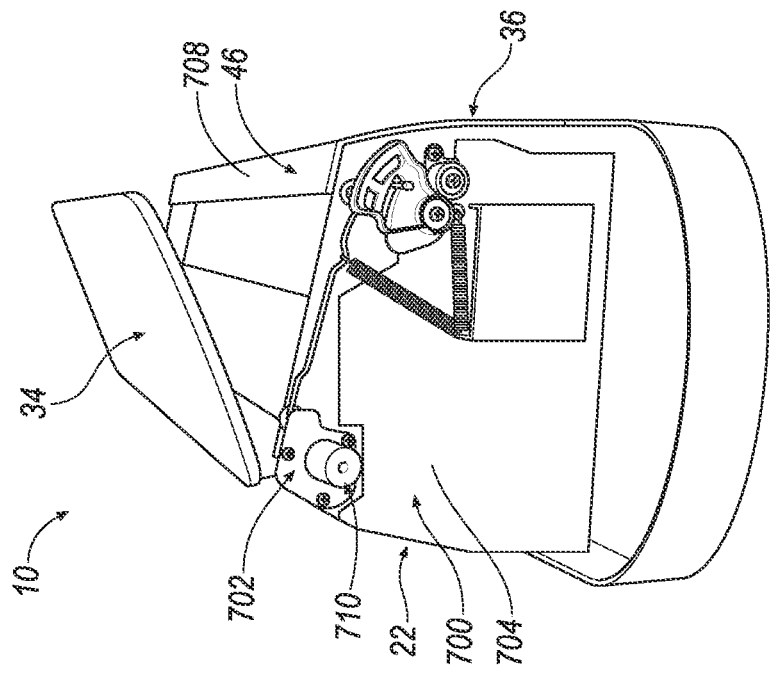
FIGS. 12C-12D is another side view of the crafting apparatus according to FIG. 12C showing the top door in the partially open orientation and transitioning to an open orientation while the front door is arranged in the latched-and-closed orientation.
Figure 12D:
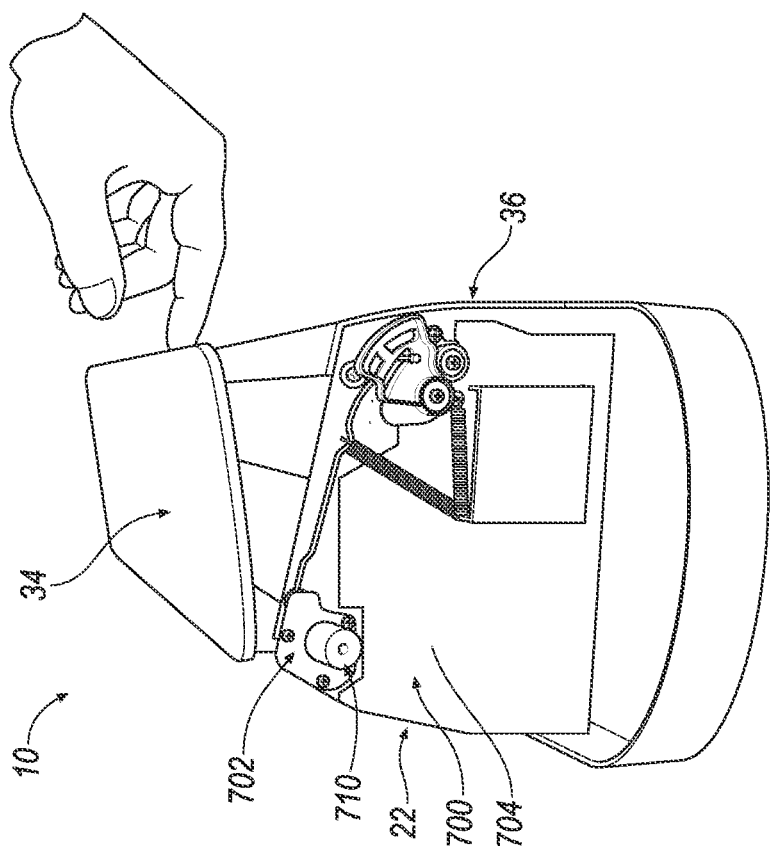
Figure 12F:
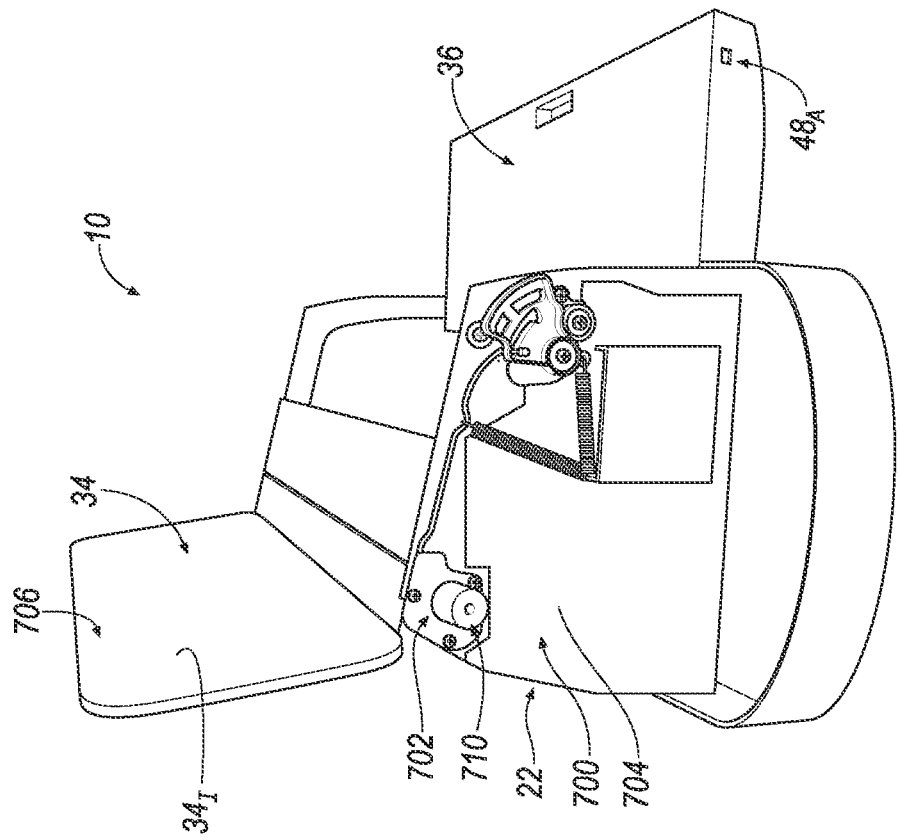
FIG. 12F is another side view of the crafting apparatus according to FIG. 12E showing the top door transitioned to the open orientation and the front door transitioned to an unlatched-and-open orientation from the unlatched-and-partially open orientation.
Figure 12E:
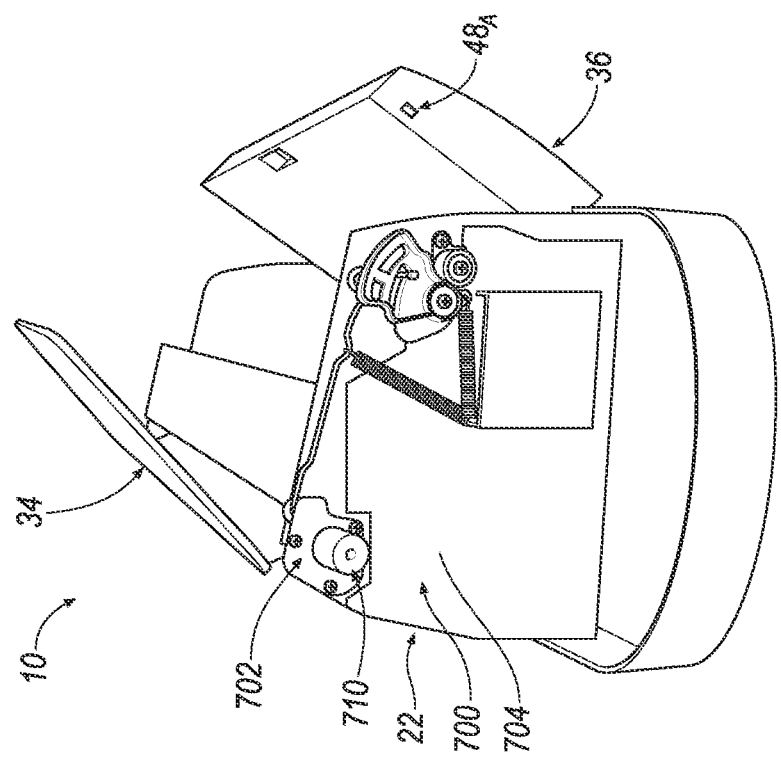
FIG. 12E is another side view of the crafting apparatus according to FIG. 12D showing the top door in further transitioned to the open orientation while the front door transitions from the latched-and-closed orientation to an unlatched-and-partially open orientation.

Referring initially to FIG. 12A, the top door 34 and the front door 36 of the crafting apparatus 10 are shown in a closed orientation relative to the body 22 of the crafting apparatus 10. As seen more clearly in FIG. 12F, an inner surface 341 of the top door 34 near the front edge of the top door 34 may include a magnetic component 706 that may cooperate with a magnetic component 708 (see, e.g., FIG. 12D) disposed over or arranged under (and out of view) the top surface 46 of the front door 36 for magnetically securing the top door 34 in a closed orientation as seen in FIG. 12A. Then, as seen in FIGS. 12B-12C, a user may arrange a digit or finger between the inner surface 341 of the top door 34 near the front edge of the top door 34 and the top surface 46 of the front door 36 in order to overcome the magnetic force of the magnetic components 706, 708 such that the top door 34 may move from a closed orientation (as seen in FIG. 12A) to a fully open orientation (as seen in FIG. 12F). In some instances, the magnetic component 706 may be a metal strip and the magnetic component 708 may be disposed over or arranged under (and out of view) of the top surface 46 of the front door 36.

The top door movement dampening mechanism 702 regulates automatic movement of the top door 34 from the closed orientation to the open orientation. Furthermore, the top door movement dampening mechanism 702 may include a dampening spring (not shown) that damps automatic movement of the top door 34 from the closed orientation to the open orientation.

With reference to FIGS. 12C-12J, as the top door 34 rotates from the closed orientation to the open orientation, a gear 710 of the top door movement dampening mechanism 702 is rotated R710 (see, e.g., FIGS. 16A-16D), which may be hereinafter referred to as the driving gear of the front door latching mechanism 700. The driving gear 710 is connected to and rotates R712 a driven gear 712 (see, e.g., FIGS. 16A-16D) of the front door latching mechanism 700 so that rotation R710 of the driving gear 710 is also imparted to the driven gear 712.

Referring to FIGS. 16A-16D, the driven gear 712 is connected to a proximal end 714P of a latch wire 714 of the front door latching mechanism 700. A distal end 714D of the latch wire 714 is connected to a latch plate 716 (see also FIG. 13) of the front door latching mechanism 700. The latch plate 716 is rotatably-connected R716 (see, e.g., FIGS. 14A-14C)/R716' (see, e.g., FIG. 14D) to an outer surface 704O of the support panel 704.

Upon rotation R710 of the driving gear 710, the driven gear 712 will also rotate R712, which causes the driven gear 712 to pull the proximal end 714P of the latch wire 714 with a pulling force F714.

Figure 13:
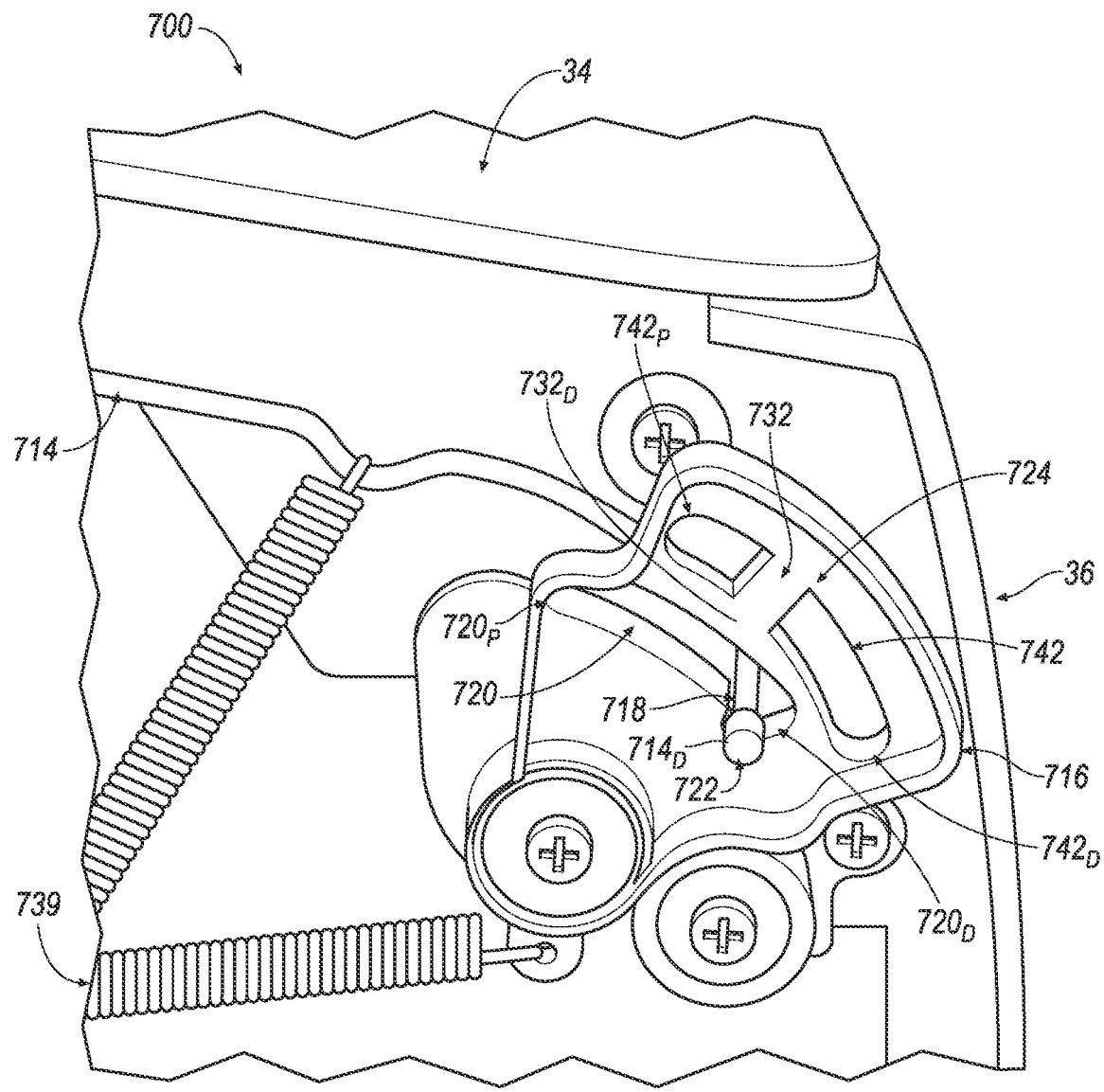
FIG. 13 is an enlarged side view of a portion of the door latching mechanism of FIGS. 12A-12F.

With reference to FIG. 13, which is an enlarged view of a portion of FIG. 12A (when the top door 34 is arranged in a closed orientation), the distal end 714D of the latch wire 714 is defined by a wire tip 718 that may, in an example, be bent or arranged at approximately a right angle with respect to a majority of the length of the latch wire 714 extending from the proximal end 714P of the latch wire 714.

As seen in FIG. 13, the latch plate 716 defines a first substantially arcuate channel 720 having a distal end 720D and a proximal end 720P. The distal end 720D of the wire tip 718 may be arranged for movement in the substantially arcuate channel 720 for connecting the latch wire 714 to the latch plate 716.

Furthermore, with reference to FIG. 13 and FIGS. 14A-14D, a pulling pocket 722 may extend from the distal end 720D of the first substantially arcuate channel 720. In an example, the pulling pocket 722 may extend from the first substantially arcuate channel 720 in a direction generally toward a rotational center C (see, e.g., FIGS. 14A-14D) of the latch plate 716.

Figure 14A:
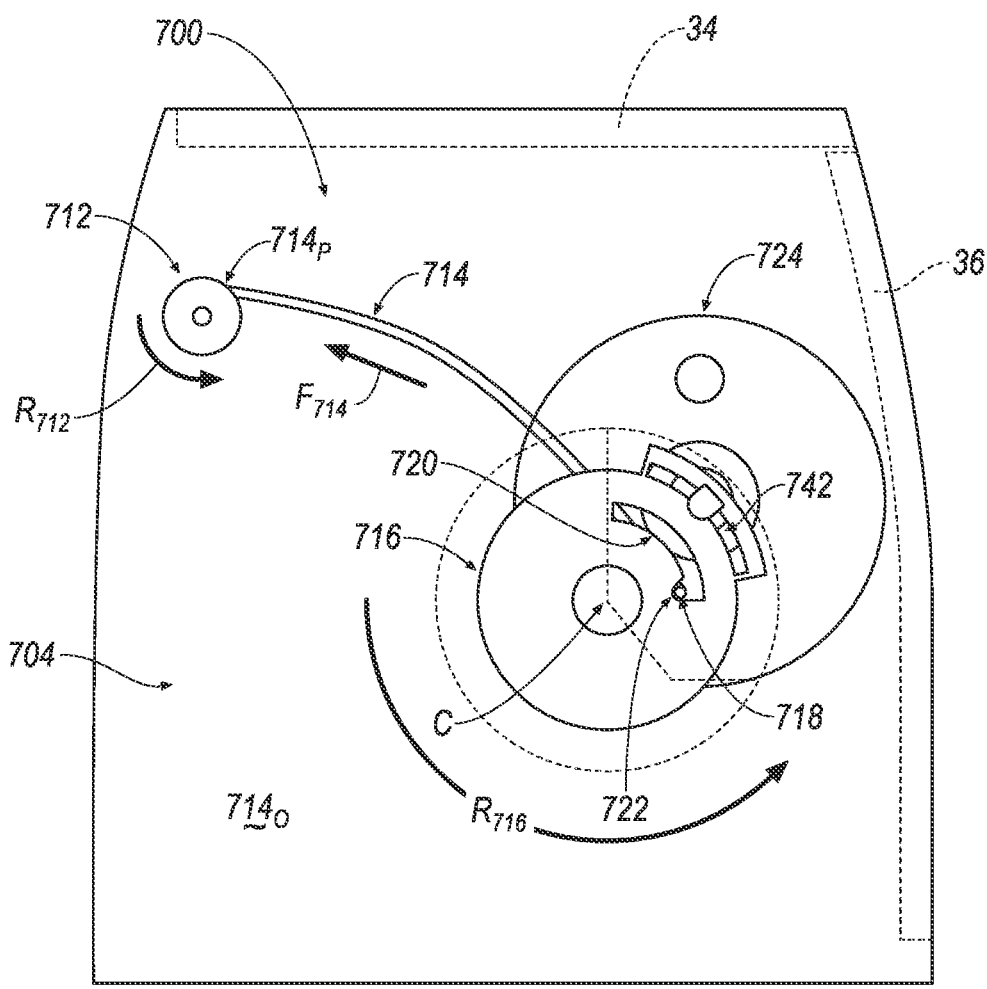
FIG. 14A is a representative side view of the crafting apparatus including the door latching mechanism connected to the top door and the front door of FIGS. 12A-12F whereby the door latching mechanism is arranged in a first state and the top door is arranged in a closed orientation while the front door is arranged in a latched-and-closed orientation.
Figure 14B:
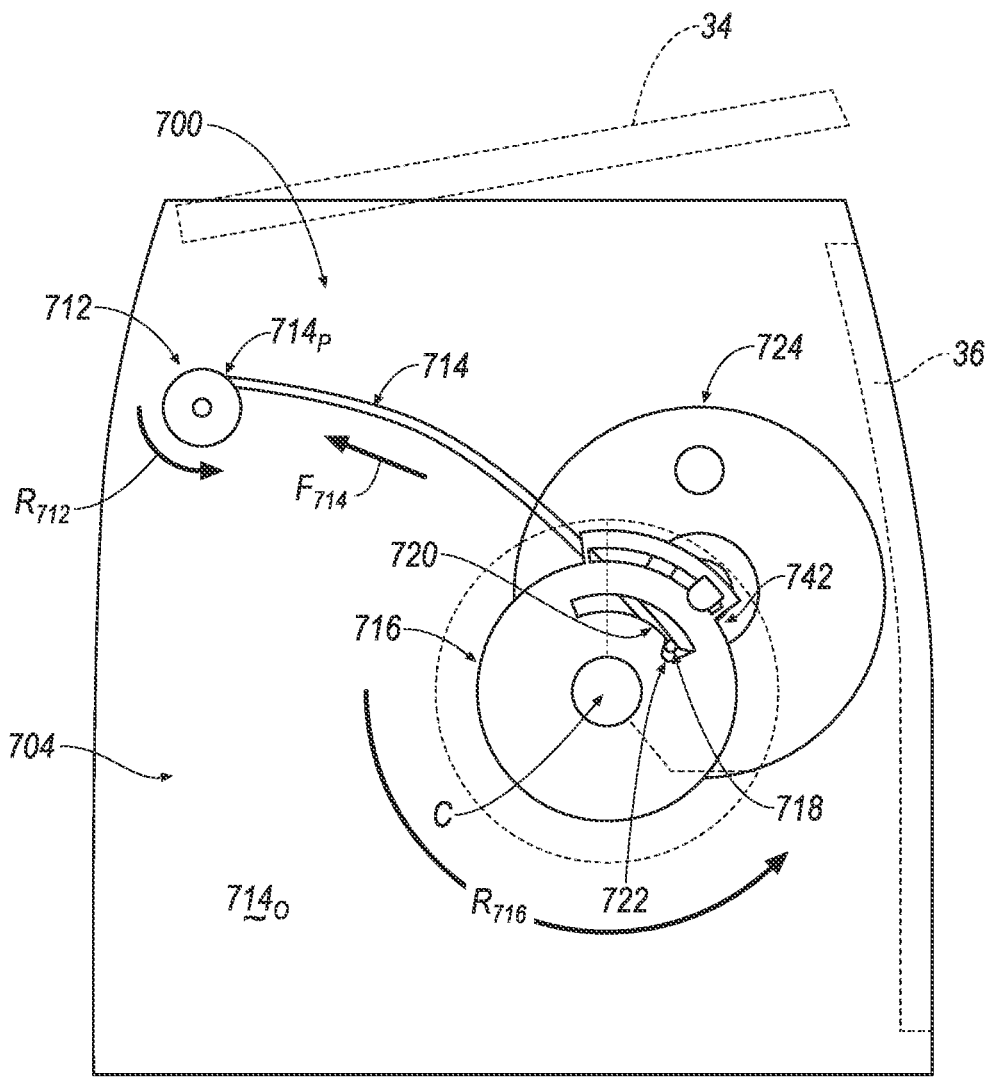
FIG. 14B is another representative side view of the crafting apparatus including the door latching mechanism connected to the top door and the front door according to FIG. 14A whereby the door latching mechanism is arranged in a second state and the top door arranged in the partially open orientation and transitioning to the open orientation while the front door is arranged in is arranged in the latched-and-closed orientation.

As seen at FIGS. 14A-14B, upon the proximal end 714P of the latch wire 714 being pulled by the driven gear 712 as described above, a corresponding pulling force F714 is imparted to the wire tip 718. Because the wire tip 718 is located within the pulling pocket 722 (i.e., when the top door 34 is arranged in a closed orientation), the pulling force F714 imparted to the wire tip 718 is translated to the pulling pocket 722, which causes the latch plate 716 to rotate R716 about the outer surface 704O of the support panel 704.

Figure 14C:
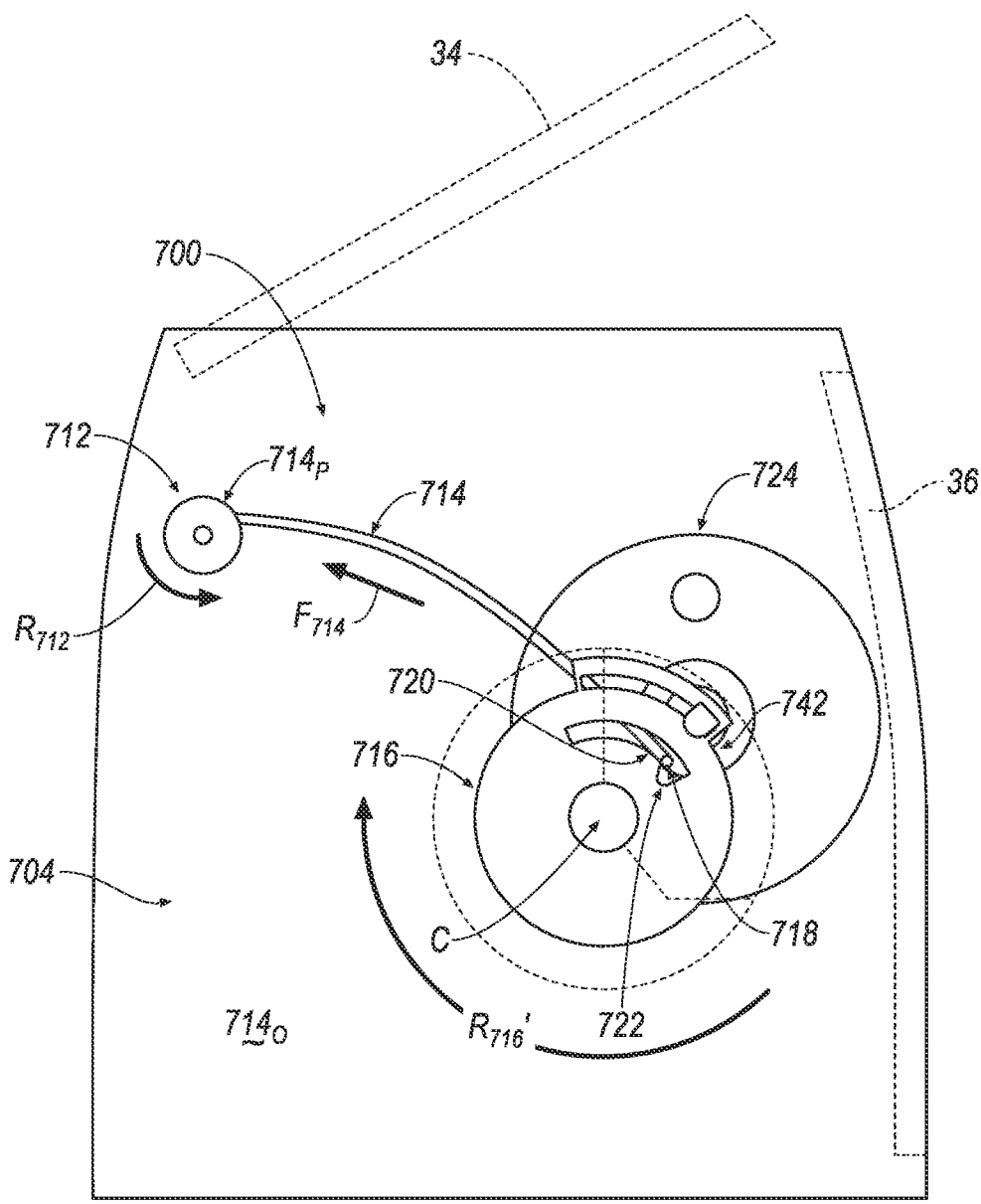
FIG. 14C is another representative side view of the crafting apparatus including the door latching mechanism connected to the top door and the front door according to FIG. 14B whereby the door latching mechanism is arranged in a third state and the top door being further transitioned to the open orientation while the front door is arranged in the unlatched-and-partially open orientation.
Figure 14D:
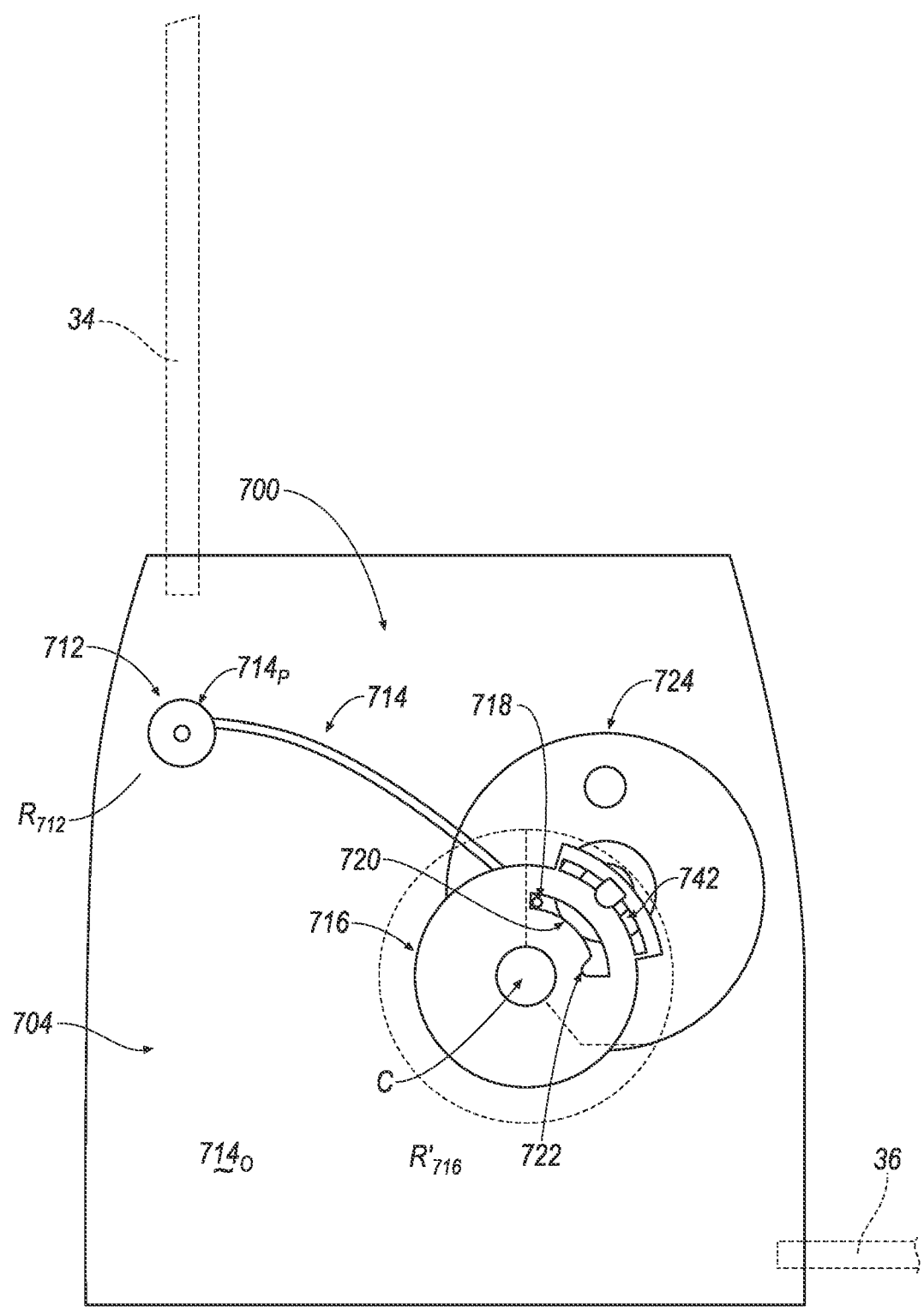
FIG. 14D is another representative side view of the crafting apparatus including the door latching mechanism connected to the top door and the front door according to FIG. 14C whereby the door latching mechanism is arranged in a fourth state and the top door being arranged in the open orientation while the front door is arranged in the unlatched-and-open orientation.

Referring to FIG. 14C, the combination of the rotation R716 of the latch plate 716 and the pulling force F714 imparted to the wire tip 718 results in the wire tip 718 being displaced from the pulling pocket 722 and into the first substantially arcuate channel 720. Upon the wire tip 718 being displaced from the pulling pocket 722, the latch plate 716 is no longer rotated according to the direction of the arrow R716 since the wire tip 718 is not translating the pulling force F714 to the pulling pocket 722. Thereafter, further rotation R712 of the driven gear 712 results in further pulling of the proximal end 714P of the latch wire 714 with the pulling force F714, which ultimately results in the wire tip 718 being pulled along the length of the first substantially arcuate channel 720 such that the wire tip 718 may arrive at a location adjacent to or near the proximal end 720P of the first substantially arcuate channel 720 as seen at FIG. 14D.

Figure 15A:
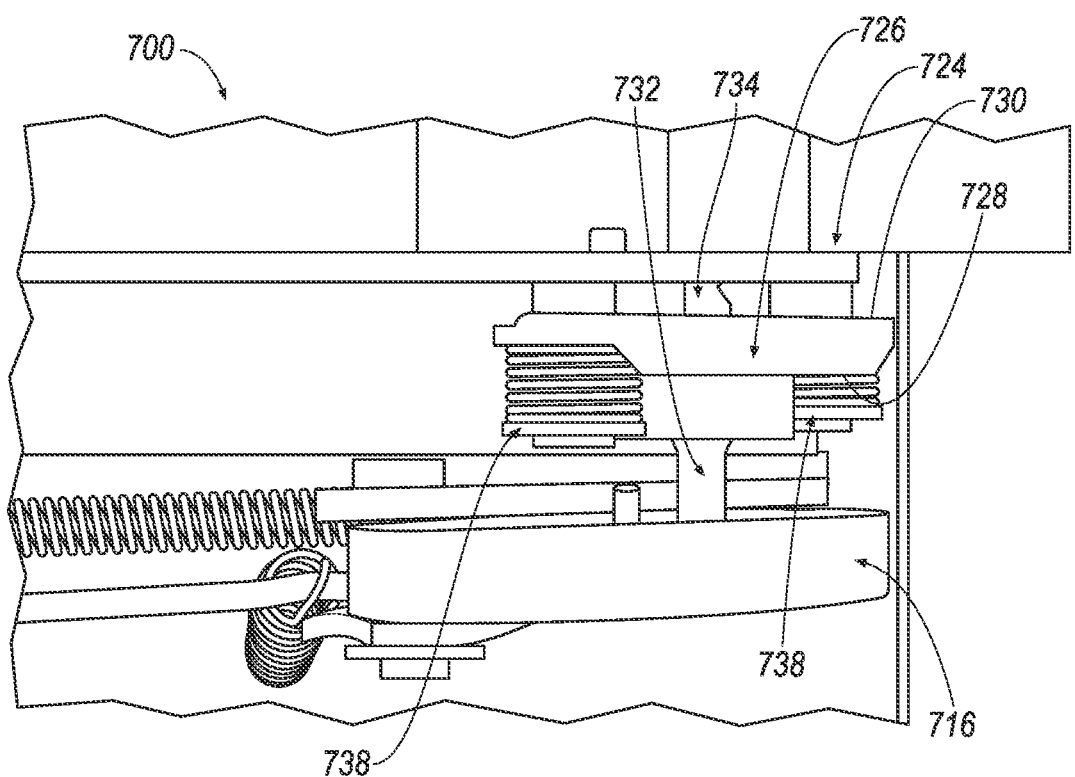
FIGS. 15A-15B are enlarged top views of another portion of the door latching mechanism of FIGS. 12A-12F.
Figure 15B:
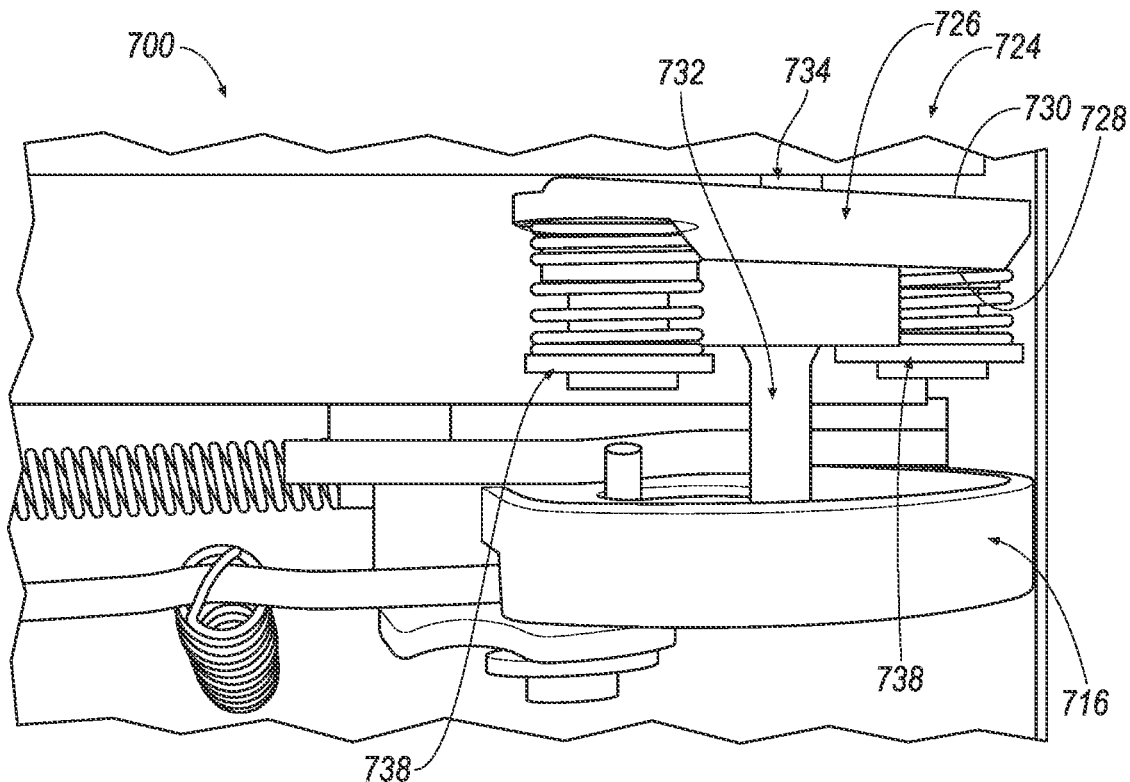

With reference to FIGS. 15A-15B, the front door latching mechanism 700 also includes a latch portion 724. The latch portion 724 includes a latch base 726 having a front surface 728 and a rear surface 730. A latch shaft 732 extends from the front surface 728 and a latch finger 734 extends from the rear surface 730.

Figure 16B:
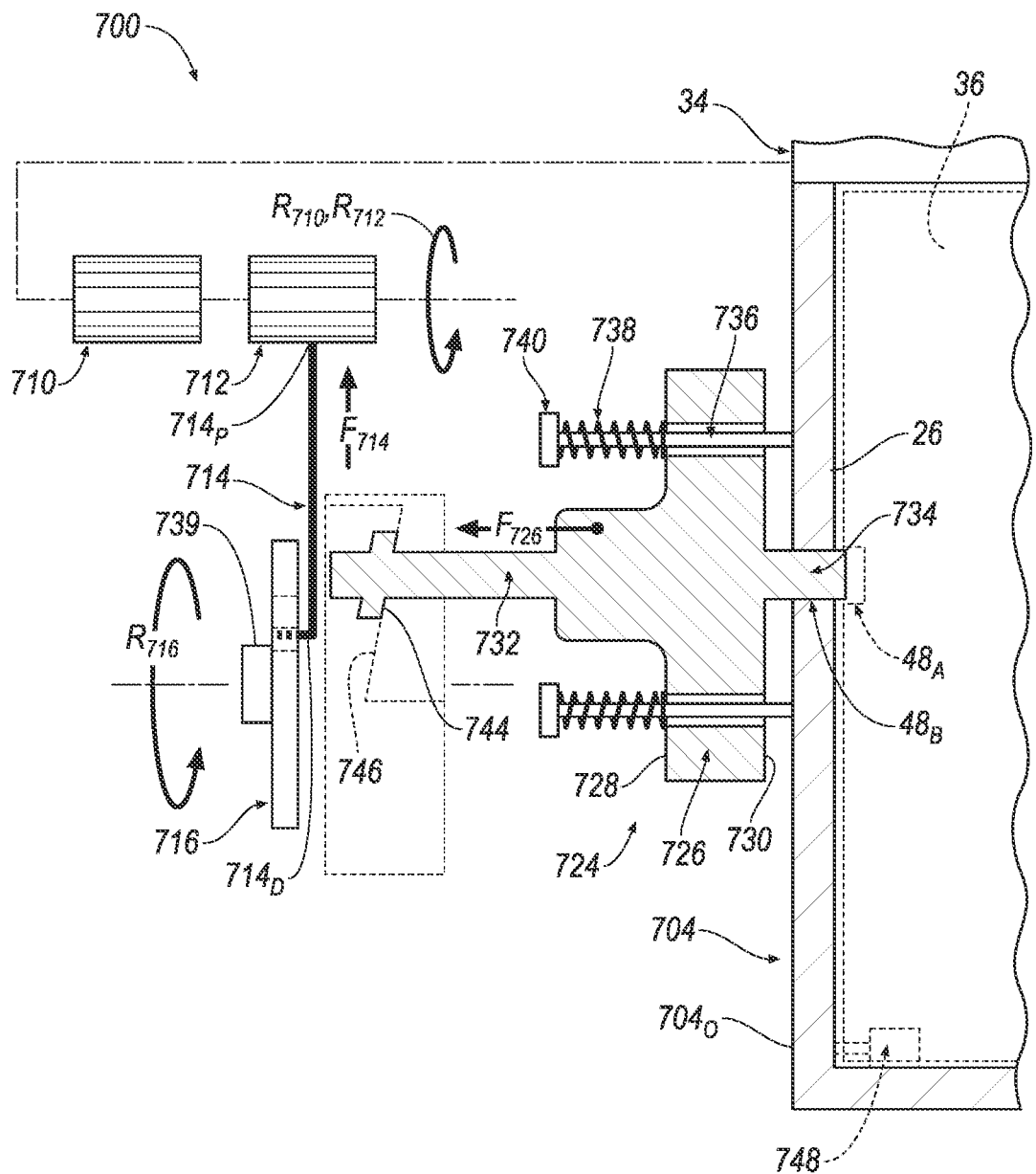
FIG. 16B is another representative front view of the crafting apparatus including the door latching mechanism connected to the top door and the front door according to FIG. 16A whereby the door latching mechanism is arranged in a second state and the top door arranged in the partially open orientation and transitioning to the open orientation while the front door is arranged in is arranged in the latched-and-closed orientation.
Figure 16C:
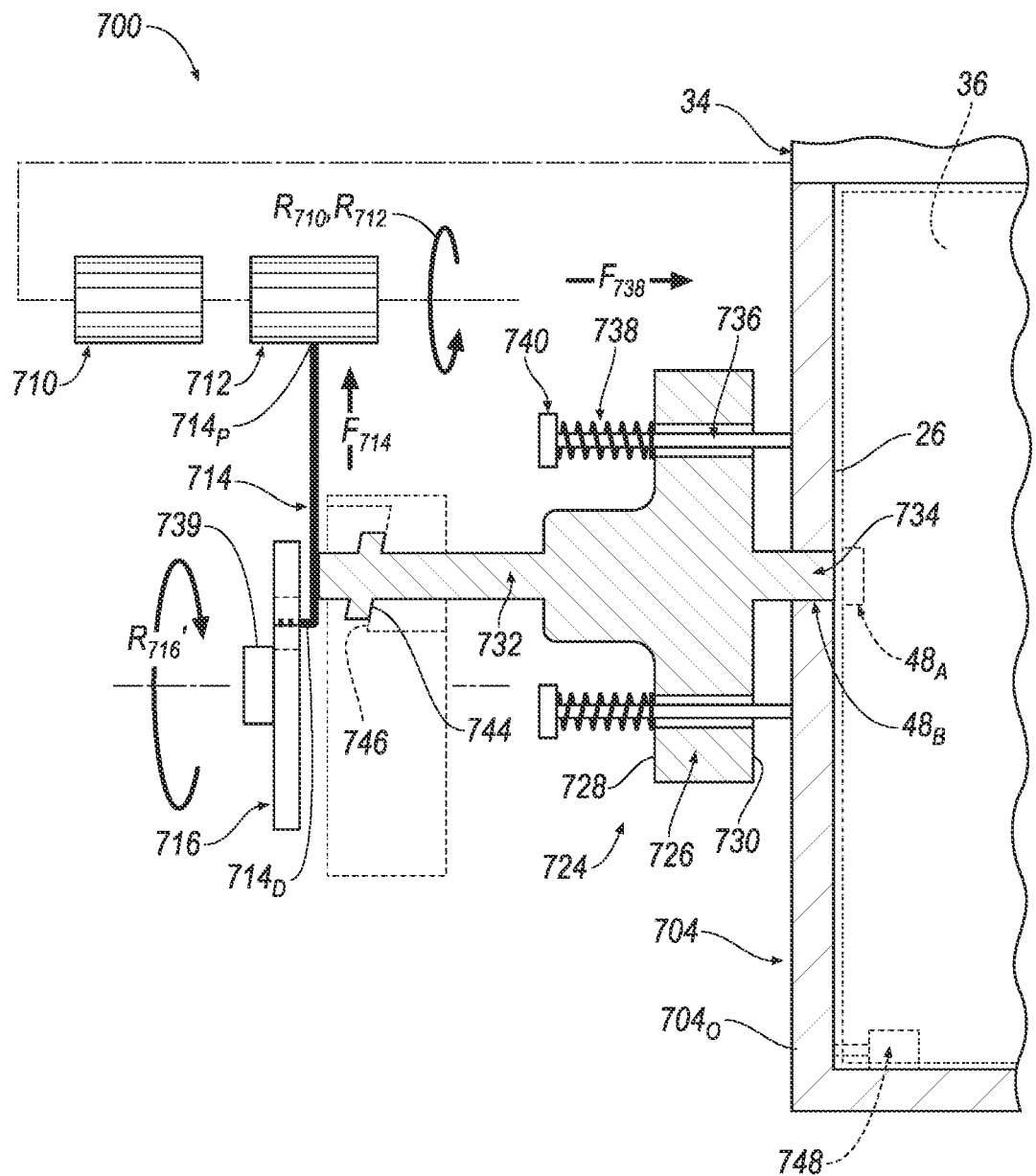
FIG. 16C is another representative front view of the crafting apparatus including the door latching mechanism connected to the top door and the front door according to FIG. 16B whereby the door latching mechanism is arranged in a third state and the top door being further transitioned to the open orientation while the front door is arranged in the unlatched-and-partially open orientation.
Figure 16D:
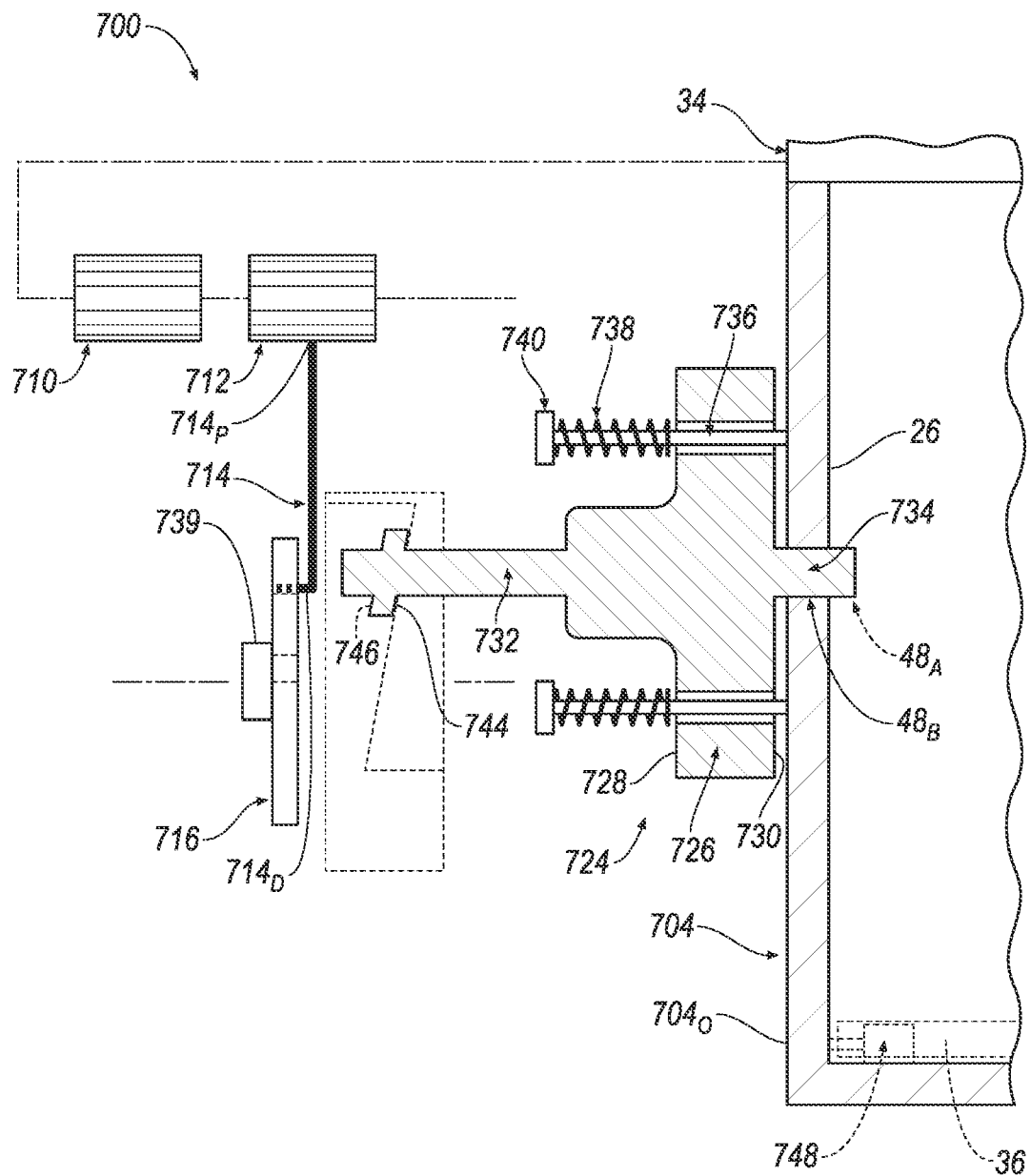
FIG. 16D is another representative front view of the crafting apparatus including the door latching mechanism connected to the top door and the front door according to FIG. 16C whereby the door latching mechanism is arranged in a fourth state and the top door being arranged in the open orientation while the front door is arranged in the unlatched-and-open orientation.
Figure 17A:
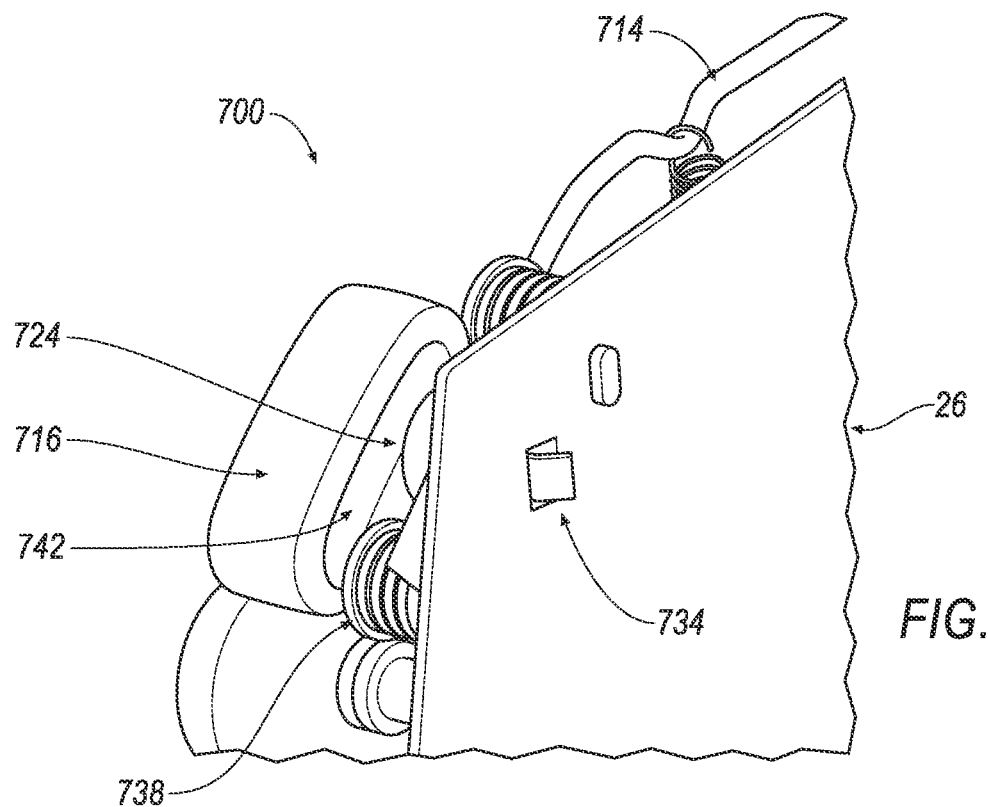
FIG. 17A is a perspective view of a portion of the door latching mechanism and the crafting apparatus illustrating a latch finger of the door latching mechanism extending through a passage for arrangement in a latching orientation with respect to the front door.
Figure 17B:
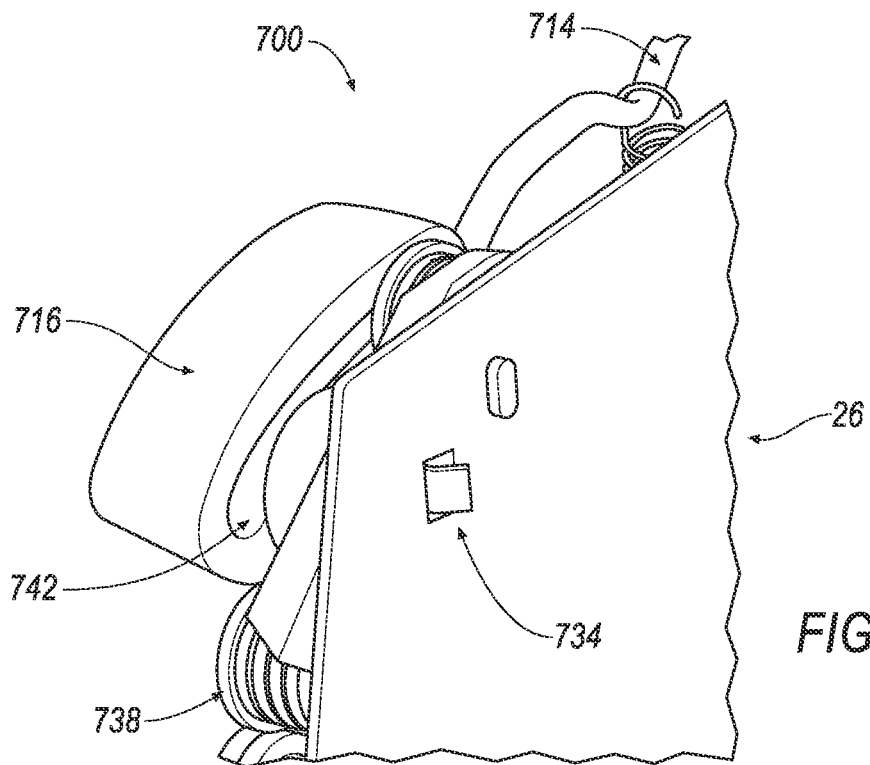
FIG. 17B is another perspective view of the portion of the door latching mechanism and the crafting apparatus illustrating the latch finger of the door latching mechanism withdrawn into the passage for arrangement in an unlatched orientation with respect to the front door.

Referring to FIGS. 16A-16D, in an example, the latch base 726 may be movably-attached to the outer surface 7040 of the support panel 704 by a pair of guide posts 736. A spring 738 may be disposed about each guide post 736 and extend between the front surface 728 of the latch base 726 and a spring-retaining head portion 740 of each guide post 736. As seen at FIGS. 16A and 17A, when the springs 738 are arranged in an expanded state, the springs 738 bias the latch base 726 toward the outer surface 7040 of the support panel 704 such that the latch finger 734 extends through latch-tip-receiving passage 48B and beyond the interior surface 26. Conversely, as seen at FIGS. 16C and 17B, when the springs 738 are arranged in a compressed state, the latch base 726 is pulled away (with a pulling force F726 as seen at FIGS. 16A-16B) from the outer surface 7040 of the support panel 704 such that the latch finger 734 is still permitted to extend through latch-tip-receiving passage 48B but not beyond the interior surface 26.

Referring back to FIG. 13, the latch plate 716 further defines a second substantially arcuate channel 742 having a distal end 742D and a proximal end 742P. A distal end 732D of the latch shaft 732 is arranged for movement in the second substantially arcuate channel 742 for connecting the latch portion 724 to the latch plate 716.

Referring to FIGS. 16A-16D, the latch shaft 732 may include a shoulder surface 744 arranged near the distal end 732D of the latch shaft 732. Furthermore, the second substantially arcuate channel 742 defines a cam surface 746 that extends along but is not parallel to the outer surface 7040 of the support panel 704. As seen at FIGS. 16A-16D, the shoulder surface 744 of the latch shaft 732 is disposed adjacent the cam surface 746.

Referring to FIGS. 14A-14B and 16A-16B, as described above, when the wire tip 718 is located within the pulling pocket 722 (i.e., when the top door 34 is arranged in a closed orientation), the pulling force F714 imparted to the wire tip 718 is translated to the pulling pocket 722, which causes the latch plate 716 to rotate R716 about the outer surface 7040 of the support panel 704. The latch plate 716 therefore is also rotated R716 about the latch shaft 732 such that the distal end 742D of the second substantially arcuate channel 742 is advanced toward the latch shaft 732. Because the shoulder surface 744 of the latch shaft 732 is disposed adjacent the cam surface 746, movement of the latch plate 716 relative the latch shaft 732 results in the latch shaft 732 pulling the latch base 726 with the pulling force F726 away from the outer surface 7040 of the support panel 704. As a result of the latch base 726 being pulled with the pulling force F726, the springs 738 are compressed between the front surface 728 of the latch base 726 and the spring-retaining head portion 740 of each guide post 736. Furthermore, as a result of the latch base 726 being pulled with the pulling force F726 away from the outer surface 7040 of the support panel 704, the latch finger 734 is retracted from: (1) as seen at FIGS. 16A-16B and FIG. 17A, a first orientation within the latch-tip-receiving passage 48B such that a portion of the latch finger 734 extends beyond the interior surface 26 to (2) as seen at FIG. 16C and FIG. 17B, a second orientation within the latch-tip-receiving passage 48B such that the portion of the latch finger 734 does not extend beyond the interior surface 26.

Referring to FIGS. 14C and 16C, as described above, when the wire tip 718 is displaced from the pulling pocket 722 and into the first substantially arcuate channel 720, the latch plate 716 is no longer rotated according to the direction of the arrow R716 since the wire tip 718 is not translating the pulling force F714 to the pulling pocket 722. Similarly, as described above, during the rotation R716 of the latch plate 716, the springs 738 are compressed between the front surface 728 of the latch base 726 and the spring-retaining head portion 740 of each guide post 736. Yet even further, a return spring 739 (see also FIG. 13) was also compressed during the rotation R716 of the latch plate 716. Upon the wire tip 718 being displaced from the pulling pocket 722, the energy stored by the compressed springs 738 and the return spring 739 is released, which results in the return spring 739 pulling on the latch plate 716 causing rotation R716' of the latch plate 716 in the opposite direction of arrow rotation R716 and the springs 738 imparting a pushing force F738 to the front surface 728 of the latch base 726 such that the latch base 726 is pushed toward the outer surface 7040 of the support panel 704.

As a result of the rotation R716' of the latch plate 716 described above, the proximal end 742P of the second substantially arcuate channel 742 is advanced toward the latch shaft 732, the latch plate shoulder surface 744 slides against the cam surface 746 of the second substantially arcuate channel 742, which results in the spring 738 returning to the expanded state (as seen also in, e.g., FIG. 16A). The latch finger 734 is therefore returned to the first orientation within the latch-tip-receiving passage 48B such that a portion of the latch finger 734 extends beyond the interior surface 26. When the latch finger 734 is returned to the first orientation as described above, the top door 34 and the front door 36 may both be arranged in the open orientation as seen at FIG. 12J.

With reference to FIGS. 12A and 17A, when the front door 36 is arranged in a closed orientation, the latch finger 734 is arranged in the latch-tip-receiving groove 48A of the front door 36 in order to latch the front door 36 with the body 22 for arranging the front door 36 in a closed orientation relative to the body 22. However, when the top door 34 is opened as described above at FIGS. 12B-12E, the orientation of the springs 738 are changed from the expanded state (see, e.g., FIG. 16A) to the compressed state (see, e.g., FIG. 16C), which results in the latch finger 734 being withdrawn from the latch-tip-receiving groove 48A of the front door 36 in order to unlatch the front door 36 with the body 22 for arranging the front door 36 in an open orientation relative to the body 22. In an example, upon unlatching the front door 36 as described above, a spring 748 (see, e.g., FIGS. 16A-16D) connected to the body 22 may automatically urge the front door 36 from the closed orientation to the open orientation. Furthermore, after the front door 36 has commenced movement toward the open orientation upon unlatching the front door 36 as described above, the orientation of the springs 738 are changed yet again from the compressed state (see, e.g., FIG. 16C) back to the expanded state (see, e.g., FIG. 16D), which results in the latch finger 734 being reset to a "ready position" for re-latching the front door 36 with the latch finger 734 when a user pivots the front door from the open orientation back to the closed orientation. Lastly, after re-latching the front door 36 in the closed orientation, the user may pivot the top door 34 from the open orientation back to the closed orientation so that the magnetic component 706 of the top door 34 may be magnetically-secured to the magnetic component 708 of the front door 36. Upon pivoting the front door 36 back to the closed orientation, the wire tip 718 is urged from an orientation adjacent to or near the proximal end 720P of the first substantially arcuate channel 720 toward the distal end 720D of the first substantially arcuate channel 720 such that the wire tip 718 may be returned to the pulling pocket 722 in order to fully reset the front door latching mechanism 700.

Figure 18:
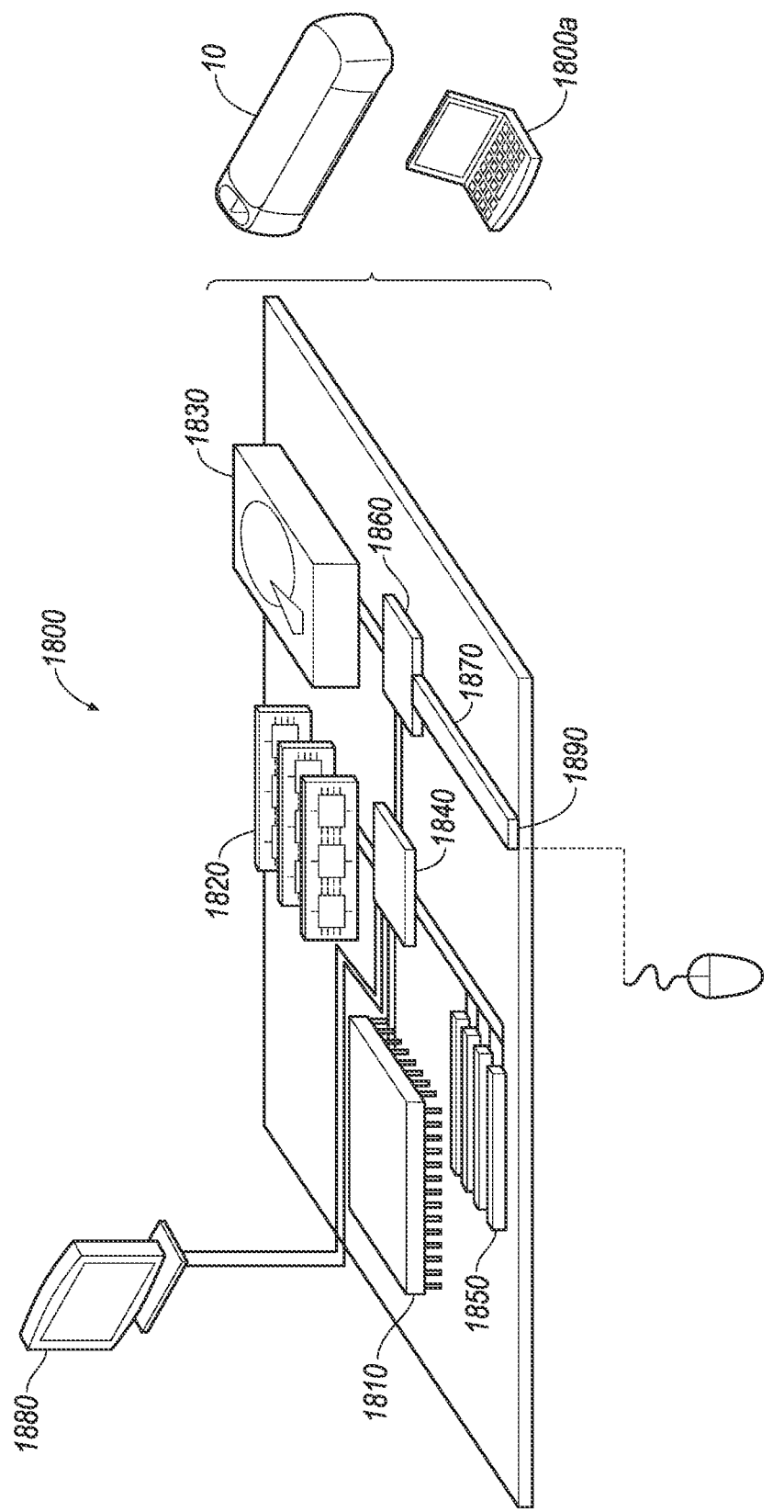
FIG. 18 is a schematic view of an example computing device that may be used to implement the systems and methods described herein.

FIG. 18 is schematic view of an example computing device 1800 that may be used to implement the systems and methods described in this document. The components 1810, 1820, 1830, 1840, 1850, and 1860 shown at FIG. 18, their connections and relationships, and their functions, are meant to be exemplary only, and are not meant to limit implementations of the inventions described and/or claimed in this document.

The computing device 1800 includes a processor 1810, memory 1820, a storage device 1830, a high-speed interface/controller 1840 connecting to the memory 1820 and high-speed expansion ports 1850, and a low speed interface/controller 1860 connecting to a low speed bus 1870 and a storage device 1830. Each of the components 1810, 1820, 1830, 1840, 1850, and 1860, are interconnected using various busses, and may be mounted on a common motherboard or in other manners as appropriate. The processor 1810 can process instructions for execution within the computing device 1800, including instructions stored in the memory 1820 or on the storage device 1830 to display graphical information for a graphical user interface (GUI) on an external input/output device, such as display 1880 coupled to high speed interface 1840. In other implementations, multiple processors and/or multiple buses may be used, as appropriate, along with multiple memories and types of memory. Also, multiple computing devices 1800 may be connected, with each device providing portions of the necessary operations (e.g., as a server bank, a group of blade servers, or a multi-processor system).

The memory 1820 stores information non-transitorily within the computing device 1800. The memory 1820 may be a computer-readable medium, a volatile memory unit(s), or non-volatile memory unit(s). The non-transitory memory 1820 may be physical devices used to store programs (e.g., sequences of instructions) or data (e.g., program state information) on a temporary or permanent basis for use by the computing device 1800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1830 is capable of providing mass storage for the computing device 1800. In some implementations, the storage device 1830 is a computer-readable medium. In various different implementations, the storage device 1830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1820, the storage device 1830, or memory on processor 1810.

The high speed controller 1840 manages bandwidth-intensive operations for the computing device 1800, while the low speed controller 1860 manages lower bandwidth-intensive operations. Such allocation of duties is exemplary only. In some implementations, the high-speed controller 1840 is coupled to the memory 1820, the display 1880 (e.g., through a graphics processor or accelerator), and to the high-speed expansion ports 1850, which may accept various expansion cards (not shown). In some implementations, the low-speed controller 1860 is coupled to the storage device 1830 and a low-speed expansion port 1890. The low-speed expansion port 1890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1800 may be implemented in a number of different forms, as shown in the figure. For example, it may be implemented in one or a combination of the crafting apparatus 10 and a laptop computer 1800a.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Figure 19:
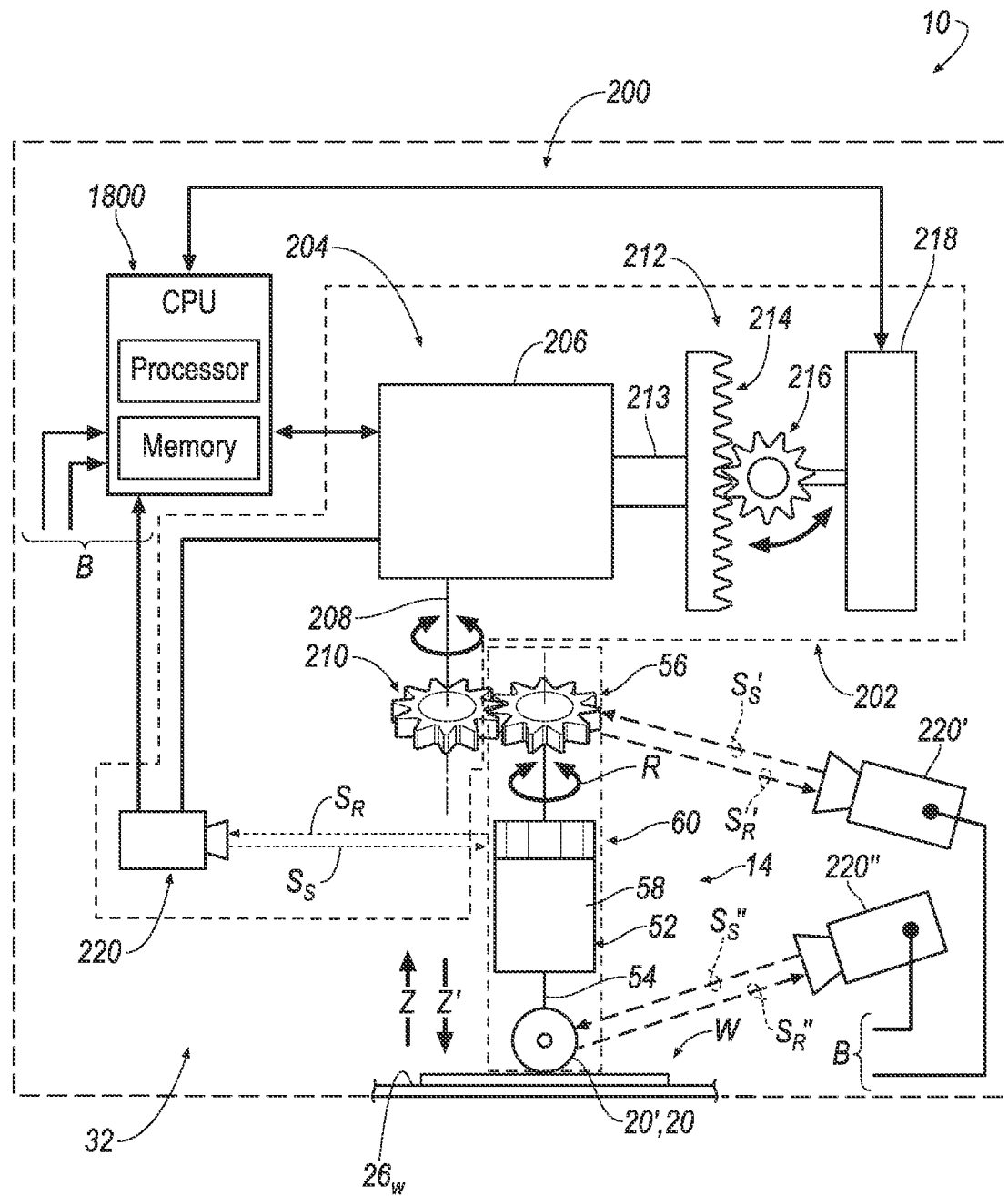
FIG. 19 is an additional embodiment, to that shown in FIG. 4 wherein optional methods of reading coding indicia located on one or more of the blade, blade over mold, or blade holder assembly.

Now referring to FIG. 4 and FIG. 19, FIG. 4 discloses rotation sensor 220 in conjunction with its reading of coding indicia as embodied in flats 60 on blade housing 52. However, optionally, rotation sensor 220 and/or other rotation sensors 220', 220" can be employed to read coding indicia that may be located on driven gear 56 exterior surface 58 of blade housing 52 and/or working tool 20', which, in an embodiment, could be a rotary cutter tool 20. Coding indicia can take the form of system, apparatus, or method which allows information associated with one or more components 56, 58, 54, and 20' (one or more of the combination of which is referred to herein as the tool holder assembly) to be carried by one or more of the components of the tool holder assembly and read by one or more rotation sensors 220, 220', and/or 220". Coding indicia can be imparted in any number of ways to one or more components in the tool holder assembly, such as by printing indicia thereon (using paints, dyes, stains, inks, and the like), marking indicia thereon (such as by chemical etching, abrasive etching, laser marking, stamping, and the like), imparting a pattern of detectable irregularities to one or more of the surfaces of the components (such as, for example, selectively placing a pattern of ridges, notches, or depressions in (or on) one or more of the teeth of driven gear 56, such that a binary number pattern of information is created/detectable across one or more teeth). The coding indicia may carry information associated with one or more of the tool holder assembly components including style information, tooling type information, component manufacturing information (such as manufacturing location, component materials, date of manufacture, etc.). Each rotation sensor 220, 220', and/or 220" may have its own respectively associated sensing channel SR, S'R, S"R and its own respectively associated irradiating channel Ss, S's, S"s, it is not necessary that each rotation sensor have its own respectively associated sensing channel and or irradiating channel. For example, depending on the technology employed for sensing coding indicia, one irradiating channel might be shared amongst two or more rotation sensors. Also, although the irradiating channel has been shown sharing a common housing, with each respectively associated rotary sensor, it is also contemplated that the irradiating source can be completely separated from the rotary sensor (such as an irradiating light source which is spaced apart from any rotation sensor). Each rotation sensor 220, 220', and/or 220" may communicate with CPU 1800 along bus system B.

Figure 20:
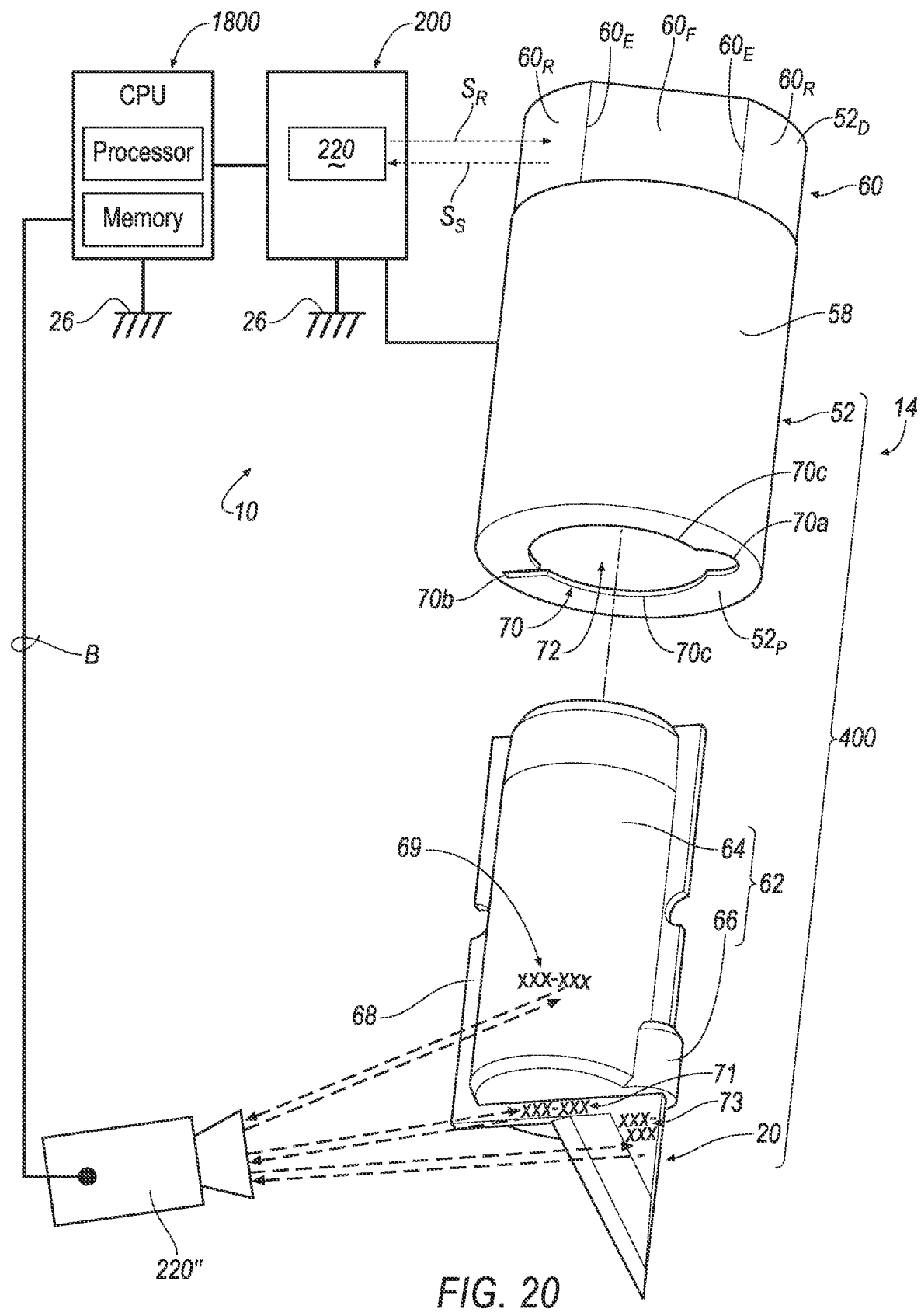
FIG. 20 is a schematic depiction of an optional system for reading coding indicia located on a tool or over molding associated with a tool.

Now referring to FIG. 19 and FIG. 20, as has been discussed in conjunction with FIG. 19, one or more rotation sensors 220, 220', and/or 220" may be used two detect coding indicia associated with one or more components 54, 56, 58, 20 of tool holder assembly. For example, in an alternative embodiment, FIG. 20 depicts employing rotation sensor 220 in proximity to the top portion of blade housing 52 four detecting encoded indicia associated with the flat and non-flat (i.e., rounded) surface portions 60 of blade housing 52 while, simultaneously, rotation sensor 220" is located in proximity to cutting tool 20 detect coding indicia 69 which, optionally, may be located on the mold overlay 64 (a.k.a. barrel 62) portion of key body 62. Optionally, encoded indicia can be located directly on tool 20, 20, such as location 71, and/or location 73. Although the system depicted in FIG. 20 shows the use of two rotation sensors 220, 220' such a system may be implemented with a single sensor such as, for example, the use of rotation sensor 220" which is effective for detecting encoded indicia located in one or more locations associated with tool 20, 20' or a mold overlay associated with tool 20, 20'.

Figure 21A:
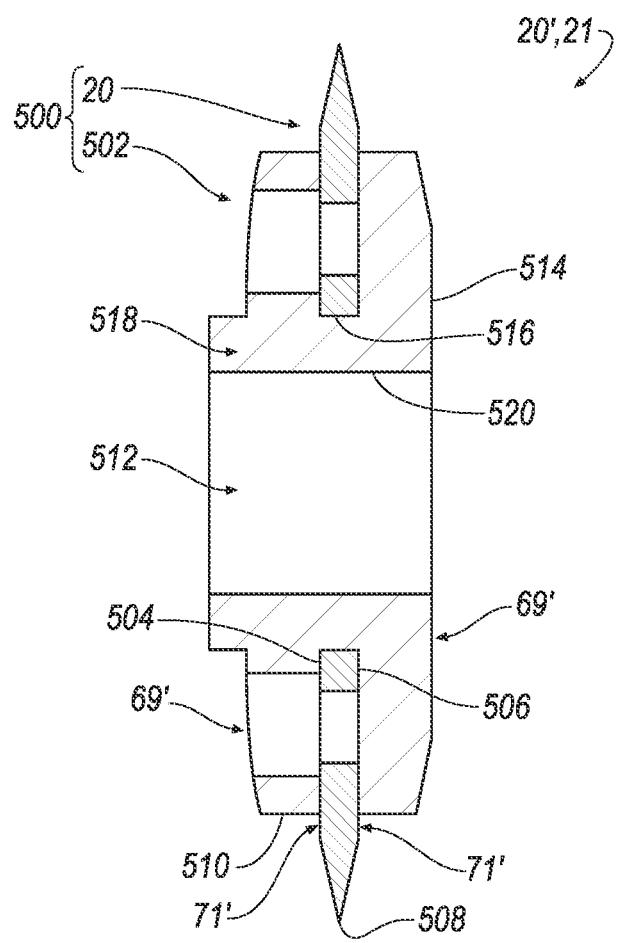
FIGS. 21A and 21B are optional locations for placing coding indicia on a tool or over mold associated with the tool.
Figure 21B:
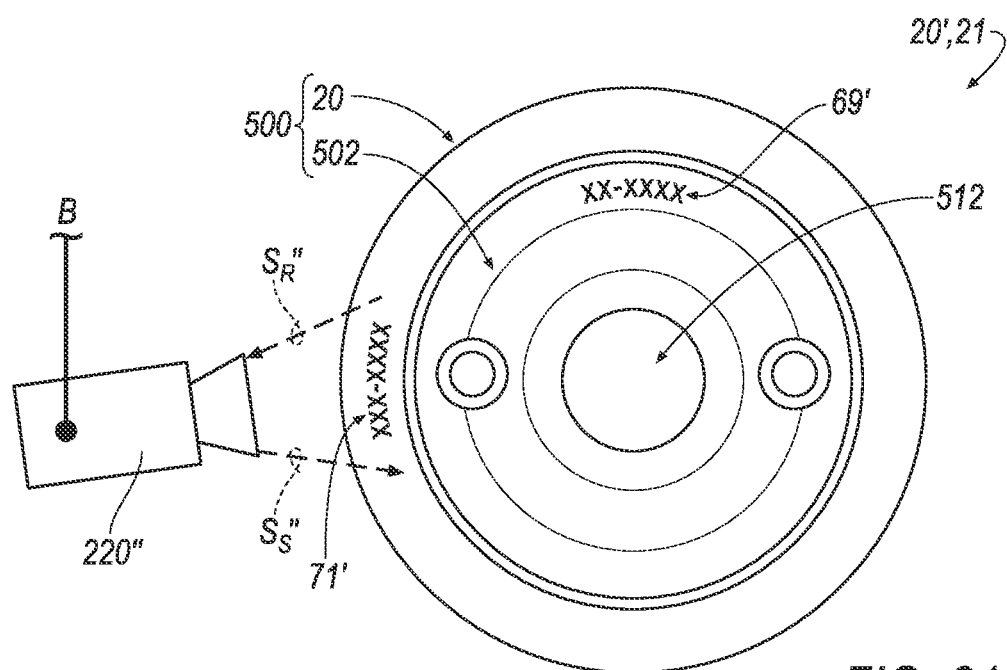

Now referring to FIG. 19, FIG. 20, FIG. 21A, and FIG. 21B, working tool 20' can be any number of working tools including the knife edge style tool 20 in FIG. 20 as well as the rotary cutting tool 21 depicted in FIG. 21A, and FIG. 21B. Coding indicia 69', 71' can be placed at any convenient location on, within, or about rotary cutting tool 21 such as at location 69' (which is on a surface of over-molded circular hub 502, such as a generally radially extending surface 514) or on a radial sidewall 71' of circular blade 20.

Figure 22A:
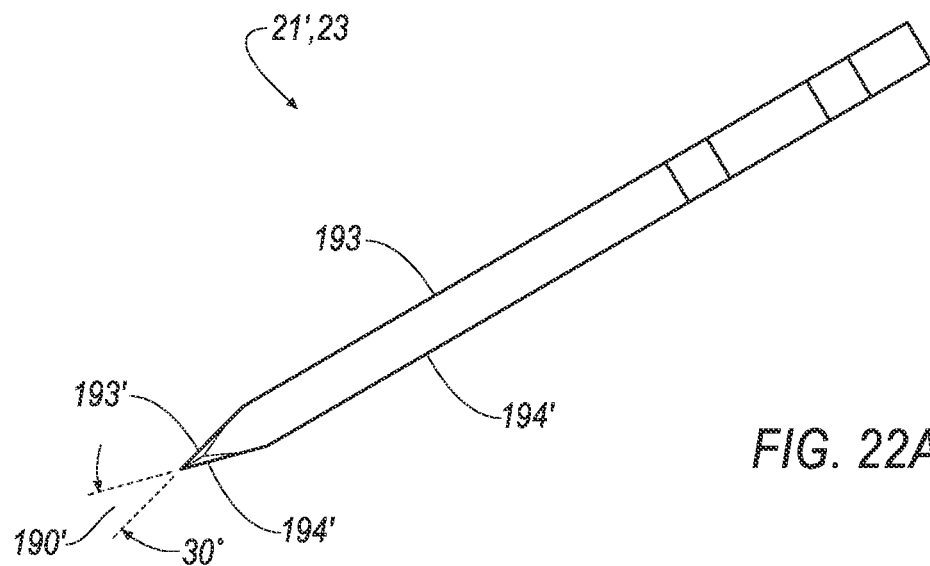
FIGS. 22A through 22I are select views of an embodiment of a working tool 20', known as a wedge blade.
Figure 22B:
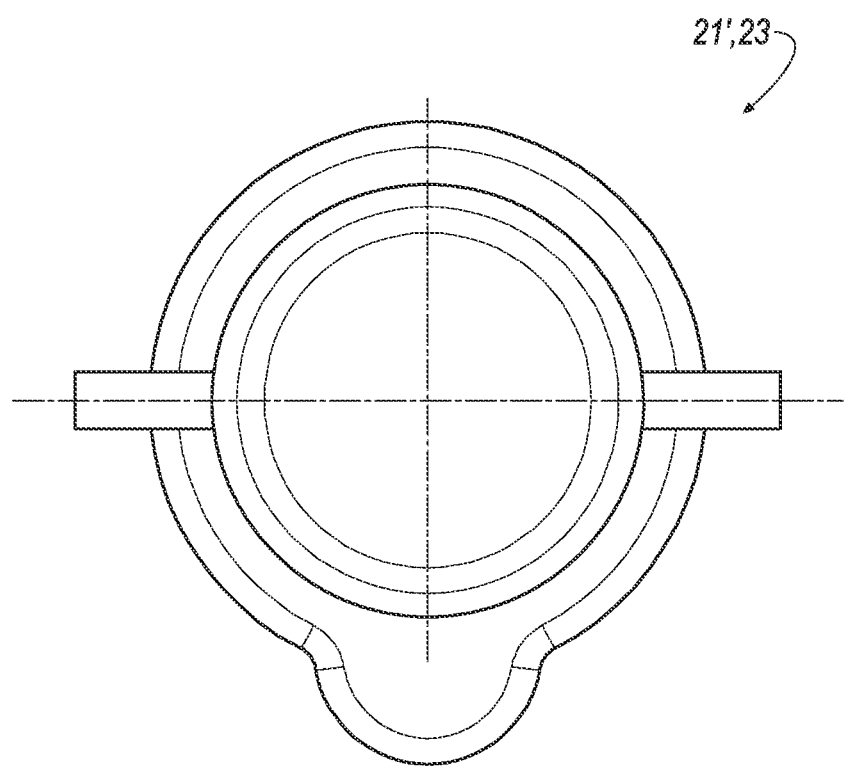
Figure 22C:
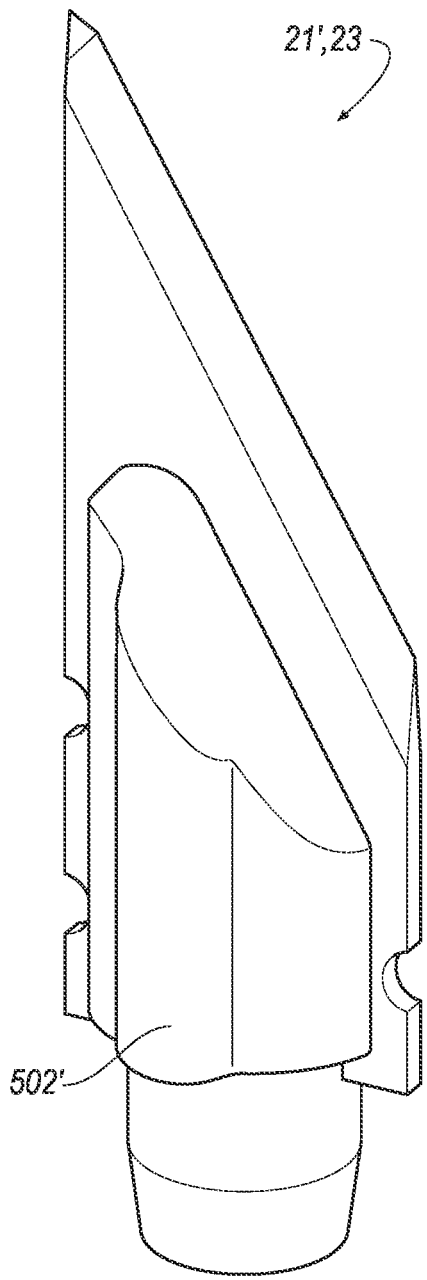
Figure 22D:
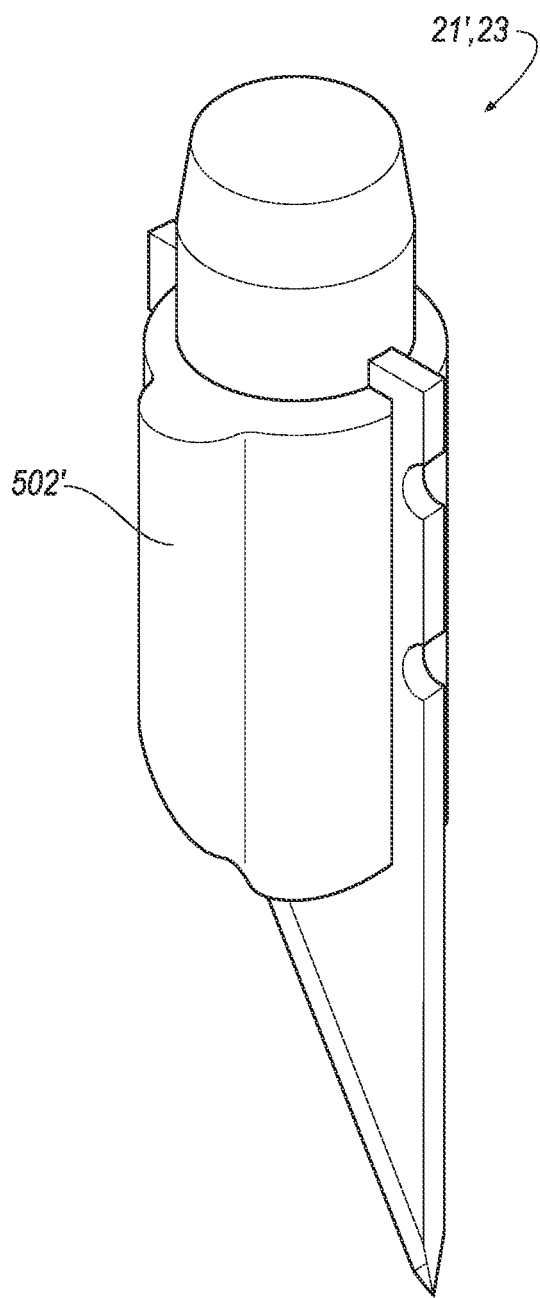
Figure 22E:
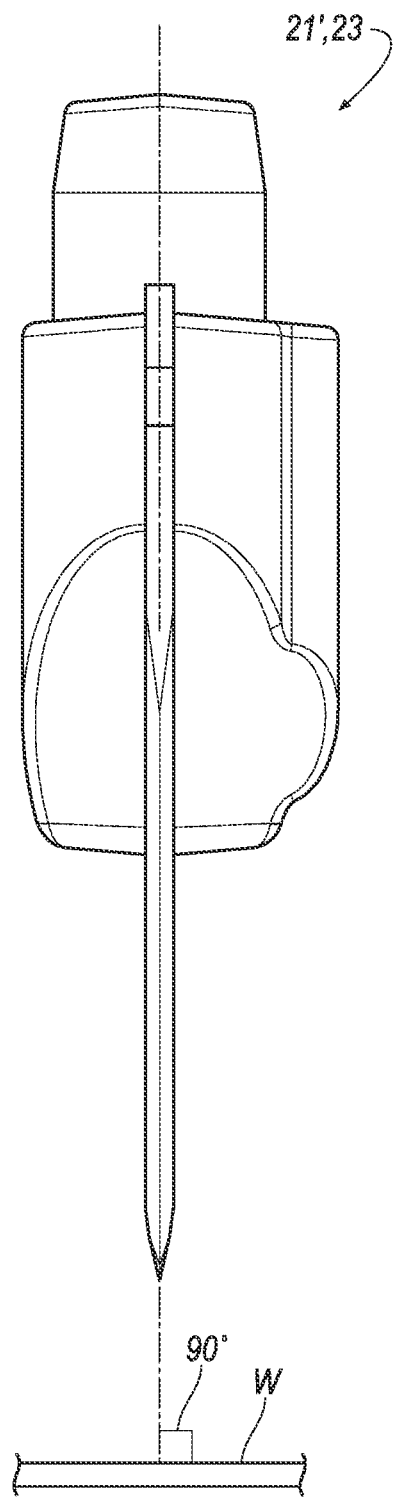
Figure 22F:
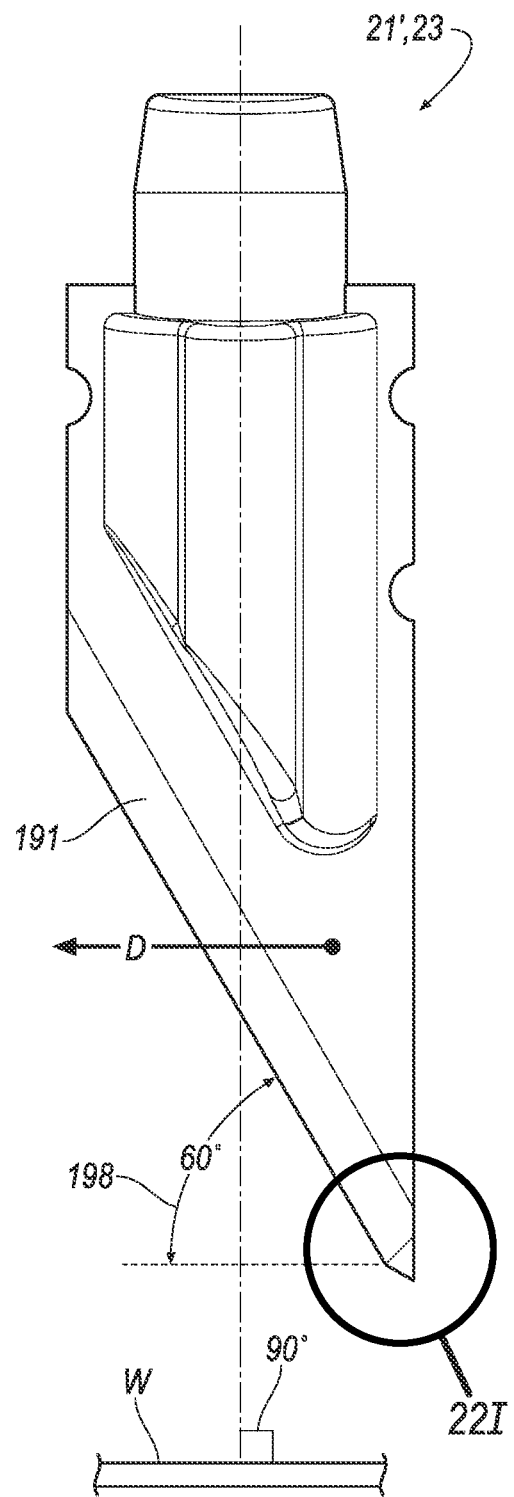
Figure 22G:
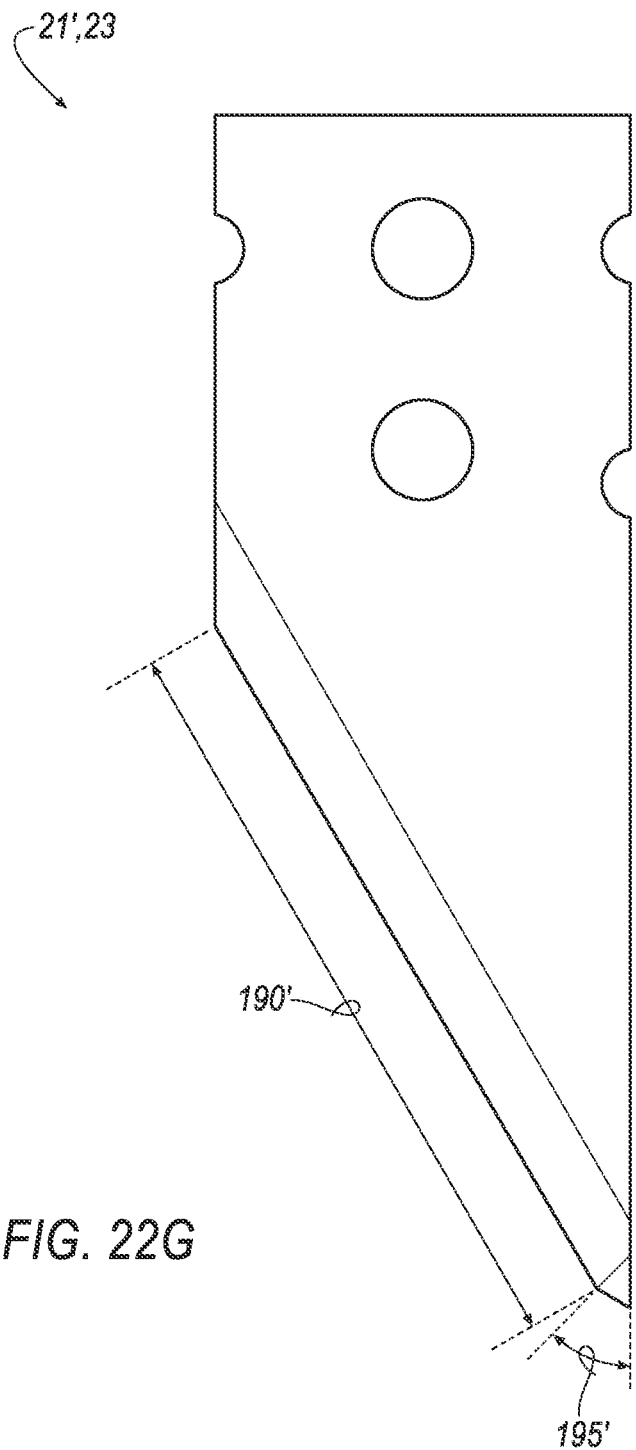
Figure 22H:
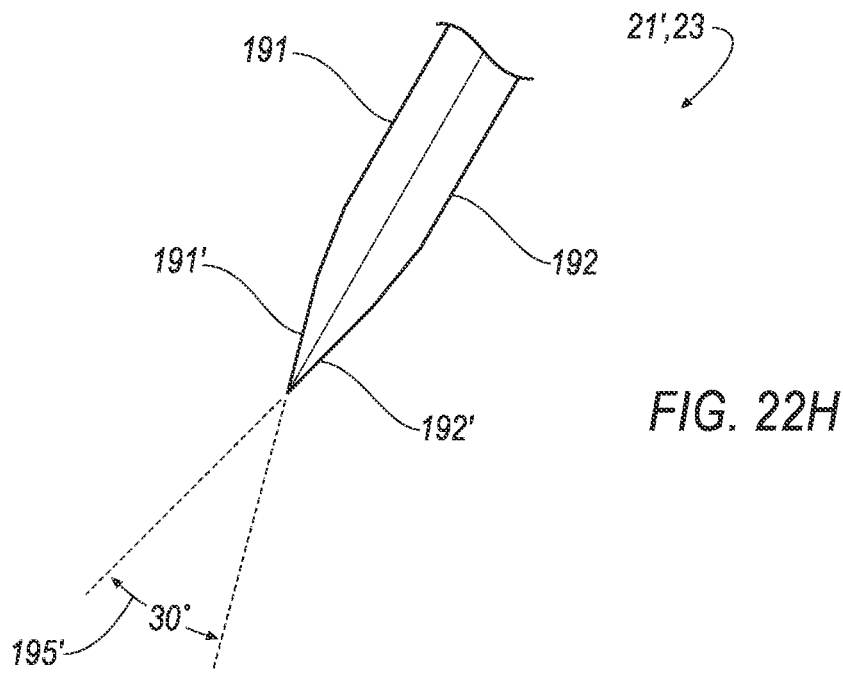
Figure 22I:
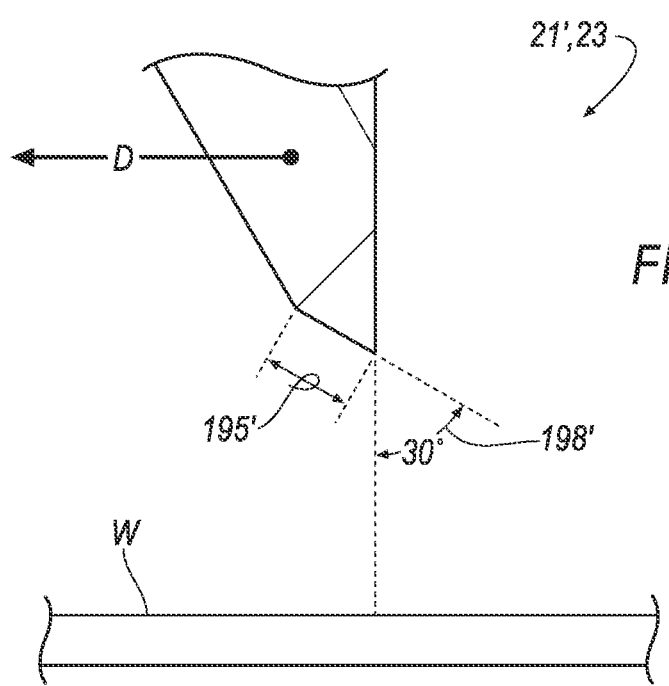

Now referring to FIGS. 22A through 22I, in an embodiment, working tool 21' can be designed as wedge blade 23. Wedge blade 23 can include an over-mold portion 502' as shown in FIGS. 22B, 22C, 22D, 22E, and 22F or wedge blade 23 can be used directly, without and over-mold portion 502' as shown in FIGS. 22A and 22G. Wedge blade 23 may be defined, in part, by first planar face 193 and second planar face 194. First and second planar faces 193, 194 may be generally parallel to one another. First and second planar faces 193, 194 may be terminated along a common portion to form a common, primary cutting edge 190'. Edge 190' may be formed by stamping, grinding, or any other suitable method for forming a cutting-edge. In an embodiment, edge 190' may form and angled edge defined by an angle less than 40° but greater than 20° (as referenced by the faces 193', 194' that transition surface 193, 194 into 190'). In an embodiment, edge 190' may form and angled edge of 30°±1° (as referenced by the faces 193', 194' that transition surface 193, 194 into edge 190').

In an embodiment, first and second planar surfaces 193, 194 may be terminated along a common portion to form a common, secondary cutting-edge 195'. Secondary cutting-edge 195' may be formed by stamping, grinding, or any other suitable method for forming a cutting-edge. In an embodiment, secondary cutting edge 195' may form and angled edge defined by an angle less than 40° but greater than 20° (as referenced by the faces 191', 192' that transition surface 191, 192 into 195'). In an embodiment, edge 195' may form and angled edge of 30°±1° (as referenced by the faces 191', 192' that transition surface 191, 192 into edge 195').

In use, tool 21', 23 is designed to move in direction D relative to a workpiece W to be worked upon by the tool 21', 23. Workpiece W will have a generally planar geometry. When tool 21', 23 is moved D relative to workpiece W, edges 190', 195' will form (at least in the vicinity proximate the cutting activity) an angle 198, 198' respectively to the general planar workpiece W. In an embodiment, the angle formed between edge 190' (during its cutting movement D) and generally planar workpiece W, may be defined by an angle less than 70° but greater than 50° (as referenced between the edge 190' and the generally planar workpiece W. In an embodiment, this angle may be defined by an angle of 60°±1° (as referenced between the edge 190' and the generally planar workpiece W.

In use, tool 21', 23 is designed to move in direction D relative to a workpiece W to be worked upon by the tool 21', 23. Workpiece W will have a generally planar geometry (at least in the vicinity proximate the cutting activity). When tool 21', 23 is moved relative to workpiece W, edges 190', 195' will form an angle to the general planar workpiece W. In an embodiment, the angle formed between edge 195' (during its cutting movement D) and generally planar workpiece W, may be defined by an angle less than 40° but greater than 20° (as referenced between the edge 195' and the generally planar workpiece W. In an embodiment, this angle may be defined by an angle of 30°±1° (as referenced between the edge 195' and the generally planar workpiece W). The primary advantage of designing edge 190' and edge 195' in this way is that it allows the angle of attack 198 associated with primary cutting edge 190' to be optimized for quick, clean cutting while also allowing the angle of attack 198' associated with secondary cutting edge 195' to the optimize for other considerations such as strength and resistance to breakage as it is lowered into the workpiece W.

Angles 190' and 195' strike a good balance between cutting efficiency and blade strength (against breaking) and edge endurance (against premature degradation in cutting ability or cutting edge chipping).

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

A number of implementations have been described. Nevertheless, it will be understood that various modifications may be made without departing from the spirit and scope of the disclosure. Accordingly, other implementations are within the scope of the following claims.

What is claimed is:

1. A crafting apparatus comprising:
   a tool housing arranged opposite a workpiece support surface, wherein the tool housing is configured to support a tool, wherein the tool housing includes a driven gear, wherein the tool housing includes an exterior surface having one or more surface portions;
   a rotating mechanism configured to rotate the tool housing about a rotation axis; and
   a rotation sensor configured to sense rotation of the tool housing about the rotation axis.

2. The crafting apparatus according to claim 1, wherein the rotation sensor is arranged opposite the one or more surface portions of the exterior surface of the tool housing.

3. The crafting apparatus according to claim 2, wherein the one or more surface portions is defined by a plurality of rotation sensor signal feedback surface portions that are separated by a plurality of rotation sensor signal feedback interruption surface portions.

4. The crafting apparatus according to claim 3, wherein:
   the plurality of rotation sensor signal feedback surface portions are configured to reflect a signal generated by the rotation sensor as the tool housing is rotated by the rotating mechanism;
   the plurality of rotation sensor signal feedback interruption surface portions are configured to interrupt the signal generated by the rotation sensor as the tool housing is rotated by the rotating mechanism; and
   the reflection and interruption of the signal generated by the rotation sensor defines a periodically-interrupted reflected feedback signal received by the rotation sensor.

5. The crafting apparatus according to claim 4, wherein:
   the rotation sensor is communicatively-connected to a central processing unit;
   the central processing unit includes a data processing hardware and a memory hardware in communication with the data processing hardware, the memory hardware storing instructions that when executed on the data processing hardware cause the data processing hardware to perform operations that comprise identifying a style of the tool supported by the tool housing in response to receiving the periodically-interrupted reflected feedback signal from the rotation sensor.

6. The crafting apparatus according to claim 4, wherein the rotation sensor is communicatively-connected to a central processing unit, wherein the central processing unit includes a data processing hardware and a memory hardware in communication with the data processing hardware, the memory hardware storing instructions that when executed on the data processing hardware cause the data processing hardware to perform operations that comprise determining an amount of rotation of the tool housing in response to receiving the periodically-interrupted reflected feedback signal from the rotation sensor.

7. The crafting apparatus according to claim 4, wherein the rotation sensor is communicatively-connected to a central processing unit, wherein the central processing unit includes a data processing hardware and a memory hardware in communication with the data processing hardware, the memory hardware storing instructions that when executed on the data processing hardware cause the data processing hardware to perform operations that comprise identifying a style of the tool supported by the tool housing and determining an amount of rotation of the tool housing in response to receiving the periodically-interrupted reflected feedback signal from the rotation sensor.

8. The crafting apparatus according to claim 1, wherein the rotating mechanism comprises:
  a motor, and
  a drive gear connected to the motor that rotates the drive gear, wherein the drive gear is connected to the driven gear of the tool housing such that rotation of the drive gear by the motor imparts rotation of the driven gear of the tool housing.

9. The crafting apparatus according to claim 8, wherein the drive gear is connected to a gear train.

* * * * *